United States Patent
Sloo et al.

(10) Patent No.: US 9,075,419 B2
(45) Date of Patent: Jul. 7, 2015

(54) SYSTEMS AND METHODS FOR A GRAPHICAL USER INTERFACE OF A CONTROLLER FOR AN ENERGY-CONSUMING SYSTEM HAVING SPATIALLY RELATED DISCRETE DISPLAY ELEMENTS

(71) Applicant: Nest Labs, Inc., Palo Alto, CA (US)

(72) Inventors: David Sloo, Menlo Park, CA (US); Anthony Michael Fadell, Portola Valley, CA (US); Matthew Lee Rogers, Los Gatos, CA (US); Michael Plitkins, Berkeley, CA (US); Michael James Matas, San Francisco, CA (US); Steven A. Hales, IV, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/834,704

(22) Filed: Mar. 15, 2013

(65) Prior Publication Data
US 2013/0345883 A1 Dec. 26, 2013

Related U.S. Application Data

(63) Continuation-in-part of application No. 13/269,501, filed on Oct. 7, 2011, now Pat. No. 8,918,219, which is a continuation-in-part of application No. 13/033,573, filed on Feb. 23, 2011, application No. 13/834,704, which is a continuation-in-part of application No. 13/317,557, filed on Oct. 21, 2011.

(60) Provisional application No. 61/415,771, filed on Nov. 19, 2010, provisional application No. 61/429,093, filed on Dec. 31, 2010.

(51) Int. Cl.
G05D 23/19 (2006.01)
F24F 11/00 (2006.01)

(52) U.S. Cl.
CPC ............ *G05D 23/19* (2013.01); *F24F 11/0086* (2013.01); *F24F 2011/0091* (2013.01); *F24F 2221/32* (2013.01); *G05D 23/1904* (2013.01)

(58) Field of Classification Search
CPC ... G05D 23/19; G05D 23/00; G05D 23/1904; F24F 11/00; F24F 11/0086; F24F 2011/0091; F24F 2221/32
USPC ...... 700/83, 276; 236/1 C, 51, 91 D, 91 R, 94
See application file for complete search history.

(56) References Cited

U.S. PATENT DOCUMENTS

| | | | | |
|---|---|---|---|---|
| 6,786,421 B2 * | 9/2004 | Rosen | ............................. | 236/94 |
| 7,028,912 B1 * | 4/2006 | Rosen | ........................... | 236/1 C |
| 7,152,806 B1 * | 12/2006 | Rosen | ............................. | 236/94 |
| 7,156,318 B1 * | 1/2007 | Rosen | ............................. | 236/94 |
| 7,232,075 B1 * | 6/2007 | Rosen | ............................. | 236/51 |

(Continued)

*Primary Examiner* — Charles Kasenge

(57) ABSTRACT

Devices and methods are provided for generating and/or displaying a graphical user interface used to control an energy-consuming system, such as a heating, ventilation, or air conditioning (HVAC) system. Such an electronic device may include, for example, a processor that generates the graphical user interface and an electronic display that displays the graphical user interface. The graphical user interface may include a menu formed from discrete display elements that, owing to the way in which the discrete display elements are shifted into and out of view on the screen, appear to be spatially related to one another.

27 Claims, 63 Drawing Sheets

(56) References Cited

U.S. PATENT DOCUMENTS

| | | | |
|---|---|---|---|
| 7,556,207 B2 * | 7/2009 | Mueller et al. | 236/94 |
| 7,614,567 B2 * | 11/2009 | Chapman et al. | 236/1 C |
| 7,634,504 B2 * | 12/2009 | Amundson | 1/1 |
| 8,020,780 B2 * | 9/2011 | Schultz et al. | 236/51 |
| 8,083,154 B2 * | 12/2011 | Schultz et al. | 236/94 |
| 8,087,593 B2 * | 1/2012 | Leen | 236/91 D |
| 8,091,796 B2 * | 1/2012 | Amundson et al. | 236/94 |
| 8,167,216 B2 * | 5/2012 | Schultz et al. | 236/51 |
| 8,224,491 B2 * | 7/2012 | Koster et al. | 700/277 |
| 8,387,892 B2 * | 3/2013 | Koster et al. | 236/94 |
| 2004/0074978 A1 * | 4/2004 | Rosen | 236/1 C |
| 2004/0262410 A1 * | 12/2004 | Hull | 236/91 R |
| 2009/0140057 A1 * | 6/2009 | Leen | 236/51 |
| 2009/0140058 A1 * | 6/2009 | Koster et al. | 236/49.3 |
| 2009/0140061 A1 * | 6/2009 | Schultz et al. | 236/51 |
| 2009/0140062 A1 * | 6/2009 | Amundson et al. | 236/51 |
| 2009/0140063 A1 * | 6/2009 | Koster et al. | 236/51 |
| 2009/0140064 A1 * | 6/2009 | Schultz et al. | 236/51 |
| 2009/0143879 A1 * | 6/2009 | Amundson et al. | 700/83 |
| 2009/0143880 A1 * | 6/2009 | Amundson et al. | 700/83 |
| 2009/0143918 A1 * | 6/2009 | Amundson et al. | 700/278 |
| 2010/0023865 A1 * | 1/2010 | Fulker et al. | 715/734 |
| 2010/0198425 A1 * | 8/2010 | Donovan | 700/299 |
| 2013/0238140 A1 * | 9/2013 | Malchiondo et al. | 700/276 |

* cited by examiner

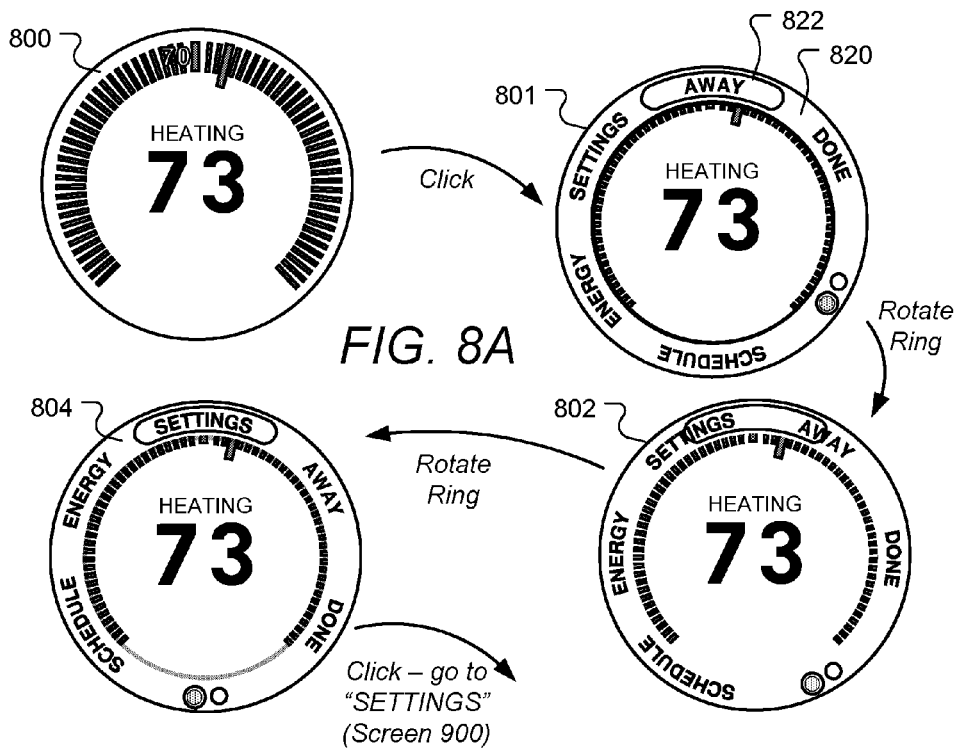
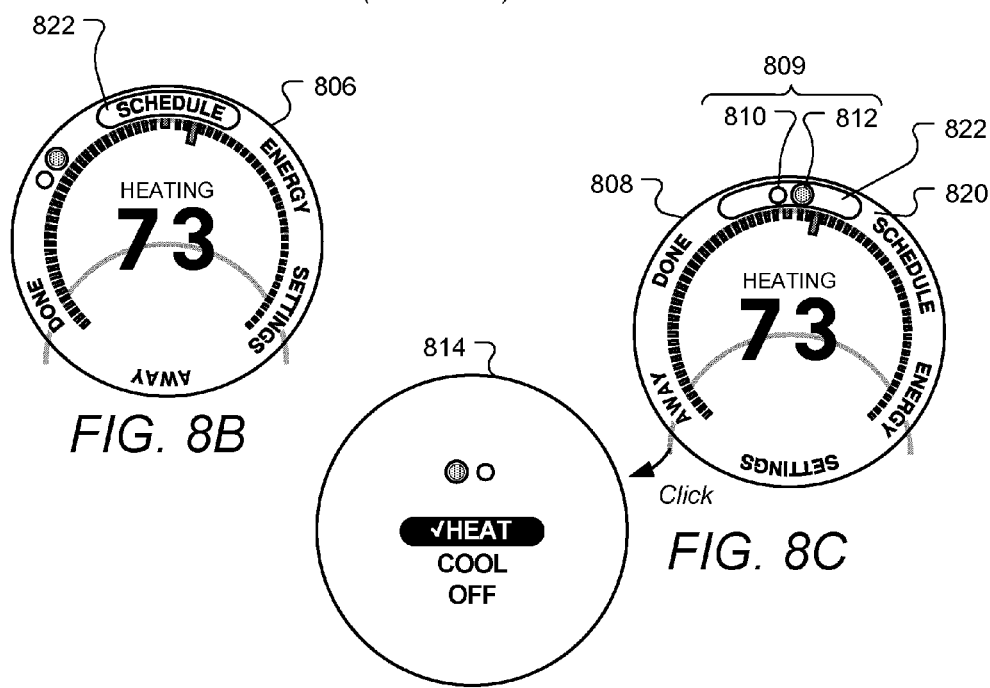
FIG. 8A
FIG. 8B
FIG. 8C

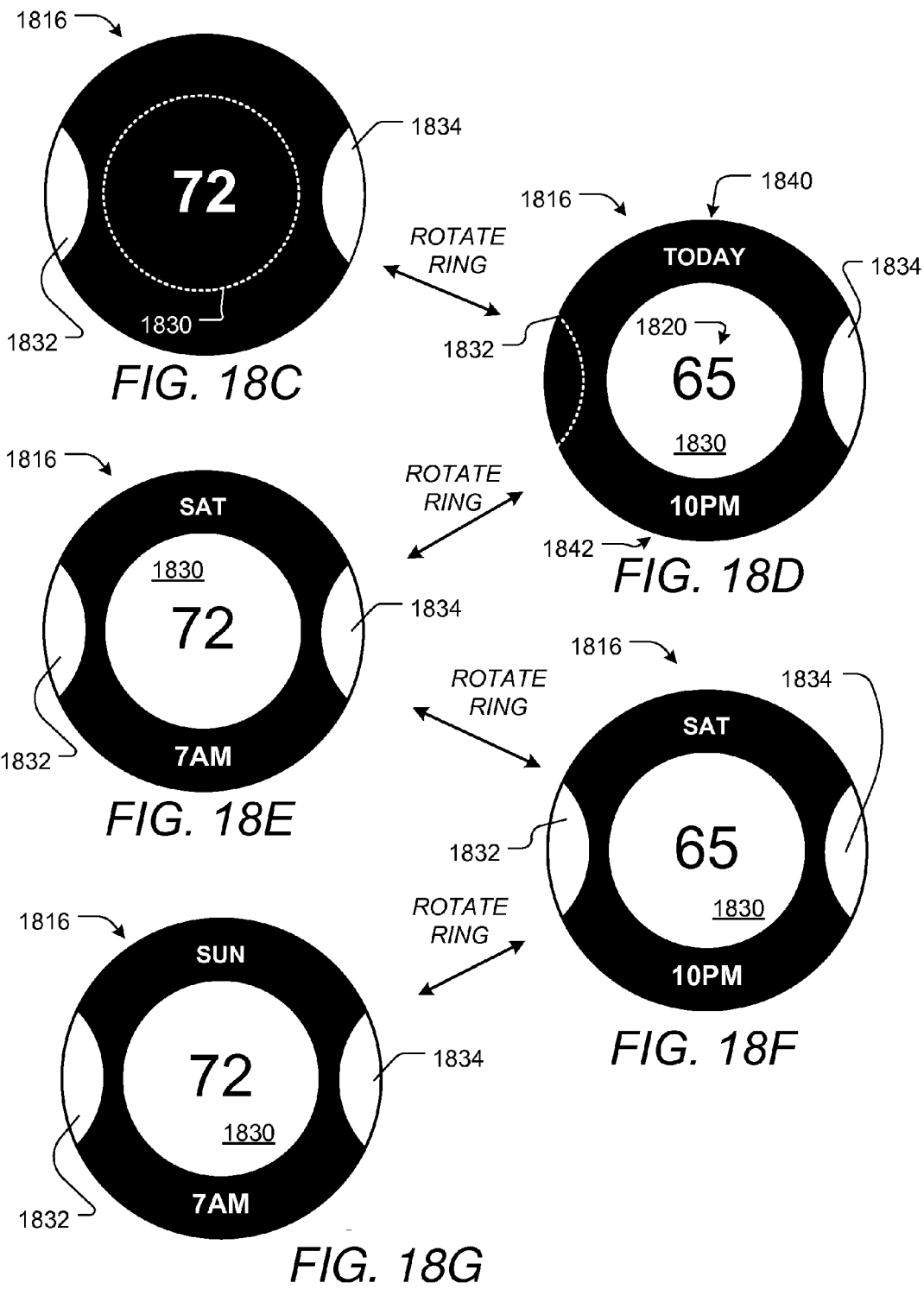

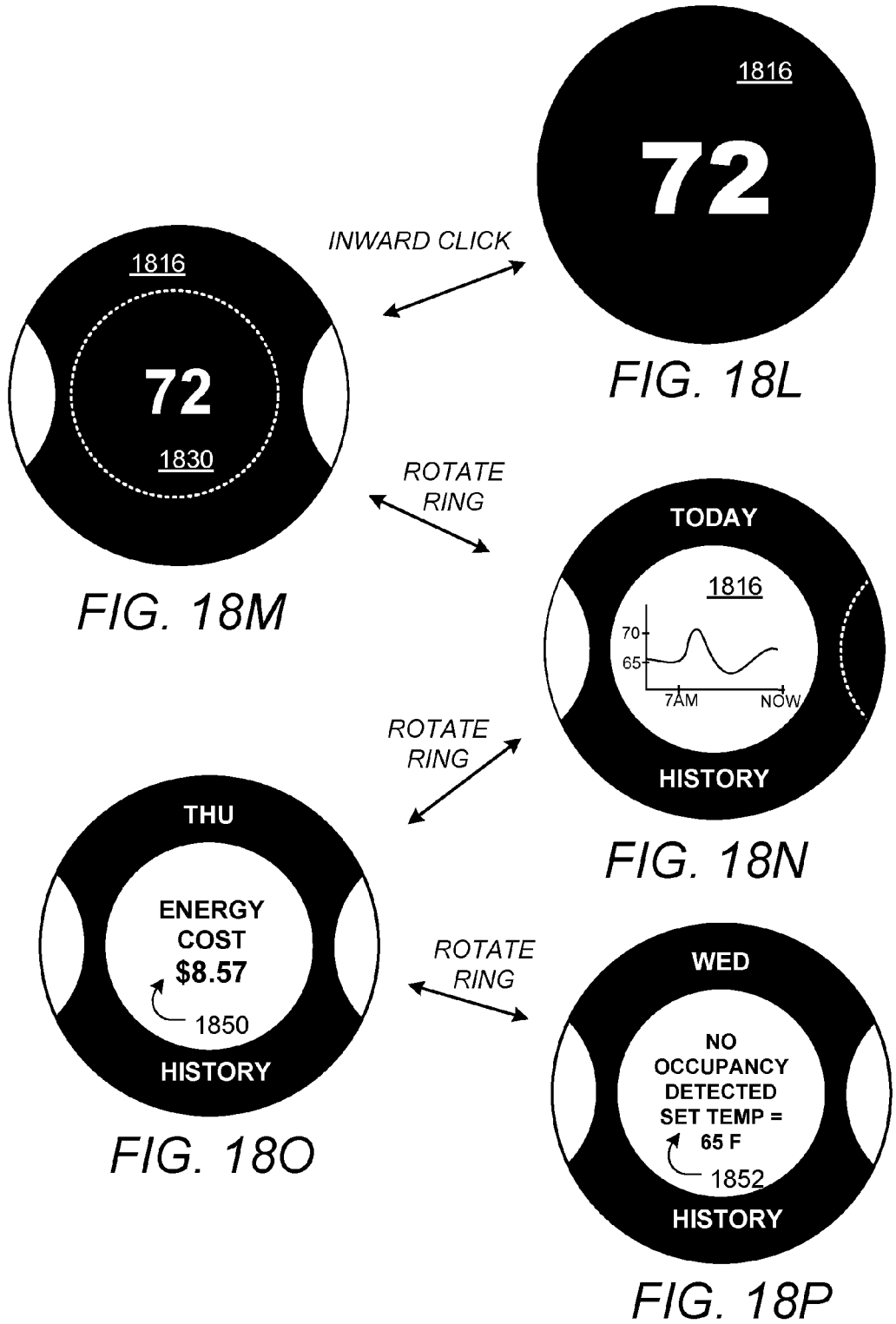

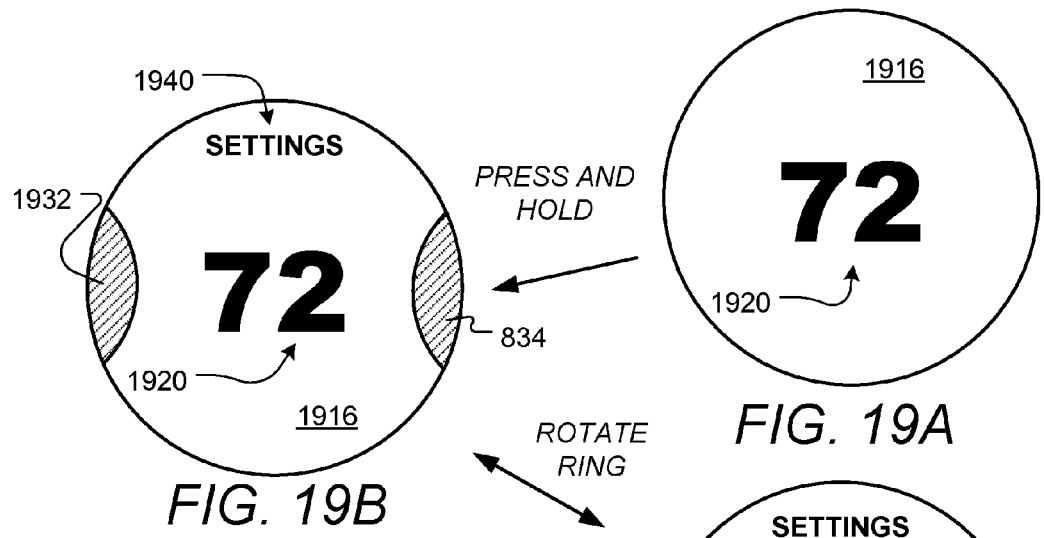
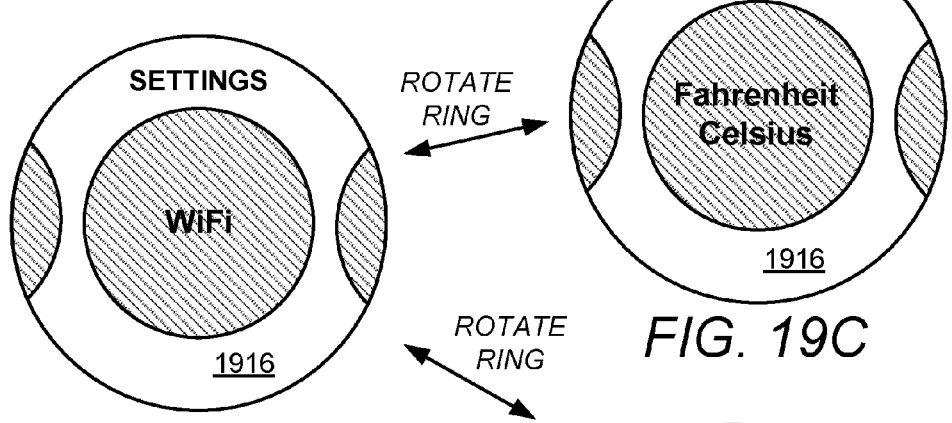
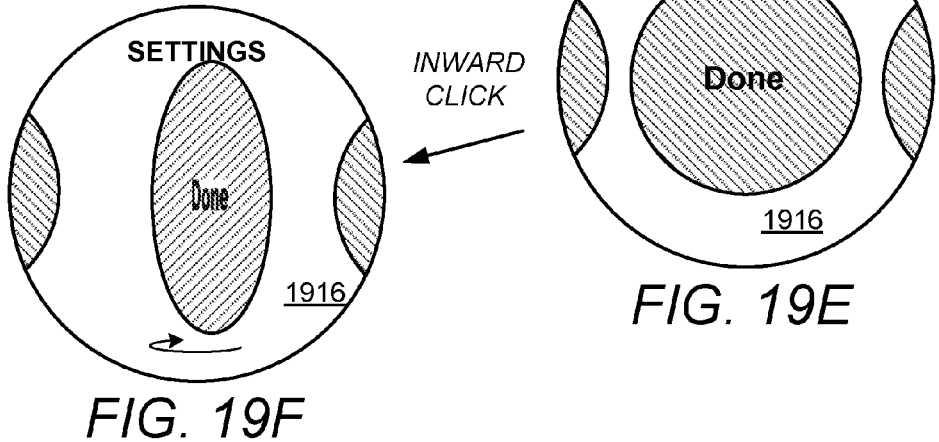

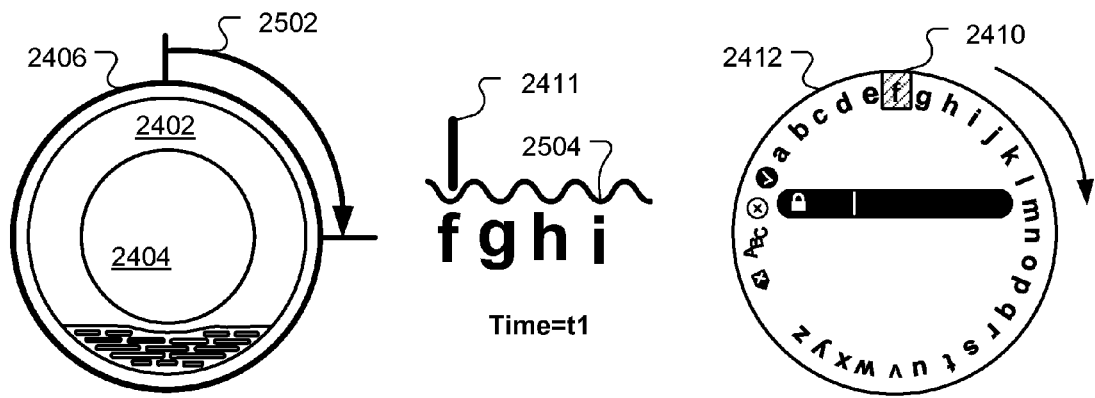
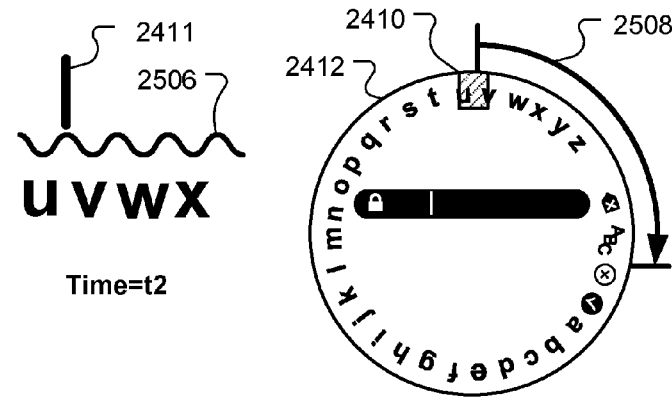
FIG. 25
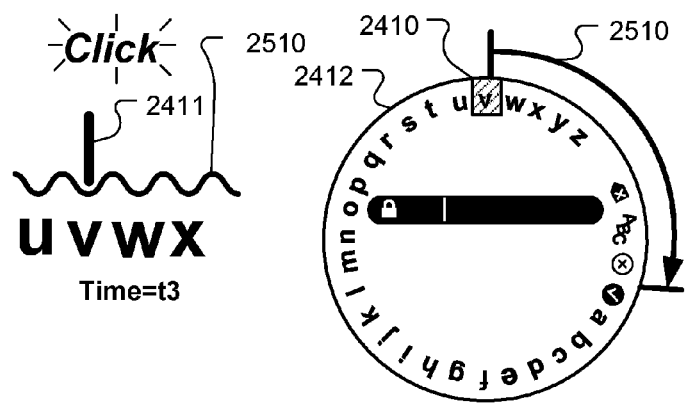

SYSTEMS AND METHODS FOR A GRAPHICAL USER INTERFACE OF A CONTROLLER FOR AN ENERGY-CONSUMING SYSTEM HAVING SPATIALLY RELATED DISCRETE DISPLAY ELEMENTS

CROSS-REFERENCE TO RELATED APPLICATIONS

This is a continuation-in-part of U.S. Ser. No. 13/269,501, filed Oct. 7, 2011, which is a continuation-in-part of U.S. Ser. No. 13/033,573, filed Feb. 23, 2011. Both U.S. Ser. Nos. 13/269,501 and 13/033,573 claim the benefit of U.S. Prov. Ser. No. 61/415,771, filed Nov. 19, 2010, and U.S. Prov. Ser. No. 61/429,093, filed Dec. 31, 2010.

This is also a continuation-in-part of U.S. Ser. No. 13/317,557, filed Oct. 21, 2011, which claims the benefit of U.S. Prov. Ser. No. 61/415,771, filed Nov. 19, 2010 and U.S. Prov. Ser. No. 61/429,093, filed Dec. 31, 2010.

The commonly assigned patent applications noted in this application, including all of those listed above, are incorporated by reference herein in their entirety for all purposes. These applications are collectively referred to below as "the commonly assigned incorporated applications."

BACKGROUND

This disclosure relates to generating and displaying a graphical user interface with spatially related discrete display elements for controlling an energy-consuming system, such as a heating, ventilation, and/or air conditioning (HVAC) system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

While substantial effort and attention continues toward the development of newer and more sustainable energy supplies, the conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment. By activating heating, ventilation, and air conditioning (HVAC) equipment for judiciously selected time intervals and carefully chosen operating levels, substantial energy can be saved while at the same time keeping the living space suitably comfortable for its occupants.

Historically, however, most known HVAC thermostatic control systems have tended to fall into one of two opposing categories, neither of which is believed be optimal in most practical home environments. In a first category are many simple, non-programmable home thermostats, each typically consisting of a single mechanical or electrical dial for setting a desired temperature and a single HEAT-FAN-OFF-AC switch. While being easy to use for even the most unsophisticated occupant, any energy-saving control activity, such as adjusting the nighttime temperature or turning off all heating/cooling just before departing the home, must be performed manually by the user. As such, substantial energy-saving opportunities are often missed for all but the most vigilant users. Moreover, more advanced energy-saving capabilities are not provided, such as the ability for the thermostat to be programmed for less energy-intensive temperature setpoints ("setback temperatures") during planned intervals of non-occupancy, and for more comfortable temperature setpoints during planned intervals of occupancy.

In a second category, on the other hand, are many programmable thermostats, which have become more prevalent in recent years in view of Energy Star (US) and TCO (Europe) standards, and which have progressed considerably in the number of different settings for an HVAC system that can be individually manipulated. Unfortunately, however, users are often intimidated by a dizzying array of switches and controls laid out in various configurations on the face of the thermostat or behind a panel door on the thermostat, and seldom adjust the manufacturer defaults to optimize their own energy usage. Thus, even though the installed programmable thermostats in a large number of homes are technologically capable of operating the HVAC equipment with energy-saving profiles, it is often the case that only the one-size-fits-all manufacturer default profiles are ever implemented in a large number of homes. Indeed, in an unfortunately large number of cases, a home user may permanently operate the unit in a "temporary" or "hold" mode, manually manipulating the displayed set temperature as if the unit were a simple, non-programmable thermostat.

Proposals have been made for so-called self-programming thermostats, including a proposal for establishing learned setpoints based on patterns of recent manual user setpoint entries as discussed in US20080191045A1, and including a proposal for automatic computation of a setback schedule based on sensed occupancy patterns in the home as discussed in G. Gao and K. Whitehouse, "The Self-Programming Thermostat: Optimizing Setback Schedules Based on Home Occupancy Patterns," Proceedings of the First ACM Workshop on Embedded Sensing Systems for Energy-Efficiency in Buildings, pp. 67-72, Association for Computing Machinery (November 2009). It has been found, however, that crucial and substantial issues arise when it comes to the practical integration of self-programming behaviors into mainstream residential and/or business use, issues that appear unaddressed and unresolved in such self-programming thermostat proposals. By way of example, just as there are many users who are intimidated by dizzying arrays of controls on user-programmable thermostats, there are also many users who would be equally uncomfortable with a thermostat that fails to give the user a sense of control and self-determination over their own comfort, or that otherwise fails to give confidence to the user that their wishes are indeed being properly accepted and carried out at the proper times. At a more general level, because of the fact that human beings must inevitably be involved, there is a tension that arises between (i) the amount of energy-saving sophistication that can be offered by an HVAC control system, and (ii) the extent to which that energy-saving sophistication can be put to practical, everyday use in a large number of homes. Similar issues arise in the context of multi-unit apartment buildings, hotels, retail stores, office buildings, industrial buildings, and more generally any living space or work space having one or more HVAC systems. It has been found that the user interface of a thermostat, which so often seems to be an afterthought in known commercially available products, represents a crucial link in the successful integration of self-programming thermostats into widespread residential and business use, and that even subtle visual and tactile cues can make a large difference in whether those efforts are successful.

Thus, it would be desirable to provide a thermostat having an improved user interface that is simple, intuitive, elegant, and easy to use such that the typical user is able to access many of the energy-saving and comfort-maintaining features, while at the same time not being overwhelmed by the choices presented. It would be further desirable to provide a user interface for a self-programming or learning thermostat that provides a user setup and learning instantiation process that is relatively fast and easy to complete, while at the same time inspiring confidence in the user that their setpoint wishes will be properly respected. It would be still further desirable to provide a user interface for a self-programming or learning thermostat that provides convenient access to the results of the learning algorithms and methods for fast, intuitive alteration of scheduled setpoints including learned setpoints. It would be even further desirable to provide a user interface for a self-programming or learning thermostat that provides insightful feedback and encouragement regarding energy saving behaviors, performance, and/or results associated with the operation of the thermostat. Notably, although one or more of the embodiments described infra is particularly advantageous when incorporated with a self-programming or learning thermostat, it is to be appreciated that their incorporation into non-learning thermostats can be advantageous as well and is within the scope of the present teachings. Other issues arise as would be apparent to one skilled in the art upon reading the present disclosure.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems and methods for generating and/or displaying a graphical user interface of an electronic device for controlling an energy-consuming system, such as a heating, ventilation, or air conditioning (HVAC) system. The electronic device may include a processor that generates the graphical user interface and an electronic display that displays the graphical user interface. The graphical user interface may include a menu formed from discrete display elements that, owing to the way in which the discrete display elements are shifted into and out of view on the screen, appear to be spatially related to one another. For example, first and second discrete display elements may appear spatially related to one another when the first of the discrete display elements is shifted out of full view and the second of the discrete display elements is shifted into full view.

In another example, a method for providing a graphical user interface of an electronic display of an electronic device that controls a heating, ventilation, or air conditioning (HVAC) system may include, among other things, displaying a screen of a first logical hierarchical level of the graphical user interface. The screen may include a user-selectable option to enter a menu of a second logical hierarchical level of the graphical user interface. The second logical hierarchical level may be lower than the first logical hierarchical level. After receiving an indication of a user selection of the option to enter the menu, a first discrete display element of the menu may be displayed on the electronic display. After receiving an indication of a user navigation from the first discrete display element of the menu to a second discrete display element of the menu, the first discrete display element may be shifted out of full view on the electronic display while the second discrete display element is shifted into full view on the electronic display. The first discrete display element and the second discrete display element may appear to have a spatial relationship to one another at least while being shifted.

In a further example, one or more tangible, non-transitory machine-readable media may include instructions to be carried out on an electronic device that controls a heating, ventilation, or air conditioning (HVAC) system. The instructions may generate a screen of a navigable, ordered series of screens of a graphical user interface configured to be displayed on an electronic display of the electronic device, in which the ordered series of screens includes a first screen and a last screen and each is directly navigable to at least an immediately subsequent one or an immediately prior one of the ordered series of screens. Further, each of the ordered series of screens includes a discrete display element. The instructions may also display the generated screen on the electronic display. In response to user input indicating a desire to navigate from the generated screen to another screen of the ordered series of screens, the instructions may display an animated transition on the electronic display to provide an appearance of a spatial relationship between the respective discrete display elements of the at least one screen and the other screen.

Various refinements of the features noted above may be used in relation to various aspects of the present disclosure. Further features may also be incorporated in these various aspects as well. These refinements and additional features may be used individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIGS. 8A-C show example screens of a rotating main menu on a user-friendly a programmable thermostat, according to some preferred embodiments;

FIGS. 19A-F illustrates how other thermostat settings can be made using a user interface, according to some embodiments;

FIG. 25 illustrates one application of a heuristic for affirmatively identifying a display element on a circular menu in accordance with some embodiments;

DETAILED DESCRIPTION

Figure 1:
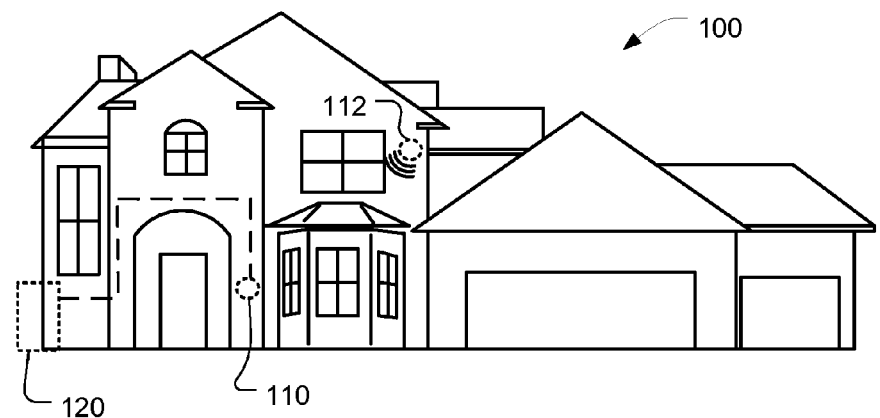
FIG. 1 is a diagram of an enclosure in which environmental conditions are controlled, according to some embodiments.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein the term "HVAC" includes systems providing both heating and cooling, heating only, cooling only, as well as systems that provide other occupant comfort and/or conditioning functionality such as humidification, dehumidification and ventilation.

As used herein the terms power "harvesting," "sharing" and "stealing" when referring to HVAC thermostats all refer to the thermostat are designed to derive power from the power transformer through the equipment load without using a direct or common wire source directly from the transformer.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "thermostat" means a device or system for regulating parameters such as temperature and/or humidity within at least a part of an enclosure. The term "thermostat" may include a control unit for a heating and/or cooling system or a component part of a heater or air conditioner. As used herein the term "thermostat" can also refer generally to a versatile sensing and control unit (VSCU unit) that is configured and adapted to provide sophisticated, customized, energy-saving HVAC control functionality while at the same time being visually appealing, non-intimidating, elegant to behold, and delightfully easy to use.

FIG. 1 is a diagram of an enclosure in which environmental conditions are controlled, according to some embodiments. Enclosure 100, in this example is a single-family dwelling. According to other embodiments, the enclosure can be, for example, a duplex, an apartment within an apartment building, a light commercial structure such as an office or retail store, or a structure or enclosure that is a combination of the above. Thermostat 110 controls HVAC system 120 as will be described in further detail below. According to some embodiments, the HVAC system 120 is has a cooling capacity less than about 5 tons. According to some embodiments, a remote device 112 wirelessly communicates with the thermostat 110 and can be used to display information to a user and to receive user input from the remote location of the device 112. Although many of the embodiments are described herein as being carried out by a thermostat such as thermostat 110, according to some embodiments, the same or similar techniques are employed using a remote device such as device 112.

Figure 2:
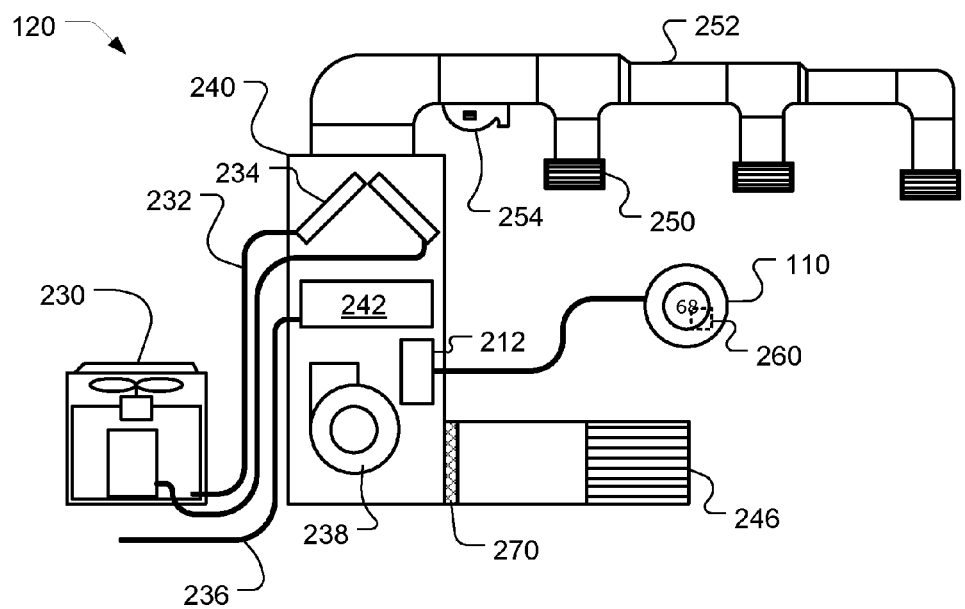
FIG. 2 is a diagram of an HVAC system, according to some embodiments.

FIG. 2 is a diagram of an HVAC system, according to some embodiments. HVAC system 120 provides heating, cooling, ventilation, and/or air handling for the enclosure, such as a single-family home 100 depicted in FIG. 1. The system 120 depicts a forced air type heating system, although according to other embodiments, other types of systems could be used. In heating, heating coils or elements 242 within air handler 240 provide a source of heat using electricity or gas via line 236. Cool air is drawn from the enclosure via return air duct 246 through filter 270, using fan 238 and is heated heating coils or elements 242. The heated air flows back into the enclosure at one or more locations via supply air duct system 252 and supply air grills such as grill 250. In cooling, an outside compressor 230 passes gas such a Freon through a set of heat exchanger coils to cool the gas. The gas then goes to the cooling coils 234 in the air handlers 240 where it expands, cools and cools the air being circulated through the enclosure via fan 238. According to some embodiments a humidifier 254 is also provided. Although not shown in FIG. 2, according to some embodiments the HVAC system has other known functionality such as venting air to and from the outside, and one or more dampers to control airflow within the duct systems. The system is controlled by control electronics 212 whose operation is governed by a thermostat such as the thermostat 110. Thermostat 110 controls the HVAC system 120 through a number of control circuits. Thermostat 110 also includes a processing system 260 such as a microprocessor that is adapted and programmed to controlling the HVAC system and to carry out the techniques described in detail herein.

Figure 3A:
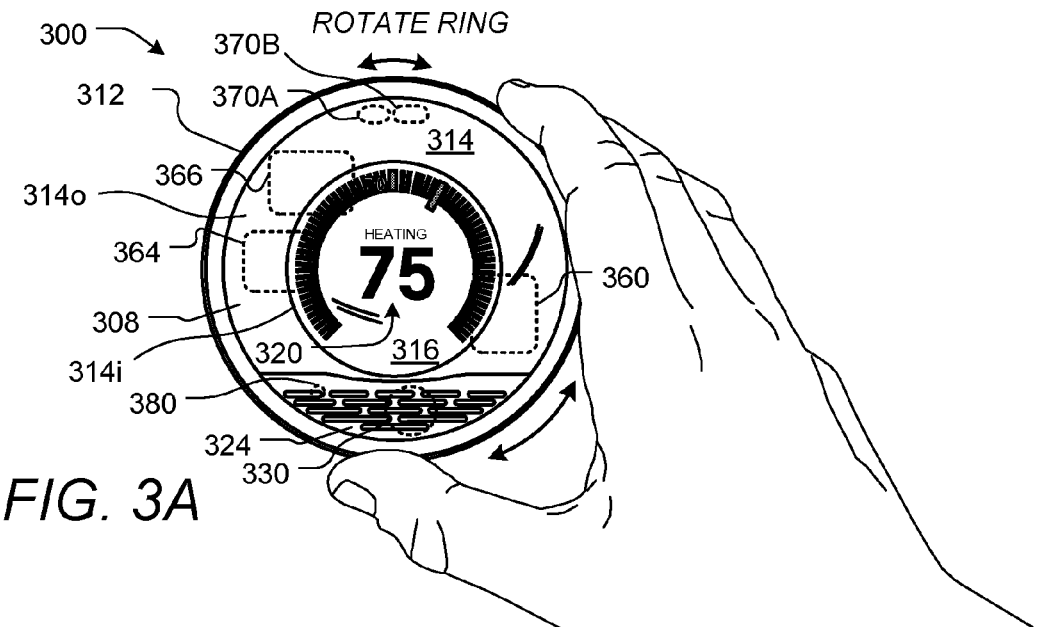
FIGS. 3A-3B illustrate a thermostat having a user-friendly interface, according to some embodiments.
Figure 3B:
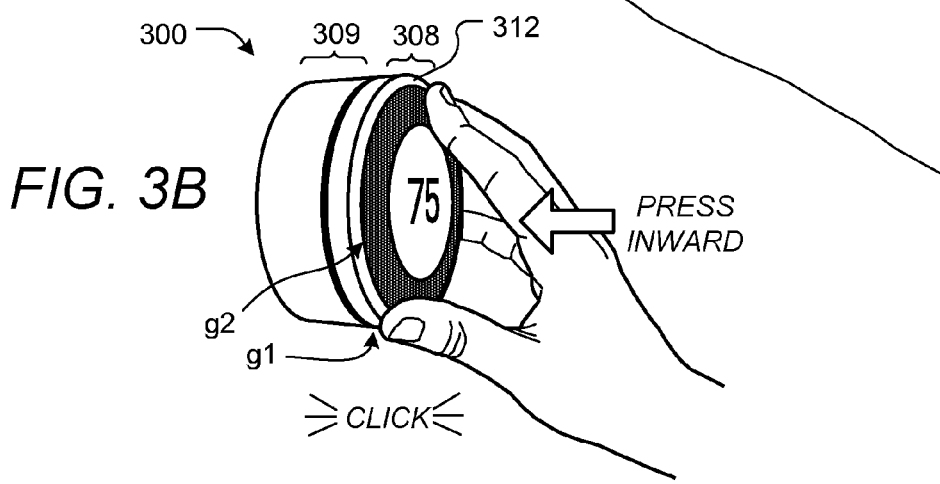

FIGS. 3A-B illustrate a thermostat having a user-friendly interface, according to some embodiments. Unlike many prior art thermostats, thermostat 300 preferably has a sleek, simple, uncluttered and elegant design that does not detract from home decoration, and indeed can serve as a visually pleasing centerpiece for the immediate location in which it is installed. Moreover, user interaction with thermostat 300 is facilitated and greatly enhanced over known conventional thermostats by the design of thermostat 300. The thermostat 300 includes control circuitry and is electrically connected to an HVAC system, such as is shown with thermostat 110 in FIGS. 1 and 2. Thermostat 300 is wall mounted, is circular in shape, and has an outer rotatable ring 312 for receiving user input. Thermostat 300 is circular in shape in that it appears as a generally disk-like circular object when mounted on the wall. Thermostat 300 has a large front face lying inside the outer ring 312. According to some embodiments, thermostat 300 is approximately 80 mm in diameter. The outer rotatable ring 312 allows the user to make adjustments, such as selecting a new target temperature. For example, by rotating the outer ring 312 clockwise, the target temperature can be increased, and by rotating the outer ring 312 counter-clockwise, the target temperature can be decreased. The front face of the thermostat 300 comprises a clear cover 314 that according to some embodiments is polycarbonate, and a metallic portion 324 preferably having a number of slots formed therein as shown. According to some embodiments, the surface of cover 314 and metallic portion 324 form a common outward arc or spherical shape gently arcing outward, and this gentle arcing shape is continued by the outer ring 312.

Although being formed from a single lens-like piece of material such as polycarbonate, the cover 314 has two different regions or portions including an outer portion 314o and a central portion 314i. According to some embodiments, the cover 314 is painted or smoked around the outer portion 314o, but leaves the central portion 314i visibly clear so as to facilitate viewing of an electronic display 316 disposed thereunderneath. According to some embodiments, the curved cover 314 acts as a lens that tends to magnify the information being displayed in electronic display 316 to users. According to some embodiments the central electronic display 316 is a dot-matrix layout (individually addressable) such that arbitrary shapes can be generated, rather than being a segmented layout. According to some embodiments, a combination of dot-matrix layout and segmented layout is employed. According to some embodiments, central display 316 is a backlit color liquid crystal display (LCD). An example of information displayed on the electronic display 316 is illustrated in FIG. 3A, and includes central numerals 320 that are representative of a current setpoint temperature. According to some embodiments, metallic portion 324 has number of slot-like openings so as to facilitate the use of a passive infrared motion sensor 330 mounted therebeneath. The metallic portion 324 can alternatively be termed a metallic front grille portion. Further description of the metallic portion/front grille portion is provided in the commonly assigned U.S. Ser. No. 13/199,108, supra. The thermostat 300 is preferably constructed such that the electronic display 316 is at a fixed orientation and does not rotate with the outer ring 312, so that the electronic display 316 remains easily read by the user. For some embodiments, the cover 314 and metallic portion 324 also remain at a fixed orientation and do not rotate with the outer ring 312. According to one embodiment in which the diameter of the thermostat 300 is about 80 mm, the diameter of the electronic display 316 is about 45 mm. According to some embodiments an LED indicator 380 is positioned beneath portion 324 to act as a low-power-consuming indicator of certain status conditions. For, example the LED indicator 380 can be used to display blinking red when a rechargeable battery of the thermostat (see FIG. 4A, infra) is very low and is being recharged. More generally, the LED indicator 380 can be used for communicating one or more status codes or error codes by virtue of red color, green color, various combinations of red and green, various different blinking rates, and so forth, which can be useful for troubleshooting purposes.

Motion sensing as well as other techniques can be use used in the detection and/or predict of occupancy, as is described further in the commonly assigned U.S. Ser. No. 12/881,430, supra. According to some embodiments, occupancy information is used in generating an effective and efficient scheduled program. Preferably, an active proximity sensor 370A is provided to detect an approaching user by infrared light reflection, and an ambient light sensor 370B is provided to sense visible light. The proximity sensor 370A can be used to detect proximity in the range of about one meter so that the thermostat 300 can initiate "waking up" when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place our about to take place. The ambient light sensor 370B can be used for a variety of intelligence-gathering purposes, such as for facilitating confirmation of occupancy when sharp rising or falling edges are detected (because it is likely that there are occupants who are turning the lights on and off), and such as for detecting long term (e.g., 24-hour) patterns of ambient light intensity for confirming and/or automatically establishing the time of day.

According to some embodiments, for the combined purposes of inspiring user confidence and further promoting visual and functional elegance, the thermostat 300 is controlled by only two types of user input, the first being a rotation of the outer ring 312 as shown in FIG. 3A (referenced hereafter as a "rotate ring" or "ring rotation" input), and the second being an inward push on an outer cap 308 (see FIG. 3B) until an audible and/or tactile "click" occurs (referenced hereafter as an "inward click" or simply "click" input). For the embodiment of FIGS. 3A-3B, the outer cap 308 is an assembly that includes all of the outer ring 312, cover 314, electronic display 316, and metallic portion 324. When pressed inwardly by the user, the outer cap 308 travels inwardly by a small amount, such as 0.5 mm, against an interior metallic dome switch (not shown), and then springably travels back outwardly by that same amount when the inward pressure is released, providing a satisfying tactile "click" sensation to the user's hand, along with a corresponding gentle audible clicking sound. Thus, for the embodiment of FIGS. 3A-3B, an inward click can be achieved by direct pressing on the outer ring 312 itself, or by indirect pressing of the outer ring by virtue of providing inward pressure on the cover 314, metallic portion 314, or by various combinations thereof. For other embodiments, the thermostat 300 can be mechanically configured such that only the outer ring 312 travels inwardly for the inward click input, while the cover 314 and metallic portion 324 remain motionless. It is to be appreciated that a variety of different selections and combinations of the particular mechanical elements that will travel inwardly to achieve the "inward click" input are within the scope of the present teachings, whether it be the outer ring 312 itself, some part of the cover 314, or some combination thereof. However, it has been found particularly advantageous to provide the user with an ability to quickly go back and forth between registering "ring rotations" and "inward clicks" with a single hand and with minimal amount of time and effort involved, and so the ability to provide an inward click directly by pressing the outer ring 312 has been found particularly advantageous, since the user's fingers do not need to be lifted out of contact with the device, or slid along its surface, in order to go between ring rotations and inward clicks. Moreover, by virtue of the strategic placement of the electronic display 316 centrally inside the rotatable ring 312, a further advantage is provided in that the user can naturally focus their attention on the electronic display throughout the input process, right in the middle of where their hand is performing its functions. The combination of intuitive outer ring rotation, especially as applied to (but not limited to) the changing of a thermostat's setpoint temperature, conveniently folded together with the satisfying physical sensation of inward clicking, together with accommodating natural focus on the electronic display in the central midst of their fingers' activity, adds significantly to an intuitive, seamless, and downright fun user experience. Further descriptions of advantageous mechanical user-interfaces and related designs, which are employed according to some embodiments, can be found in U.S. Ser. No. 13/033,573, supra, U.S. Ser. No. 29/386,021, supra, and U.S. Ser. No. 13/199,108, supra.

Figure 3C:
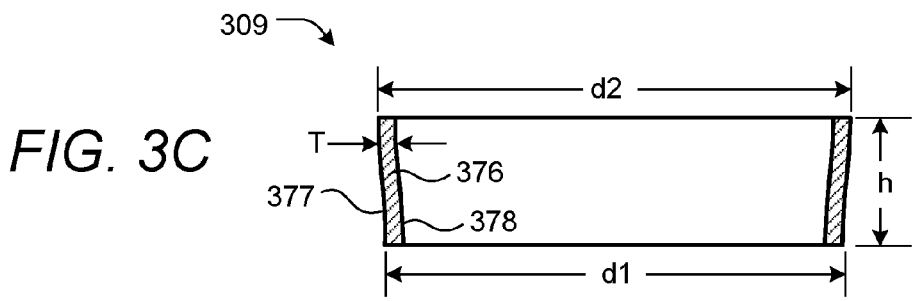
FIG. 3C illustrates a cross-sectional view of a shell portion of a frame of the thermostat of FIGS. 3A-3B.

FIG. 3C illustrates a cross-sectional view of a shell portion 309 of a frame of the thermostat of FIGS. 3A-B, which has been found to provide a particularly pleasing and adaptable visual appearance of the overall thermostat 300 when viewed against a variety of different wall colors and wall textures in a variety of different home environments and home settings. While the thermostat itself will functionally adapt to the user's schedule as described herein and in one or more of the commonly assigned incorporated applications, supra, the outer shell portion 309 is specially configured to convey a "chameleon" quality or characteristic such that the overall device appears to naturally blend in, in a visual and decorative sense, with many of the most common wall colors and wall textures found in home and business environments, at least in part because it will appear to assume the surrounding colors and even textures when viewed from many different angles. The shell portion 309 has the shape of a frustum that is gently curved when viewed in cross-section, and comprises a sidewall 376 that is made of a clear solid material, such as polycarbonate plastic. The sidewall 376 is backpainted with a substantially flat silver- or nickel-colored paint, the paint being applied to an inside surface 378 of the sidewall 376 but not to an outside surface 377 thereof. The outside surface 377 is smooth and glossy but is not painted. The sidewall 376 can have a thickness T of about 1.5 mm, a diameter d1 of about 78.8 mm at a first end that is nearer to the wall when mounted, and a diameter d2 of about 81.2 mm at a second end that is farther from the wall when mounted, the diameter change taking place across an outward width dimension "h" of about 22.5 mm, the diameter change taking place in either a linear fashion or, more preferably, a slightly nonlinear fashion with increasing outward distance to form a slightly curved shape when viewed in profile, as shown in FIG. 3C. The outer ring 312 of outer cap 308 is preferably constructed to match the diameter d2 where disposed near the second end of the shell portion 309 across a modestly sized gap g1 therefrom, and then to gently arc back inwardly to meet the cover 314 across a small gap g2. It is to be appreciated, of course, that FIG. 3C only illustrates the outer shell portion 309 of the thermostat 300, and that there are many electronic components internal thereto that are omitted from FIG. 3C for clarity of presentation, such electronic components being described further hereinbelow and/or in other ones of the commonly assigned incorporated applications, such as U.S. Ser. No. 13/199,108, supra.

According to some embodiments, the thermostat 300 includes a processing system 360, display driver 364 and a wireless communications system 366. The processing system 360 is adapted to cause the display driver 364 and display area 316 to display information to the user, and to receiver user input via the rotatable ring 312. The processing system 360, according to some embodiments, is capable of carrying out the governance of the operation of thermostat 300 including the user interface features described herein. The processing system 360 is further programmed and configured to carry out other operations as described further hereinbelow and/or in other ones of the commonly assigned incorporated applications. For example, processing system 360 is further programmed and configured to maintain and update a thermodynamic model for the enclosure in which the HVAC system is installed, such as described in U.S. Ser. No. 12/881,463, supra. According to some embodiments, the wireless communications system 366 is used to communicate with devices such as personal computers and/or other thermostats or HVAC system components, which can be peer-to-peer communications, communications through one or more servers located on a private network, or and/or communications through a cloud-based service.

Figure 4:
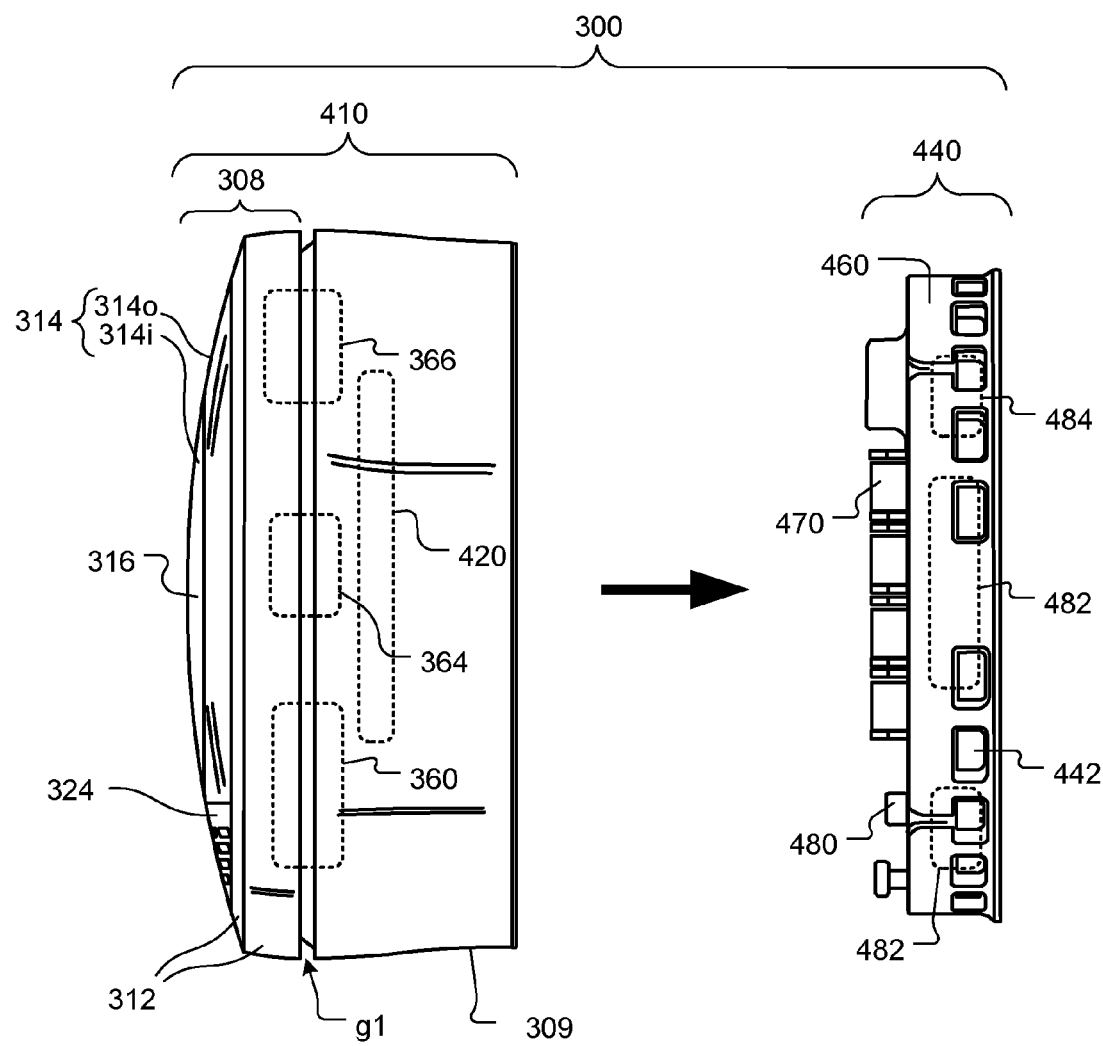
FIG. 4 illustrates a thermostat having a head unit and a backplate (or wall dock) for ease of installation, configuration and upgrading, according to some embodiments.

FIG. 4 illustrates a side view of the thermostat 300 including a head unit 410 and a backplate (or wall dock) 440 thereof for ease of installation, configuration and upgrading, according to some embodiments. As is described hereinabove, thermostat 300 is wall mounted and has circular in shape and has an outer rotatable ring 312 for receiving user input. Head unit 410 includes the outer cap 308 that includes the cover 314 and electronic display 316. Head unit 410 of round thermostat 300 is slidably mountable onto back plate 440 and slidably detachable therefrom. According to some embodiments the connection of the head unit 410 to backplate 440 can be accomplished using magnets, bayonet, latches and catches, tabs or ribs with matching indentations, or simply friction on mating portions of the head unit 410 and backplate 440. According to some embodiments, the head unit 410 includes a processing system 360, display driver 364 and a wireless communications system 366. Also shown is a rechargeable battery 420 that is recharged using recharging circuitry 422 that uses power from backplate that is either obtained via power harvesting (also referred to as power stealing and/or power sharing) from the HVAC system control circuit(s) or from a common wire, if available, as described in further detail in co-pending patent application U.S. Ser. Nos. 13/034,674, and 13/034,678, which are incorporated by reference herein. According to some embodiments, rechargeable battery 420 is a single cell lithium-ion, or a lithium-polymer battery.

Backplate 440 includes electronics 482 and a temperature/humidity sensor 484 in housing 460, which are ventilated via vents 442. Two or more temperature sensors (not shown) are also located in the head unit 410 and cooperate to acquire reliable and accurate room temperature data. Wire connectors 470 are provided to allow for connection to HVAC system wires. Connection terminal 480 provides electrical connections between the head unit 410 and backplate 440. Backplate electronics 482 also includes power sharing circuitry for sensing and harvesting power available power from the HVAC system circuitry.

Figure 5A:
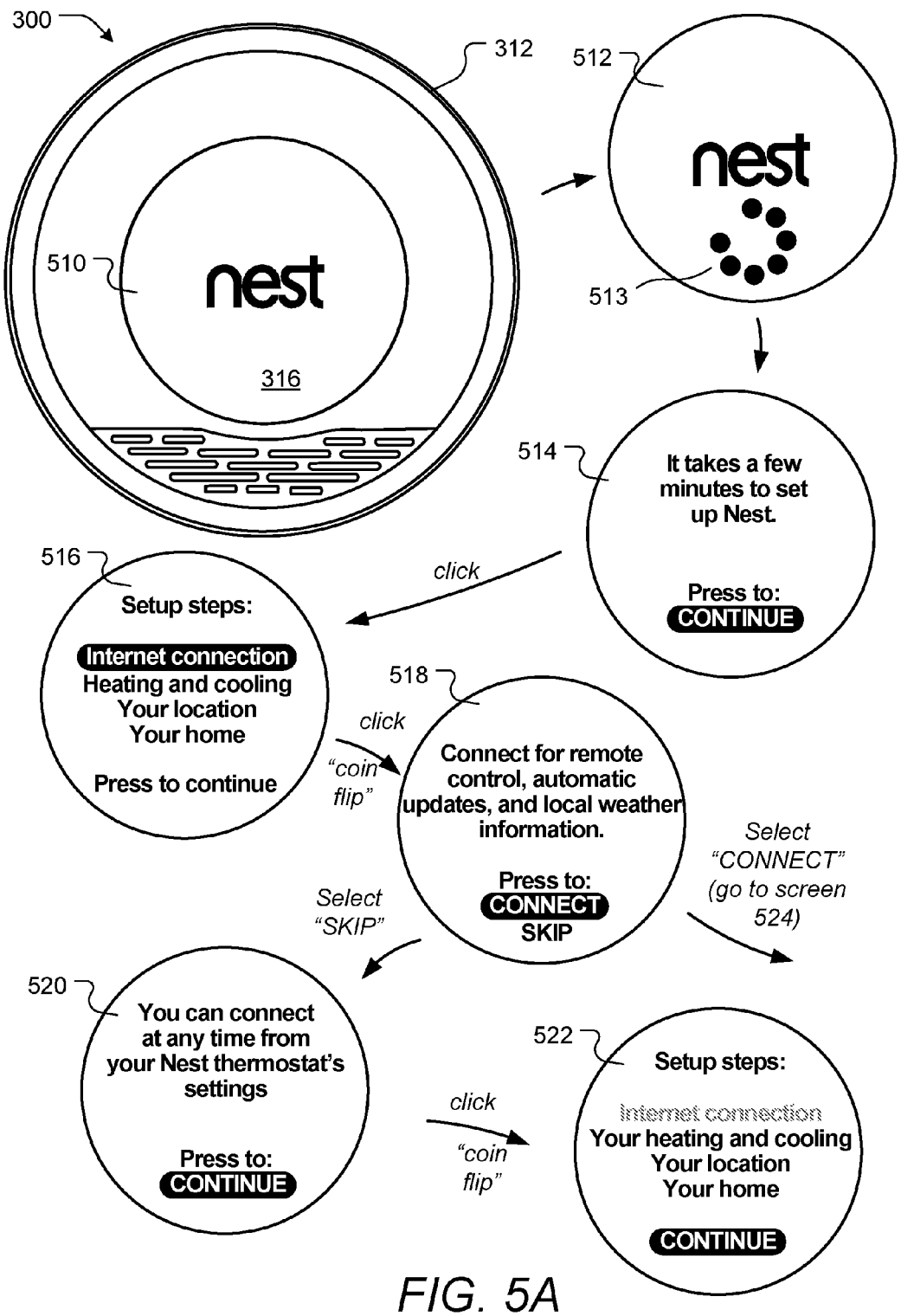
FIGS. 5A-F and 6A-D illustrate display screens on a user-friendly graphical user interface for a programmable thermostat upon initial set up, according to some embodiments.

FIGS. 5A-F and 6A-D are display output flow diagrams illustrating a user-friendly graphical user interface for a programmable thermostat upon initial set up, according to some embodiments. The initial setup flow takes place, for example, when the thermostat 300 is removed from the box for the first time, or after a factory default reset instruction is made. The screens shown, according to some embodiments, are displayed on the thermostat 300 on round dot-matrix electronic display 316 having a rotatable ring 312, such as shown and described supra with respect to FIGS. 3A-4. In FIG. 5A, the thermostat 300 with electronic display 316 shows a logo screen 510 upon initial startup. The logo screen 510 adds a spinner icon 513 in screen 512 to indicate to the user that the boot up process is progressing. According to some embodiments, information such as to inform the user of aspects of the thermostat 300 or aspects of the manufacturer is displayed to the user during the booting process. After booting, the screen 514 is displayed to inform the used that the initial setup process may take a few minutes. The user acknowledges the message by an inward click command, after which screen 516 is displayed. Screen 516 allows the user to select, via the rotatable ring, one of four setup steps. According to some embodiments, the user is not allowed to select the order of the set up steps, but rather the list of four steps is shown so that the user has an indication of current progress within the setup process. According to some preferred embodiments, the user can select either the next step in the progression, or any step that has already been completed (so as to allow re-doing of steps), but is not allowed to select a future step out of order (so as to prevent the user from inadvertently skipping any steps). According to one embodiment, the future steps that are not allowed yet are shown in a more transparent (or "greyed") color so as to indicate their current unavailability. In this case a click leads to screen 518, which asks the user to connect to the internet to establish and/or confirm their unique cloud-based service account for features such as remote control, automatic updates and local weather information.

According to some embodiments, the transitions between some screens use a "coin flip" transition, and/or a translation or shifting of displayed elements as described in U.S. patent application Ser. No. 13/033,573, supra. The animated "coin flip" transition between progressions of thermostat display screens, which is also illustrated in the commonly assigned U.S. Ser. No. 29/399,625, supra, has been found to be advantageous in providing a pleasing and satisfying user experience, not only in terms of intrinsic visual delight, but also because it provides a unique balance between logical segregation (a sense that one is moving on to something new) and logical flow (a sense of connectedness and causation between the previous screen and the next screen). Although the type of transitions may not all be labeled in the figures herein, it is understood that different types of screen-to-screen transitions could be used so as to enhance the user interface experience for example by indicating to the user a transition to a different step or setting, or a return to a previous screen or menu.

In screen 518, the user proceeds to the connection setup steps by selecting "CONNECT" with the rotatable ring followed by an inward click. Selecting "CONNECT" causes the thermostat 300 to scan for wireless networks and then to display screen 524 in FIG. 5B. If the user selects "SKIP," then screen 520 is displayed, which informs the user that they can connect at any time from the settings menu. The user acknowledges this by clicking, which leads to screen 522. In screen 522, the first step "Internet Connection" is greyed out, which indicates that this step has been intentionally skipped.

Figure 5B:
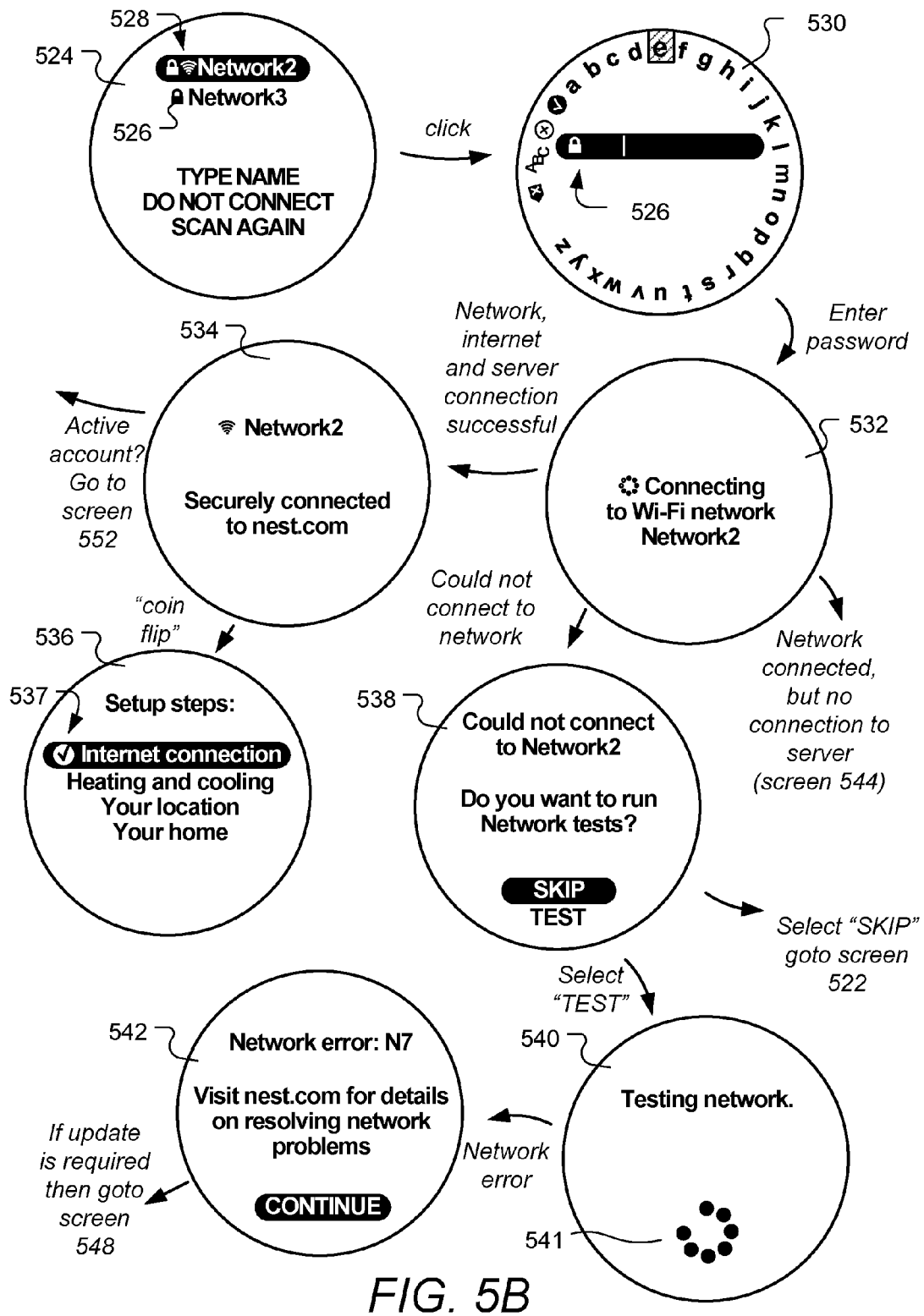

In FIG. 5B, screen 524 is shown after a scan is made for wireless networks (e.g. using Wi-Fi or ZigBee wireless communication). In the example shown in screen 524, two wireless networks have been found and are displayed: "Network2" and "Network3." The electronic display 316 preferably also includes a lock icon 526 to show that the network uses password security, and also can show a wireless icon 528 to indicate the wireless connection to the network. According to some embodiments, wireless signal icon 528 can show a number of bars that indicates relative signal strength associated with that network. If the user selects one of the found networks that requires a password, screen 530 is displayed to obtain the password from the user. Screen 530 uses an alphanumeric input interface where the user selects and enters characters by rotating the ring and clicking. Further details of this type of data entry interface is described in the commonly assigned U.S. Ser. No. 13/033,573, supra. The user is reminded that a password is being entered by virtue of the lock icon 526. After the password is entered, screen 532 is displayed while the thermostat tries to establish a connection to the indicated Wi-Fi network. If the network connection is established and the internet is available, then the thermostat attempts to connect to the manufacturer's server. A successful connection to the server is shown in screen 534. After a pause (or a click to acknowledge) screen 536 is displayed that indicates that the internet connection setup step has been successfully completed. According to some embodiments, a checkmark icon 537 is used to indicate successful completion of the step.

If no connection to the selected local network could be established, screen 538 is displayed notifying the user of such and asking if a network testing procedure should be carried out. If the user selects "TEST," then screen 540, with a spinner icon 541, is displayed while a network test is carried out. If the test discovers an error, a screen such as screen 542 is displayed to indicate the nature of the errors. According to some embodiments, the user is directed to further resources online for more detailed support.

Figure 5C:
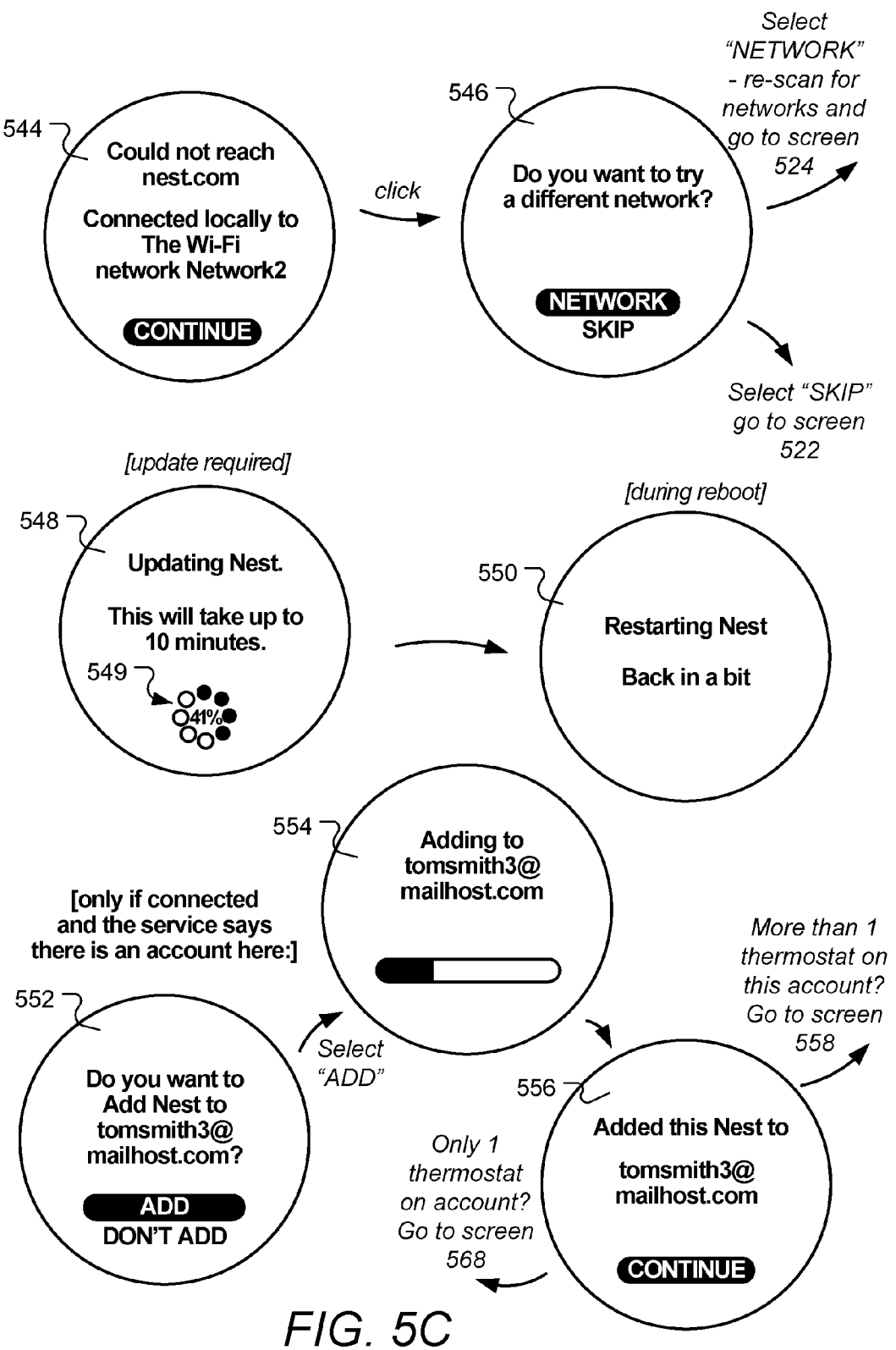

If the local network connection was successful, but no connection to the manufacturer's server could be established then, in FIG. 5C, screen 544, the user is notified of the status and acknowledges by clicking "CONTINUE." In screen 546, the user is asked if they wish to try a different network. If the user selects "NETWORK," then the thermostat scans for available networks and then moves to screen 524. If the user selects "SKIP," then screen 522 is displayed.

Under some circumstances, for example following a network test (screen 540) the system determines that a software and/or firmware update is needed. In such cases, screen 548 is displayed while the update process is carried out. Since some processes, such as downloading and installing updates, can take a relatively long time, a notice combined with a spinner 549 having a percent indicator can be shown to keep the user informed of the progress. Following the update, the system usually needs to be rebooted. Screen 550 informs the user of this.

Figure 5D:
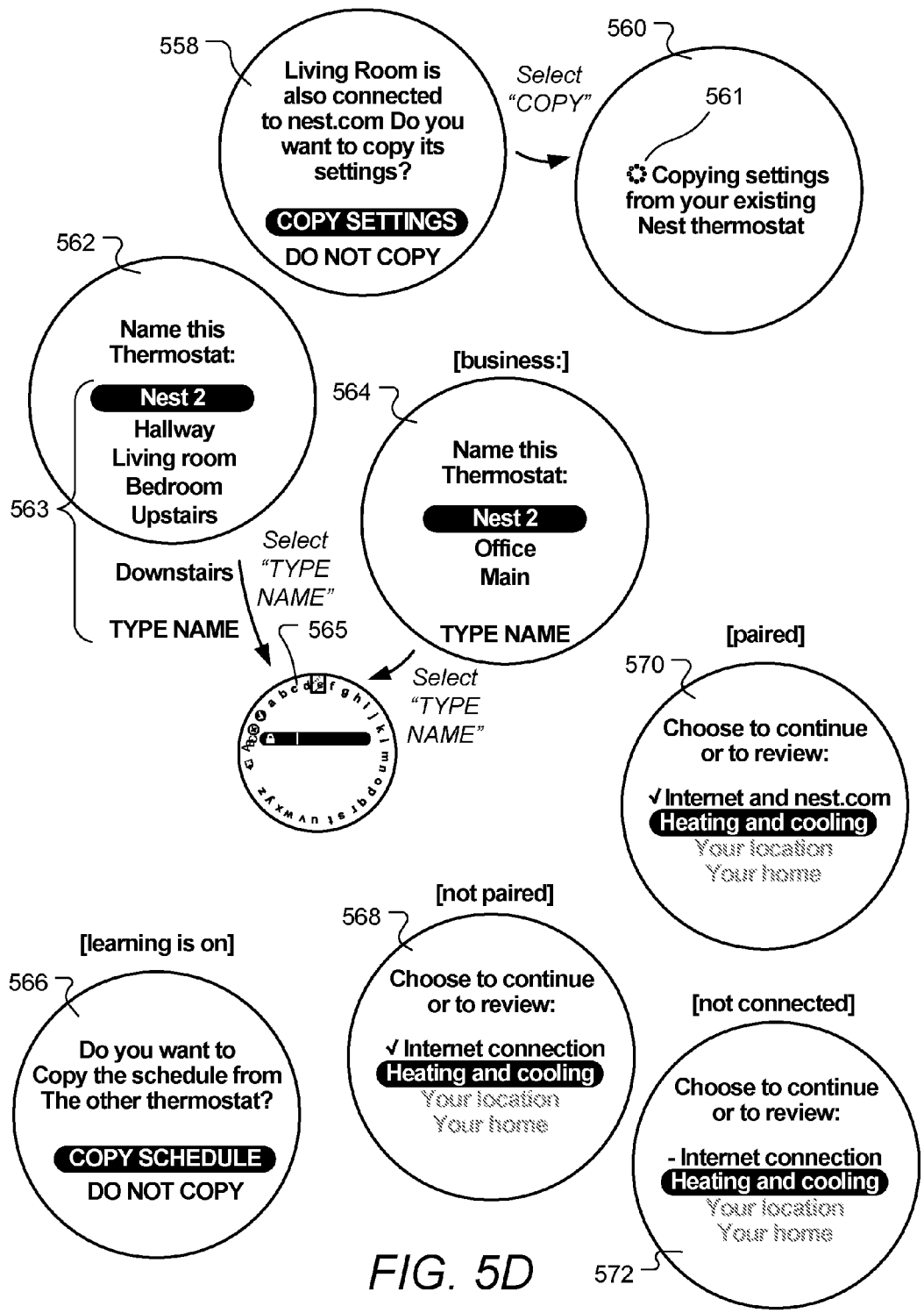

According to some embodiments, in cases where more than one thermostat is located in the same dwelling or business location, the units can be associated with one another as both being paired to the user's account on a cloud-based management server. When a successful network and server connection is established (screen 534), and if the server notes that there is already an online account associated with the current location by comparison of a network address of the thermostat 300 with that of other currently registered thermostats, then screen 552 is displayed, asking the user if they want to add the current thermostat to the existing account. If the user selects "ADD," the thermostat is added to the existing account as shown in screens 554 and 556. After adding the current thermostat to the online account. If there is more than one thermostat on the account a procedure is offered to copy settings, beginning with screen 558. In FIG. 5D, screen 558 notifies the user that another thermostat, in this case named "Living Room," is also associated with the user's account, and asks the user if the settings should be copies. If the user selects "COPY SETTINGS" then the screen 560 is displayed with a spinner 561 while settings are copied to the new thermostat. According to some embodiments, one or more of the following settings are copied: account pairing, learning preferences (e.g. "learning on" or "learning off"), heating or cooling mode (if feasible), location, setup interview answers, current schedule and off-season schedule (if any).

Advantageous functionalities can be provided by two different instances of the thermostat unit 300 located in a common enclosure, such as a family home, that are associated with a same user account in the cloud-based management server, such as the account "tomsmith3@mailhost.com" in FIGS. 5C-5D. For purposes of the present description it can be presumed that each thermostat is a "primary" thermostat characterized in that it is connected to an HVAC system and is responsible for controlling that HVAC system, which can be distinguished from an "auxiliary" thermostat having many of the same sensing and processing capabilities of the thermostat 300 except that an "auxiliary" thermostat does not connect to an HVAC system, but rather influences the operation of one or more HVAC systems by virtue of its direct or indirect communication with one or more primary thermostats. However, the scope of the present disclosure is not so limited, and thus in other embodiments there can be cooperation among various combinations of primary and/or auxiliary thermostats.

A particular enclosure, such as a family home, can use two primary thermostats 300 where there are two different HVAC systems to control, such as a downstairs HVAC system located on a downstairs floor and an upstairs HVAC system located on an upstairs floor. Where the thermostats have become logically associated with a same user account at the cloud-based management server, such as by operation of the screens 552, 554, 556, the two thermostats advantageously cooperate with one another in providing optimal HVAC control of the enclosure as a whole. Such cooperation between the two thermostats can be direct peer-to-peer cooperation, or can be supervised cooperation in which the central cloud-based management server supervises them as one or more of a master, referee, mediator, arbitrator, and/or messenger on behalf of the two thermostats. In one example, an enhanced auto-away capability is provided, wherein an "away" mode of operation is invoked only if both of the thermostats have sensed a lack of activity for a requisite period of time. For one embodiment, each thermostat will send an away-state "vote" to the management server if it has detected inactivity for the requisite period, but will not go into an "away" state until it receives permission to do so from the management server. In the meantime, each thermostat will send a revocation of its away-state vote if it detects occupancy activity in the enclosure. The central management server will send away-state permission to both thermostats only if there are current away-state votes from each of them. Once in the collective away-state, if either thermostat senses occupancy activity, that thermostat will send a revocation to the cloud-based management server, which in turn will send away-state permission revocation (or an "arrival" command) to both of the thermostats. Many other types of cooperation among the commonly paired thermostats (i.e., thermostats associated with the same account at the management server) can be provided without departing from the scope of the present teachings.

Where there is more than one thermostat for a particular enclosure and those thermostats are associated with the same account on the cloud-based management server, one preferred method by which that group of thermostats can cooperate to provide enhanced auto-away functionality is as follows. Each thermostat maintains a group state information object that includes (i) a local auto-away-ready (AAR) flag that reflects whether that individual thermostat considers itself to be auto-away ready, and (ii) one or more peer auto-away-ready (AAR) flags that reflect whether each other thermostat in the group considers itself to be auto-away ready. The local AAR flag for each thermostat appears as a peer AAR flag in the group state information object of each other thermostat in the group. Each thermostat is permitted to change its own local AAR flag, but is only permitted to read its peer AAR flags. It is a collective function of the central cloud-based management server and the thermostats to communicate often enough such that the group state information object in each thermostat is maintained with fresh information, and in particular that the peer AAR flags are kept fresh. This can be achieved, for example, by programming each thermostat to immediately communicate any change in its local AAR flag to the management server, at which time the management server can communicate that change immediately with each other thermostat in the group to update the corresponding peer AAR flag. Other methods of direct peerto-peer communication among the thermostats can also be used without departing from the scope of the present teachings.

According to a preferred embodiment, the thermostats operate in a consensus mode such that each thermostat will only enter into an actual "away" state if all of the AAR flags for the group are set to "yes" or "ready". Therefore, at any particular point in time, either all of the thermostats in the group will be in an "away" state, or none of them will be in the "away" state. In turn, each thermostat is configured and programmed to set its AAR flag to "yes" if either or both of two sets of criteria are met. The first set of criteria is met when all of the following are true: (i) there has been a period of sensed inactivity for a requisite inactivity interval according to that thermostat's sensors such as its passive infrared (PIR) motion sensors, active infrared proximity sensors (PROX), and other occupancy sensors with which it may be equipped; (ii) the thermostat is "auto-away confident" in that it has previously qualified itself as being capable of sensing statistically meaningful occupant activity at a statistically sufficient number of meaningful times, and (iii) other basic "reasonableness criteria" for going into an auto-away mode are met, such as (a) the auto-away function was not previously disabled by the user, (b) the time is between 8 AM and 8 PM if the enclosure is not a business, (c) the thermostat is not in OFF mode, (d) the "away" state temperature is more energy-efficient than the current setpoint temperature, and (e) the user is not interacting with the thermostat remotely through the cloud-based management server. The second set of criteria is met when all of the following are true: (i) there has been a period of sensed inactivity for a requisite inactivity interval according to that thermostat's sensors, (ii) the AAR flag of at least one other thermostat in the group is "yes", and (iii) the above-described "reasonableness" criteria are all met. Advantageously, by special virtue of the second set of alternative criteria by which an individual thermostat can set its AAR flag to "yes", it can be the case that all of the thermostats in the group can contribute the benefits of their occupancy sensor data to the group auto-away determination, even where one or more of them are not "auto-away confident," as long as there is at least one member that is "auto-away confident." This method has been found to increase both the reliability and scalability of the energy-saving auto-away feature, with reliability being enhanced by virtue of multiple sensor locations around the enclosure, and with scalability being enhanced in that the "misplacement" of one thermostat (for example, installed at an awkward location behind a barrier that limits PIR sensitivity) causing that thermostat to be "away non-confident" will not jeopardize the effectiveness or applicability of the group consensus as a whole.

It is to be appreciated that the above-described method is readily extended to the case where there are multiple primary thermostats and/or multiple auxiliary thermostats. It is to be further appreciated that, as the term primary thermostat is used herein, it is not required that there be a one-to-one correspondence between primary thermostats and distinct HVAC systems in the enclosure. For example, there are many installations in which plural "zones" in the enclosure may be served by a single HVAC system by virtue of controllable dampers that can stop and/or redirect airflow to and among the different zones from the HVAC system. In such cases, there can be a primary thermostat for each zone, each of the primary thermostats being wired to the HVAC system as well as to the appropriate dampers to regulate the climate of its respective zone.

Referring now again to FIG. 5D, in screen 562 a name is entered for the thermostat, assuming the thermostat is being installed in a dwelling rather than in a business. The list of choices 563 is larger than the screen allows, so according to some embodiments the list 563 scrolls up and down responsive to user ring rotation so the user can view all the available choices. For purposes of clarity of description, it is to be appreciated that when a listing of menu choices is illustrated in the drawings of the present disclosure as going beyond the spatial limits of a screen, such as shown with listing 563 of screen 562, those menu choices will automatically scroll up and down as necessary to be viewable by the user as they rotate the rotatable ring 312. The available choices of names in this case are shown, including an option to enter a custom name (by selecting "TYPE NAME"). The first entry "Nest 2" is a generic thermostat name, and assumes there is already a thermostat on the account named "Nest 1." If there already is a "Nest 2" thermostat then the name "Nest 3" will be offered, and so on. If the user selects "TYPE NAME," then a character entry user interface 565 is used to enter a name. Screen 564 shows a thermostat naming screen analogous to screen 562 except that is represents a case in which the thermostat 300 is being installed in a business rather than a dwelling. Screen 566 is displayed when thermostat learning (or self-programming) features are turned "on." In this case the user is asked if the current schedule from the other thermostat should be copied. Screens 568, 570 and 572 show what is displayed after completion of the Internet connection, server connection and pairing procedures are completed. Screen 568 is used in the case there an Internet connection is established, but no pairing is made with a user account on the server. Screen 570 is used in the case where both an Internet connection and pairing the user's account on the server is established. Finally, screen 572 is used in the case where no internet connection was successfully established. In all cases the next setup topic is "Heating and Cooling."

Figure 5E:
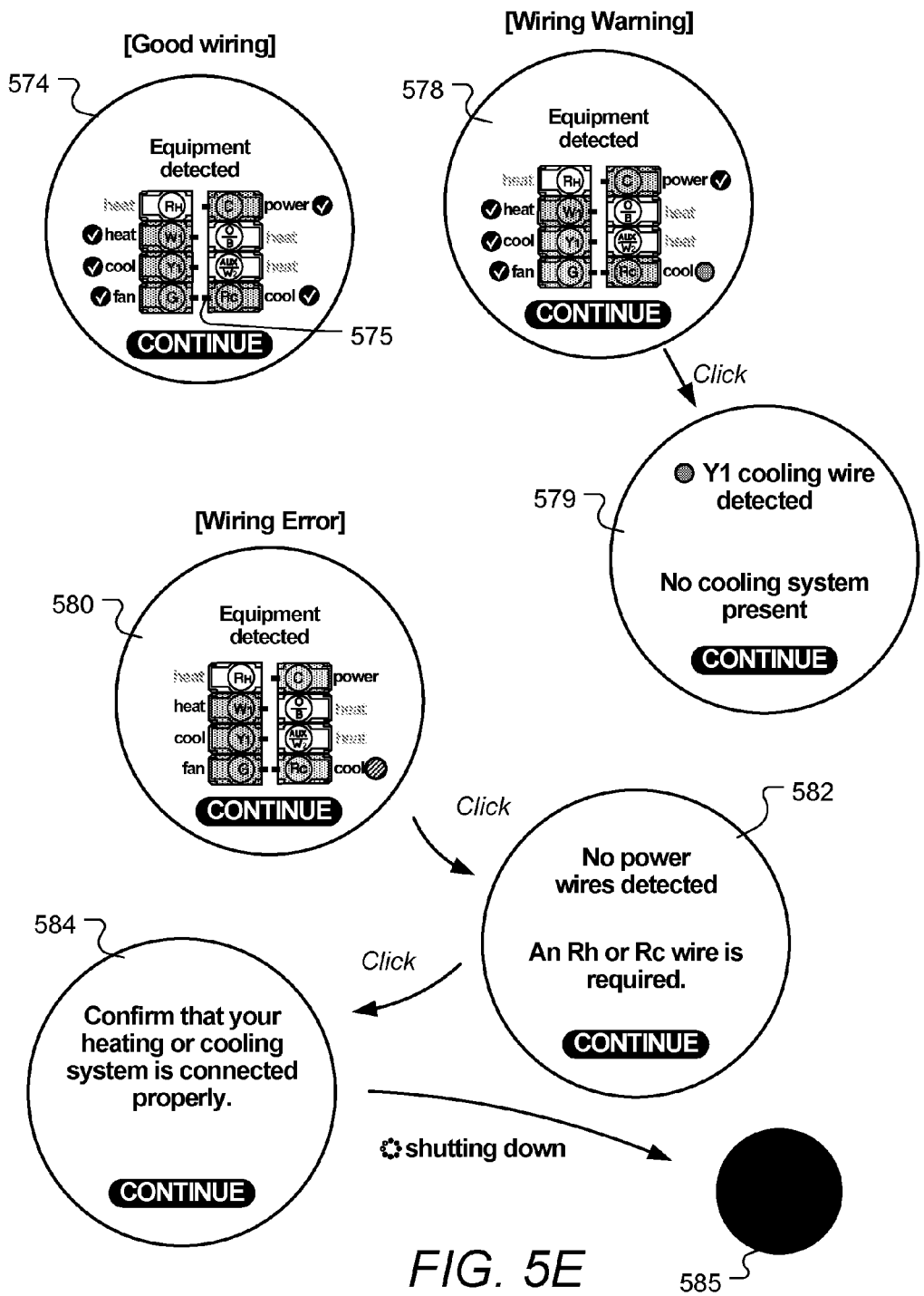

FIG. 5E shows example screens, according to some embodiments, for a thermostat that has the capability to detect wiring status and errors, such as described in the commonly assigned U.S. Ser. No. 13/034,666, supra, by detecting both the physical presence of a wire connected to the terminal, as well as using an analog-to-digital converter (ADC) to sense the presence of appropriate electrical signals on the connected wire. According to some embodiments, the combination of physical wire presence detection and ADC appropriate signal detection can be used to detect wiring conditions such as errors, for example by detecting whether the signal on an inserted wire is fully energized, or half-rectified. Screen 574 is an example when no wiring warnings or errors are detected. According to some preferred embodiments, the connectors that have wires attached are shown in a different color and additionally small wire stubs, such as stub 575, are shown indicating to the user that a wire is connected to that connector terminal. According to some preferred embodiments, the wire stubs, such as stub 575, are shown in a color that corresponds to the most common wire color that is found in the expected installation environment. For example, in the case of screen 574, the wire stub for connector $R_H$ is red, the wire stub for connector $Y_1$ is yellow, the wire stub for connector G is green and so on. Screen 578 is an example of a wiring warning indication screen. In general a wiring warning is used when potential wiring problem is detected, but HVAC functionality is not blocked. In this case, a cooling wire Y1 is detected but no cooling system appears to be present, as notified to the user in screen 579. Other examples of wiring warnings, according to some embodiments, include: Rh pin detected (i.e., the insertion of a wire into the Rh terminal has been detected) but that Rh wire is not live; Rc pin detected but Rc wire not live; W1 pin detected but W1 wire not live; AUX pin detected but AUX wire not live; G pin detected but G wire not live; and OB pin detected but OB wire not live. Screen 580 is an example of a wiring error indication screen. In general, wiring errors are detected problems that are serious enough such that HVAC functionality is blocked. In this case the wiring error shown in screen 580 is the absence of detected power wires (i.e., neither Rc nor Rh wires are detected), as shown in screen 582. In screen 584, the user is asked to confirm that the heating or cooling system is connected properly, after which the system shuts down as indicated by the blank (or black) screen 585. Other examples of wiring errors, according to some embodiments, include: neither a Y1 nor a W1 pin has been detected; C pin detected but that C wire is not live; Y1 pin has been detected but that Y1 wire is not live; and a C wire is required (i.e., an automated power stealing test has been performed in which it has been found that the power stealing circuitry in thermostat 300 will undesirably cause one or more HVAC call relays to trip, and so power stealing cannot be used in this installation, and therefore it is required that a C wire be provided to the thermostat 300).

Figure 5F:
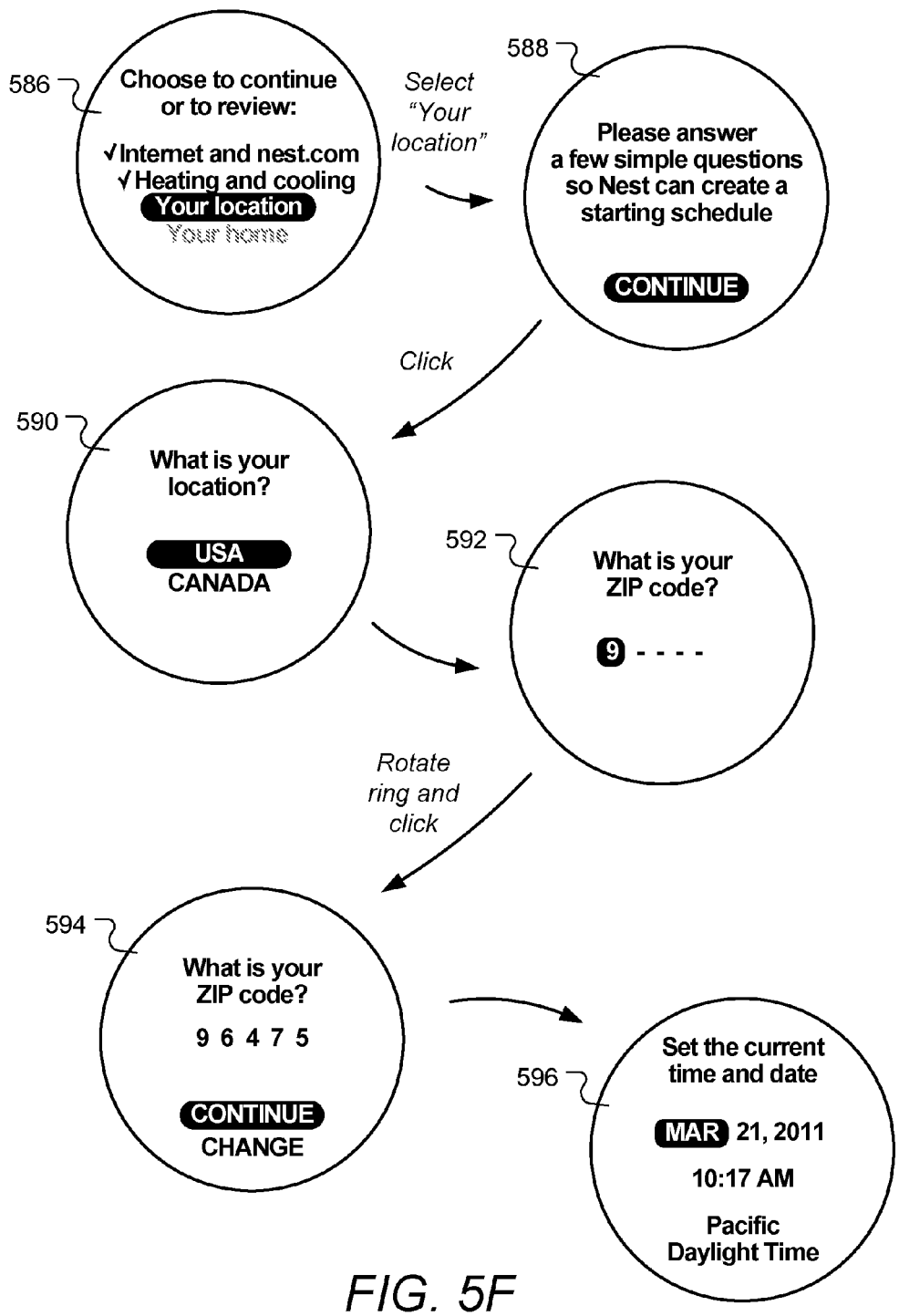

FIG. 5F show user interface screens relating to location and time/date, according to some embodiments. Screen 586 shows an example of the electronic display 316 when the first two steps of the setup process are completed. Upon user selection of "Your location" screen 588 is displayed to notify the user that a few questions should be answered to create a starting schedule. In screen 590, the user's location country is identified. Note that the list of countries in this example is only USA and Canada, but in general other or larger lists of countries could be used. Screen 592 shows an example of a fixed length character entry field, in this case, entry of a numerical five-digit United States ZIP code. The use rotates the rotatable ring 312 (see FIG. 3A, supra) to change the value of the highlighted character, followed by a click to select that value. Screen 594 shows an example after all five digits have been entered. Screen 596 shows an example of a screen that is used if the thermostat is not connected to the Internet, for entering date and time information. According to some embodiments, the time and date entry are only displayed when the clock has been reset to the firmware default values.

Figure 6A:
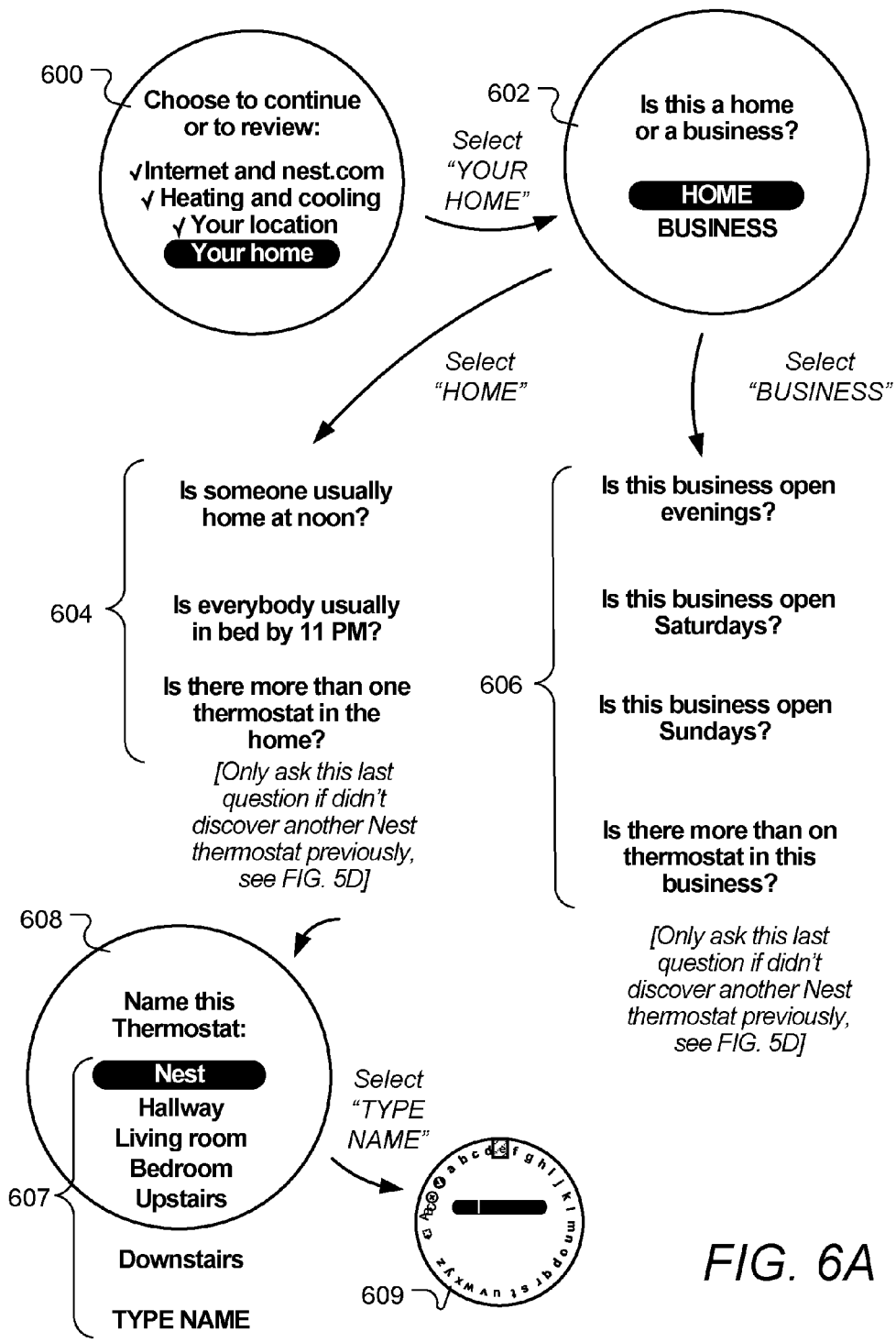

FIG. 6A shows example user interface screens of setup interview questions for the user to answer, according to some embodiments. The screens shown, according to some embodiments, are displayed on a thermostat 300 on round dot-matrix electronic display 316 having a rotating ring 312 such as shown and described in FIGS. 3A-4. Screen 600 shows the setup steps screen that is displayed once the first three steps have been completed. Note that if one of the steps has not been successful, a "−" symbol can be marked instead of a check mark. For example, if the internet connection was not made or skipped, a minus symbol "−" precedes the internet step. If "Your Home" is selected, screen 602 asks the user if the thermostat is being installed in a home or business. If "HOME" is selected, a number of questions 604 can be asked to aid in establishing a basic schedule for the user. Following the interview questions, in screen 608, the user is asked to give the thermostat a name. Notably, the step 608 is only carried out if there was not already a name requested previously (see FIG. 5D, step 562), that is, if the thermostat currently being setup is not the first such thermostat being associated with the user's cloud-based service account. A list of common names 607 is displayed for the user to choose by scrolling via the rotatable ring. The user can also select "TYPE NAME" to enter a custom name via character input interface 609. If the indicates that the thermostat is being installed in a business, then a set of interview questions 606 can be presented to aid in establishing a basic schedule. Following questions 606, the user is asked to give the thermostat a name in an analogous fashion as described in the case of a home installation.

Figure 6B:
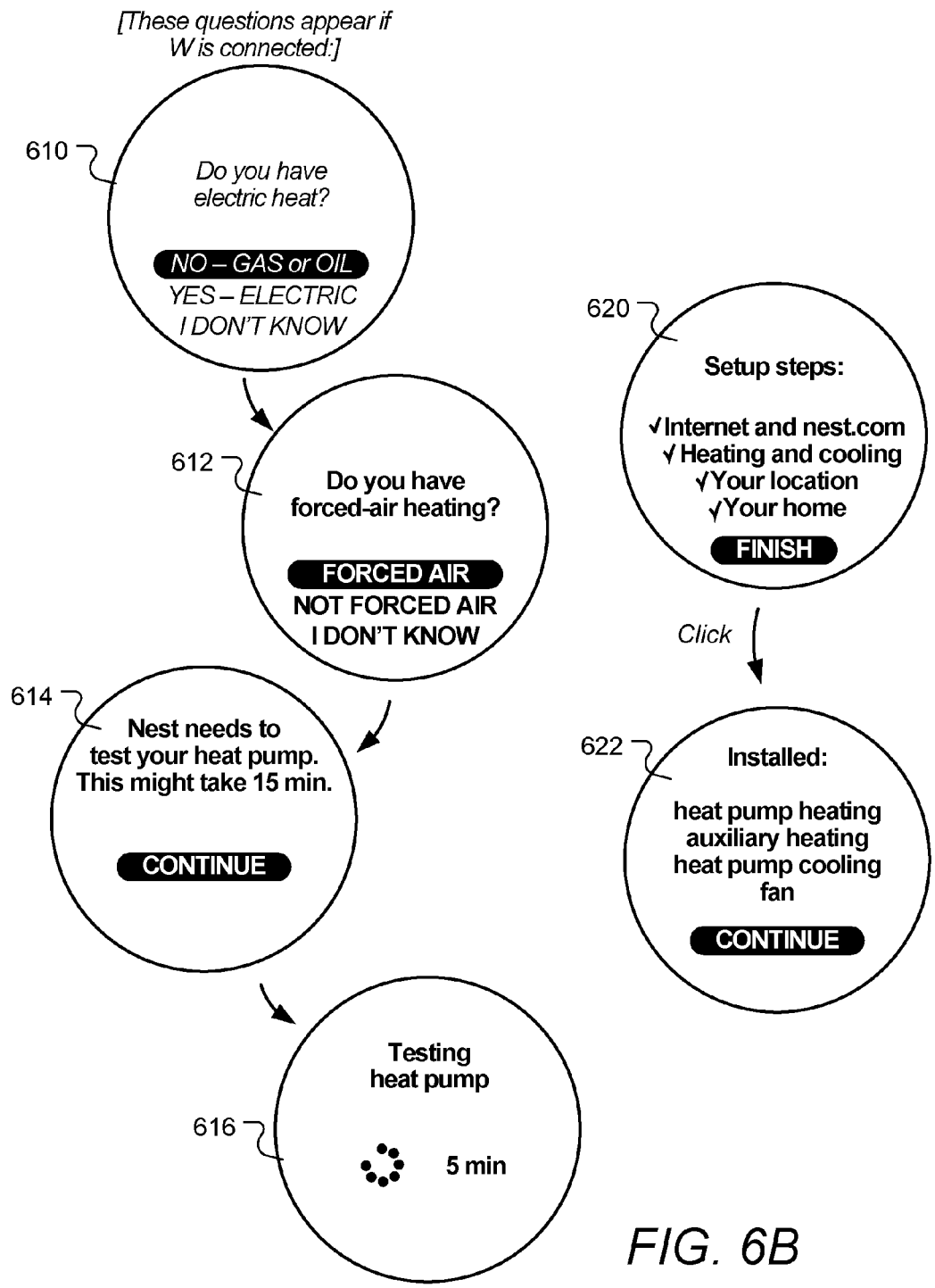

FIG. 6B shows further interview questions associated with an initial setup procedure, according to some embodiments. Following the thermostat naming, in screen 610, the user is asked if electric heat is used in the home or business. According to some embodiments, the heating questions shown are only asked if a wire is connected to the "W1" and/or "W2" terminals. In screen 612, the user is asked if forced-air heating is used. Screen 614 informs the user that a testing procedure is being carried out in the case where a heat-pump heating system is used. For example, the test could be to determine proper polarity for the heat pump control system by activating the system and detecting resulting temperature changes, as described in the commonly assigned U.S. Ser. No. 13/038, 191, supra. Screen 616 shows an example displayed to the user to inform the user that a relatively long procedure is being carried out. According to some embodiments, the heat pump test is not carried out if the user is able to correctly answer questions relating to the polarity of the heat pump system. Screen 620 show an example of where all the setup steps are successfully completed. If the user selects "FINISH" a summary screen 622 of the installation is displayed, indicating the installed HVAC equipment.

Figure 6C:
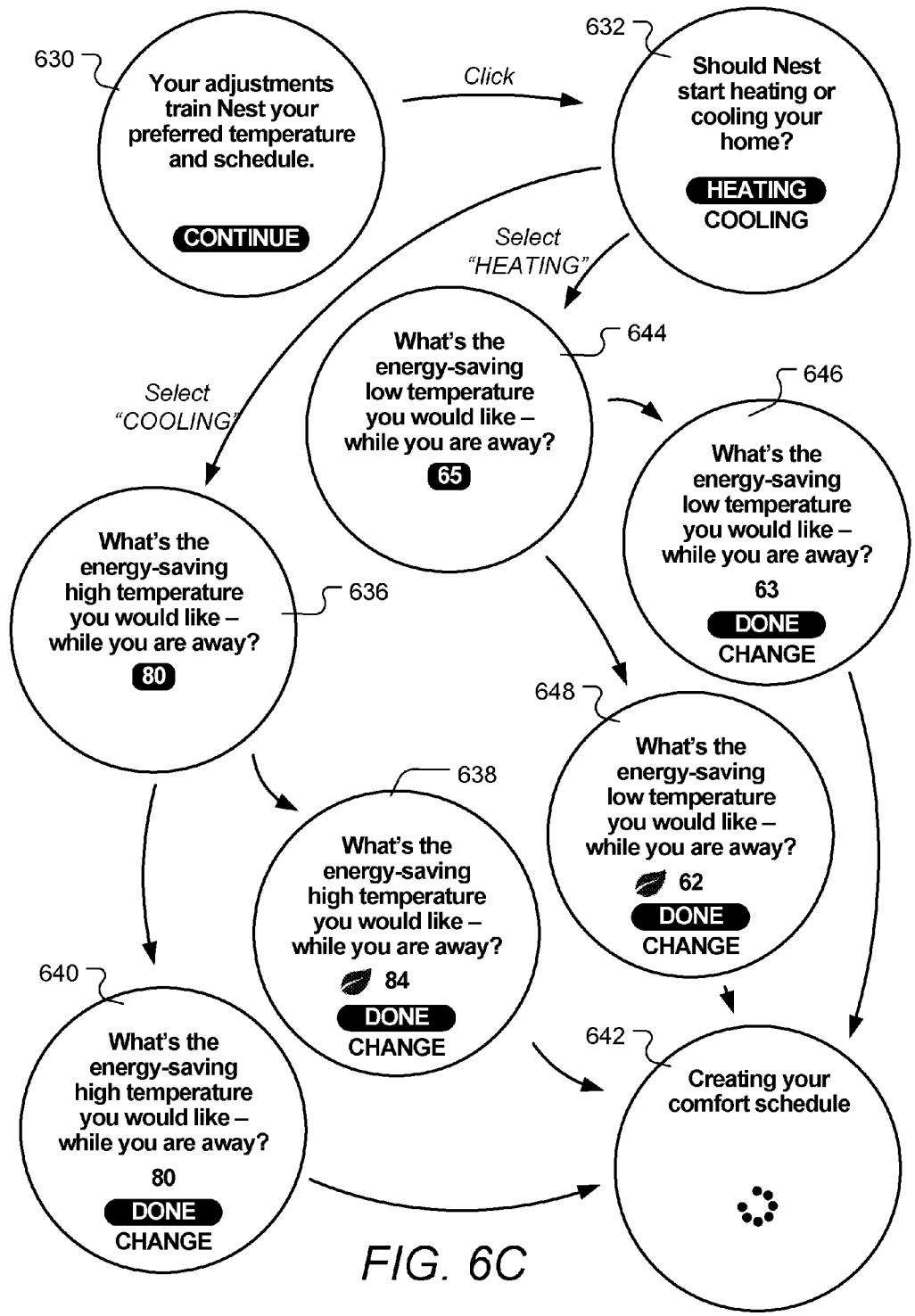

FIG. 6C shows screens relating to learning algorithms, in the case such algorithms are being used. In screen 630 the user is informed that their subsequent manual temperature adjustments will be used to train or "teach" the thermostat. In screen 632, the user is asked to select between whether the thermostat 300 should enter into a heating mode (for example, if it is currently winter time) or a cooling mode (for example, if it is currently summer time). If "COOLING" is selected, then in screen 636 the user is asked to set the "away" cooling temperature, that is, a low-energy-using cooling temperature that should be maintained when the home or business is unoccupied, in order to save energy and/or money. According to some embodiments, the default value offered to the user is 80 degrees F., the maximum value selectable by the user is 90 degrees F., the minimum value selectable is 75 degrees F., and a "leaf" (or other suitable indicator) is displayed when the user selects a value of at least 83 degrees F. Screen 640 shows an example of the display shown when the user is going to select 80 degrees F. (no leaf is displayed), while screen 638 shows an example of the display shown when the user is going to select 84 degrees F. According to some embodiments, a schedule is then created while the screen 642 is displayed to the user.

If the user selects "HEATING" at screen 632, then in screen 644 the user is asked to set a low-energy-using "away" heating temperature that should be maintained when the home or business is unoccupied. According to some embodiments the default value offered to the user is 65 degrees F., the maximum value selectable by the user is 75 degrees F., the minimum value selectable is 55 degrees F., and a "leaf" (or other suitable energy-savings-encouragement indicator) is displayed when the user selects a value below 63 degrees F. Screens 646 and 648 show examples of the user inputting 63 and 62 degrees respectively. According to some embodiments, a schedule is then created while the screen 642 is displayed to the user.

Figure 6D:
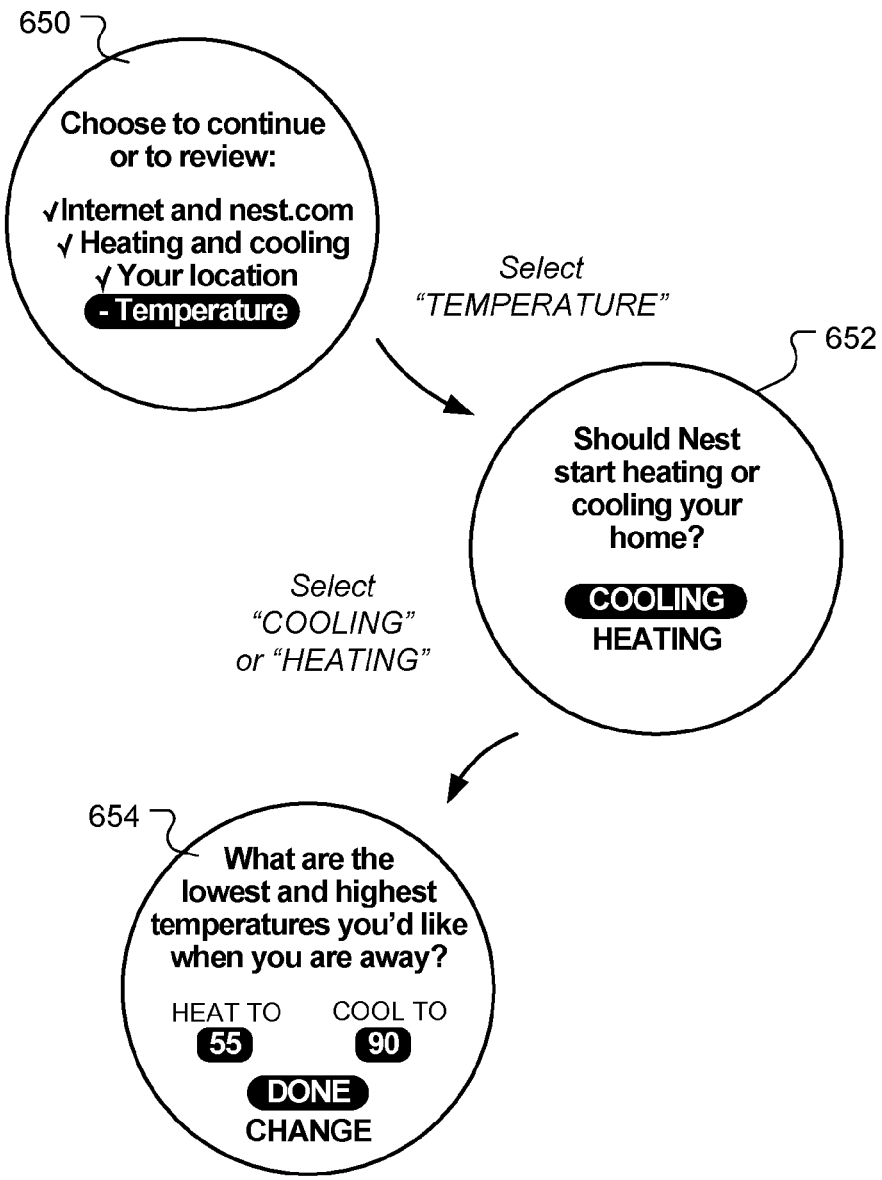

FIG. 6D shows certain setup screens, according to some preferred embodiments. According to some embodiments, screen 650 displays the first three setup steps completed, and a fourth step, "Temperature" that has not yet been completed. If "TEMPERATURE" is selected, then in screen 652, the user is asked if heating or cooling is currently being used at this time of year. In screen 654, the user is asked to input the energy saving heating and cooling temperatures to be maintained in the case the home or business is unoccupied.

Figure 7A:
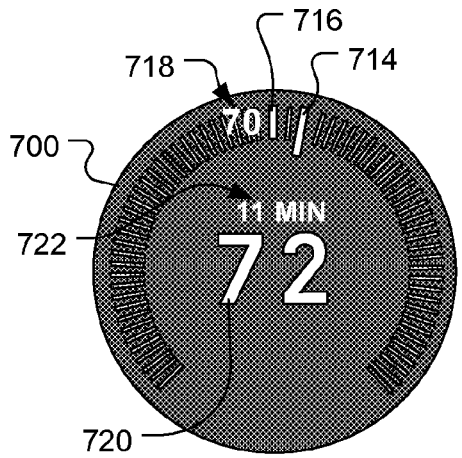
FIGS. 7A-7K show aspects of a general layout of a graphical user interface for a thermostat, according to some embodiments.

FIGS. 7A-7K show aspects of a general layout of a graphical user interface for a thermostat, according to some embodiments. The screens shown, according to some embodiments, are displayed on a thermostat 300 on round dot-matrix electronic display 316 having a rotatable ring 312 such as shown and described in FIGS. 3A-4. FIG. 7A shows a basic thermostat screen 700 in heating mode. According to some embodiments, the foreground symbols and characters remain a constant color such as white, while the background color of the screen can vary according to thermostat and HVAC system function to provide an intuitive visual indication thereof. For example, according to a preferred embodiment, a background orange-red color (e.g. R/G/B values: 231/68/0) is used to indicate that the thermostat is currently calling for heating from the HVAC system, and a background blueish color (e.g., R/G/B values: 0/65/226) is used to indicate that the thermostat is currently calling for cooling from the HVAC system. Further, according to some embodiments, the intensity, hue, saturation, opacity or transparency of the background color can be changed to indicate how much heating and/or cooling will be required (or how "hard" the HVAC system will have to work) to achieve the current setpoint. For example, according to some preferred embodiments, a black background is used when the HVAC system is not activated (i.e., when neither heating or cooling is being called for), while a selected background color that represents heat (e.g., orange, red, or reddish-orange) is used if the setpoint temperature is at least 5 degrees F. higher than the current ambient temperature, and while a selected background color that represents cooling (e.g., blue) is used if the setpoint temperature is at least 5 degrees F. lower than the current ambient temperature. Further, according to preferred embodiments, the color can be faded or transitioned between the neutral color (black) and the HVAC active color (red-orange for heating or blue for cooling) to indicate the increasing amount of "work" the HVAC system must do to change the ambient temperature to reach the current setpoint. For example, according to some preferred embodiments, decreasing levels of transparency (i.e., an increasing visibility or "loudness" of the HVAC active color) are used to correspond to increasing discrepancy between the current ambient temperature and the setpoint temperature. Thus, as the discrepancy between the setpoint temperature and the current ambient temperature increases from 1 to 5 degrees, the "loudness" of the background HVAC active color increases from an almost completely transparent overlay on the black background to a completely non-transparent "loud" heating or cooling color. It has been found that the use of variations in color display, such as described, can be extremely useful in giving the user a "feel" for the amount of work, and therefore the amount of energy and cost, that is going to be expended by the HVAC system at the currently displayed setpoint value. This, in turn, can be extremely useful in saving energy, particularly when the user is manually adjusting the setpoint temperature in real time, because the background color provides an immediate feedback relating to the energy consequences of the user's temperature setting behavior.

According to some alternate embodiments, parameters other than simply the difference in current to setpoint temperature can be used in displaying background colors and intensity. For example, time-to-temp (the estimated amount of time it will take to reach the current setpoint temperature), amount of energy, and/or cost, if accurately known can also be used alone or in combination determine which color and how intense (or opaque) is used for the background of the thermostat display.

According to some preferred embodiments the characters and other graphics are mainly displayed in white overlying the black, orange or blue backgrounds as described above. Other colors for certain displayed features, such green for the "leaf" logo are also used according to some embodiments. Although many of the screens shown and described herein are provided in the accompanying drawings with black characters and graphics overlaying a white background for purposes of clarity and print reproduction, it is to be understood that the use of white or colored graphics and characters over black and colored backgrounds such is generally preferable for enhancing the user experience, particularly for embodiments where the electronic display 316 is a backlit dot matrix LCD display similar to those used on handheld smartphones and touchpad computers. Notably, although the presently described color schemes have been found to be particularly effective, it is to be appreciated that the scope of the present teachings is not necessarily so limited, and that other impactful schemes could be developed for other types of known or hereinafter developed electronic display technologies (e.g., e-ink, electronic paper displays, organic LED displays, etc.) in view of the present description without departing from the scope of the present teachings.

Figure 7B:
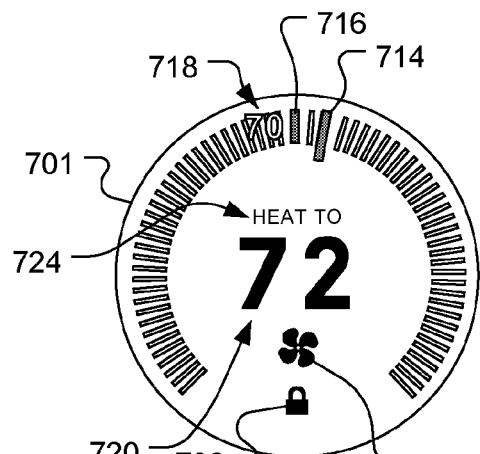
Figure 7C:
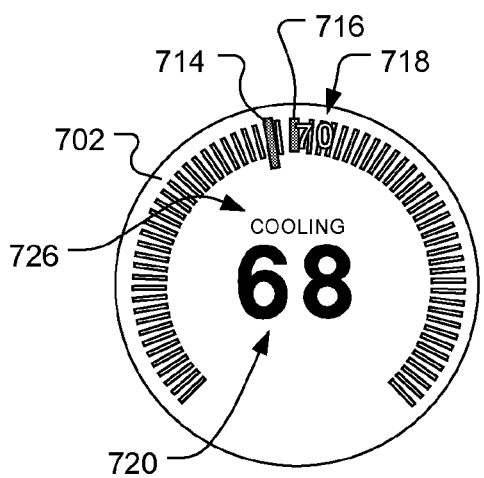
Figure 7D:
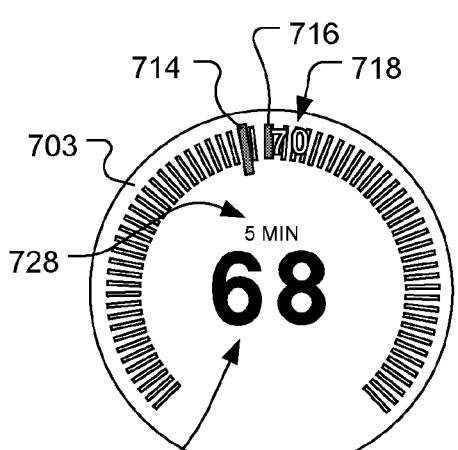

In FIG. 7A, screen 700 has a red-orange background color with white central numerals 720 indicating the current setpoint of 72 degrees F. The current setpoint of 72 degrees is also shown by the large tick mark 714. The current ambient temperature is 70 degrees as shown by the small numerals 718 and the tick mark 716. Other tick marks in a circular arrangement are shown in a more transparent (or more muted) white color, to give the user a sense of the range of adjustments and temperatures, in keeping with the circular design of the thermostat, display area and rotatable ring. According to some embodiments, the circular arrangement of background tick marks are sized and spaced apart so that 180 tick marks would complete a circle, but 40 tick marks are skipped at the bottom, such that a maximum of 140 tick marks are displayed. The setpoint tick mark 714 and the current temperature tick mark 716 may replace some the of the background tick marks such that not all of the background tick marks are displayed. Additionally, the current temperature is displayed numerically using numerals 718 which can also be overlaid, or displayed in muted or transparent fashion over the background tick marks. According to some embodiments, so as to accentuate visibility the setpoint tick mark 714 is displayed in 100% opacity (or 0% transparency), is sized such that it extends 20% farther towards the display center than the background tick marks, and is further emphasized by the adjacent background tick marks not being displayed. According to some embodiments, a time-to-temperature display 722 is used to indicate the estimated time needed to reach the current setpoint, as is described more fully co-pending commonly assigned patent application U.S. Ser. No. 12/984,602. FIG. 7B shows a screen 701, which displays a "HEAT TO" message 724 indicating that the HVAC system is in heating mode, although currently is not active ("HEATING" will be displayed when the HVAC system is active). According to some embodiments, the background color of screen 701 is a neutral color such as black. A fan logo 730 can be displayed indicating the fan is active without any associated heating or cooling. Further, a lock icon 732 can be displayed when the thermostat is locked. FIG. 7C shows a screen 702 which has the message 726 "COOLING" indicating that cooling is being called for, in addition to a background color such as blue. In this case, the message 726 "COOLING" is displayed instead of the time-to-temp display since there may be low confidence in the time-to-temp number may (such as due to insufficient data for a more accurate estimation). In FIG. 7D, screen 703 shows an example similar to screen 702, but with the time-to-temp 728 displayed instead of message 726, indicating that there is a higher confidence in the time-to-temp estimation. Note that the background color of screen 702 and 703 are bluish so as to indicate HVAC cooling is active, although the color may be partially muted or partially transparent since the current setpoint temperature and current ambient temperature is relatively close.

Figure 7E:
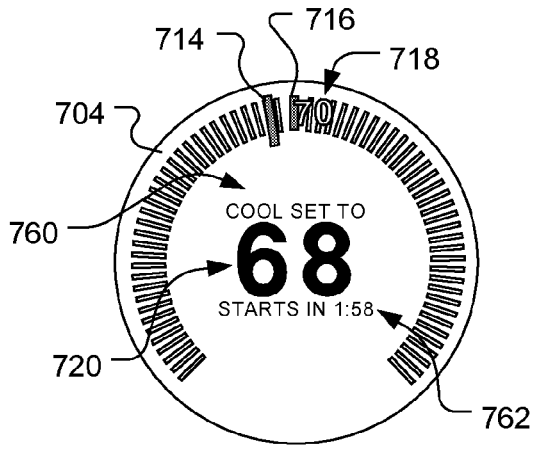
Figure 7F:
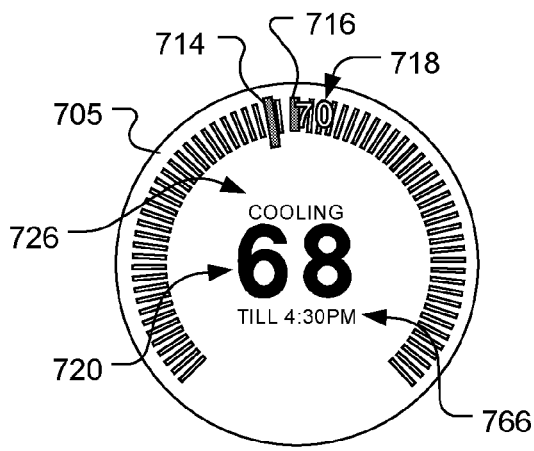

According to some embodiments, to facilitate the protection of compressor equipment from damage, such as with conventional cooling compressors or with heat pump heating compressors, the thermostat prevents re-activation of a compressor within a specified time period ("lockout period") from de-activation, so as to avoid compressor damage that can occur if the de-activation to re-activation interval is too short. For example, the thermostat can be programmed to prevent re-activation of the compressor within a lockout interval of 2 minutes after de-activation, regardless of what happens with the current ambient temperature and/or current setpoint temperature within that lockout interval. Longer or shorter lockout periods can be provided, with 2 minutes being just one example of a typical lockout period. During this lockout period, according to some embodiments, a message such as message 762 in screen 704 of FIG. 7E is displayed, which provides a visually observable countdown until the end of the lockout interval, so as to keep the user informed and avoid confusion on the user's part as to why the compressor has not yet started up again.

According to some embodiments, a manual setpoint change will be active until an effective time of the next programmed setpoint. For example, if at 2:38 PM the user walks up to the thermostat 300 and rotates the outer ring 312 (see FIG. 3A, supra) to manually adjust the setpoint to 68 degrees F., and if the thermostat 300 has a programmed schedule containing a setpoint that is supposed to take effect at 4:30 PM with a setpoint temperature that is different than 68 degrees F., then the manual setpoint temperature change will only be effective until 4:30 PM. According to some embodiments, a message such as message 766 ("till 4:30 PM") will be displayed on screen 705 in FIG. 7F, which informs the user that their setpoint of 68 degrees F. will be in effect until 4:30 PM.

Figure 7G:
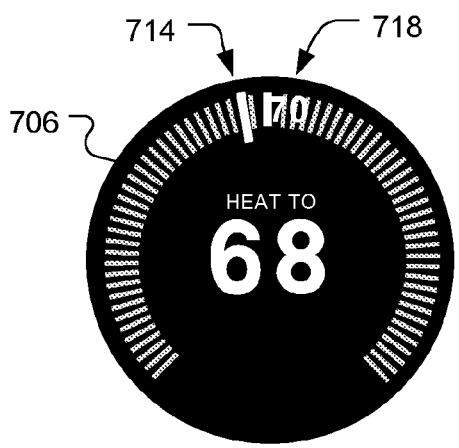
Figure 7H:
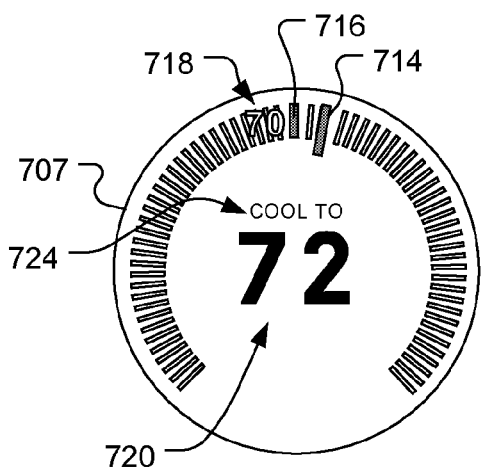

FIG. 7G shows an example screen 706 in which a message "HEAT TO" is displayed, which indicates that the thermostat 300 is in heating mode but that the heating system is not currently active (i.e., heat is not being called for by the thermostat). In this example, the current temperature, 70 degrees F., is already higher than the setpoint of 68 degrees F., so an active heating call is not necessary. Note that screen 706 is shown with a black background with white characters and graphics, to show an example of the preferred color scheme. FIG. 7H shows an example screen 707 in which a message 724 "COOL TO" is displayed, which indicates that the cooling system is in cooling mode but is not currently active (i.e. cooling is not being called for by the thermostat). In this example, the current temperature, 70 degrees F., is already lower than the setpoint of 68 degrees F., so an active cooling call is not necessary. This case is analogous to FIG. 7G except that the system is in cooling mode.

Figure 7I:
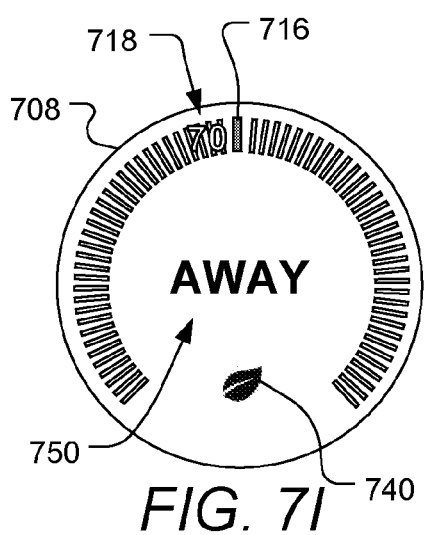

FIG. 7I shows an example screen 708 where the thermostat has manually been set to "AWAY" mode (e.g., the user has walked up to the thermostat dial and invoked an "AWAY" state using user interface features to be described further infra), which can be performed by the user when a period of expected non-occupancy is about to occur. The display 708 includes a large "AWAY" icon or text indicator 750 along with a leaf icon 740. Note that the current temperature numerals 718 and tick mark 716 continue to be displayed. During the away mode, the thermostat uses an energy-saving setpoint according to default or user-input values (see, for example, screens 638 and 648 of FIG. 6C and screen 654 of FIG. 6D, supra). According to some embodiments, if the user manually initiates an "away" mode (as opposed to the thermostat automatically detecting non-occupancy) then the thermostat will only come out of "away" mode by an explicit manual user input, such as by manually using the user interface. In other words, when manual "away" mode is activated by the user, then the thermostat will not use "auto arrival" to return to standard operation, but rather the user must manually establish his/her re-arrival. In contrast, when the thermostat has automatically entered into an away state based on occupancy sensor data that indicates non-occupancy for a certain period of time (see FIG. 7J and accompanying text below), then the thermostat will exit the "away" state based on either of (i) occupancy sensor data indicating that occupants have returned, or (ii) an explicit manual user input.

Figure 7J:
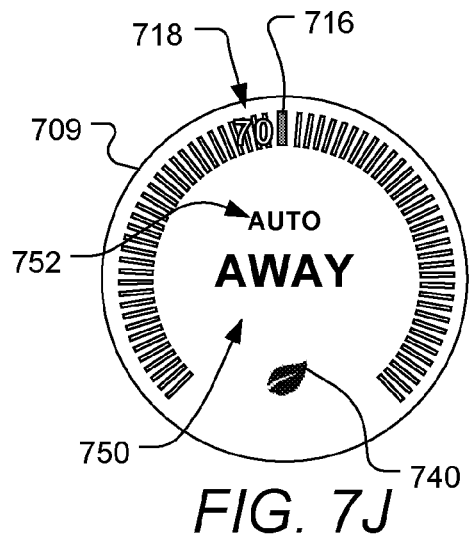
Figure 7K:
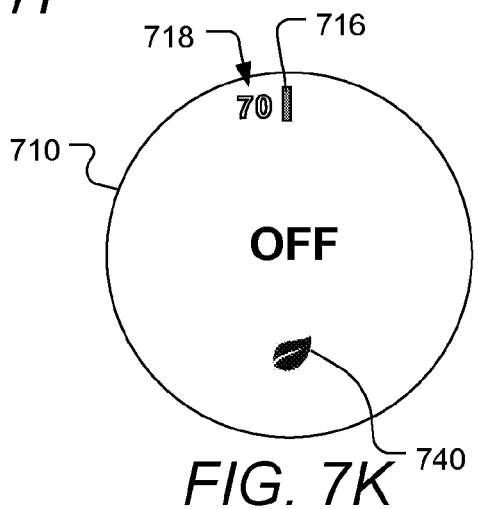

FIG. 7J shows an example screen 709 where the thermostat has automatically entered into an "AWAY" mode (referred to as "AUTO AWAY" mode), as indicated by the message 752 and icon 750, based on an automatically sensed state of non-occupancy for a certain period of time. Note that according to some embodiments, the leaf icon 740 is always displayed during away modes (auto or manual) to indicate that the away modes are energy-saving modes. Such display of leaf icon 740 has been found advantageous at this point, because it is reassuring to the user that something green, something good, something positive and beneficial, is going on in terms of energy-savings by virtue of the "away" display. According to some embodiments, the leaf icon 740 is also displayed when the thermostat is in an "OFF" mode, such as shown in example screen 710 in FIG. 7K, because energy is inherently being saved through non-use of the HVAC system. Notably, the "OFF" mode is actually one of the working, operational modes of the thermostat 300, and is to be distinguished from a non-operational or "dead" state of the thermostat 300. In the "OFF" mode, the thermostat 300 will still acquire sensor data, communicate wirelessly with a central server, and so forth, but will simply not send heating or cooling calls (or other operating calls such as humidification or dehumidification) to the HVAC system. The "OFF" mode can be invoked responsive to an explicit menu selection by the user, either through the rotatable ring 312 (see screen 814 of FIG. 8C, infra), or from a network command received via the Wi-Fi capability from a cloud-based server that provides a web browser screen or smartphone user interface to the user and receives an OFF command thereby. As illustrated in FIG. 7K, the current temperature numerals 718 and current temperature tick mark 716 are preferably displayed along with the leaf 740 when the thermostat is in "OFF" mode. In alternative embodiments, background tick marks can also be displayed in "OFF" mode.

According to a preferred embodiment, all of the operational screens of the thermostat 300 described herein that correspond to normal everyday operations, such as the screens of FIGS. 7A-7K, will actually only appear when the proximity sensor 370A (see FIG. 3A, supra) indicates the presence of a user or occupant in relatively close proximity (e.g., 50 cm-200 cm or closer) to the thermostat 300, and the electronic display 316 will otherwise be dark. While the user is proximal to the thermostat 300 the electronic display 316 will remain active, and when the user walks away out of proximity the electronic display 316 will remain active for a predetermined period of time, such as 20 seconds, and then will go dark. In contrast to an alternative of keeping the electronic display 316 active all of the time, this selective turn-on and turn-off of the electronic display has been found to be a preferable method of operation for several reasons, including the savings of electrical power that would otherwise be needed for an always-on electronic display 316, extension of the hardware life of the electronic display 316, and also aesthetic reasons for domestic installations. The savings of electrical power is particularly advantageous for installations in which there is no "C" wire provided by the HVAC system, since it will often be the case that the average power that can safely obtained from power-stealing methods will be less than the average power used by a visually pleasing hardware implementation of the electronic display 316 when active. Advantageously, by designing the thermostat 300 with the rechargeable battery 482 and programming its operation such that the electronic display 316 will only be active when there is a proximal viewer, the electronic display 316 itself can be selected and sized to be bright, bold, informative, and visually pleasing, even where such operation takes more instantaneous average electrical power than the power stealing can provide, because the rechargeable battery 482 can be used to provide the excess power needed for active display, and then can be recharged during periods of lesser power usage when the display is not active. This is to be contrasted with many known prior art electronic thermostats whose displays are made very low-power and less visually pleasing in order to keep the thermostat's instantaneous power usage at budget power-stealing levels. Notably, it is also consistent with the aesthetics of many home environments not to have a bright and bold display on at all times, such as for cases in which the thermostat is located in a bedroom, or in a media viewing room such as a television room. The screens of FIGS. 7A-7K can be considered as the "main" display for thermostat 300 in that these are the screens that are most often shown to the user as they walk up to the thermostat 300 in correspondence with normal everyday operation.

According to one embodiment, the thermostat 300 is programmed and configured such that, upon the detection of a working "C" wire at device installation and setup, the user is automatically provided with a menu choice during the setup interview (and then revised later at any time through the settings menu) whether they would like the electronic display 316 to be on all the time, or only upon detection of a proximal user. If a "C" wire is not detected, that menu choice is not provided. A variety of alternative display activation choices can also be provided, such as allowing the user to set an active-display timeout interval (e.g., how long the display remains active after the user has walked away), allowing the user to choose a functionality similar to night lighting or safety lighting (i.e., upon detection of darkness in the room by the ambient light sensor 370B, the display will be always-on), and other useful functionalities. According to yet another embodiment, if the presence of a "C" wire is not detected, the thermostat 300 will automatically test the power stealing circuitry to see how much power can be tapped without tripping the call relay(s), and if that amount is greater than a certain threshold, then the display activation menu choices are provided, but if that amount is less than the certain threshold, the display activation menu choices are not provided.

FIGS. 8A-C show example screens of a rotating main menu, according to some preferred embodiments. The screens shown, according to some embodiments, are displayed on a thermostat 300 on a round dot-matrix electronic display 316 having a rotatable ring 312 such as shown and described in FIGS. 3A-4. FIG. 8A shows an example screen 800 in normal operations (such as described in FIG. 7A or 7C). An inward click from the normal display screen 800 causes a circumferential main menu 820 to appear as shown in screen 801. In this example the main menu 820 displays about the perimeter of the circular display area various menu names such as "SETTINGS," "ENERGY," "SCHEDULE," "AWAY," "DONE," as well one or more icons. The top of the circular menu 820 includes an active window 822 that shows the user which menu item will be selected if an inward click is performed at that time. Upon user rotation of the rotatable ring 312 (see FIG. 3A, supra) the menu items turn clockwise or counter clockwise, matching the direction of the rotatable ring 312, so as to allow different menu items to be selected. For example, screen 802 and 804 show examples displayed in response to a clockwise rotation of the rotatable ring 312. One example of a rotating menu that rotates responsive to ring rotations according to some embodiments is illustrated in the commonly assigned U.S. Ser. No. 29/399,632, supra. From screen 804, if an inward click is performed by the user, then the Settings menu is entered. It has been found that a circular rotating menu such as shown, when combined with a rotatable ring and round display area, allows for highly intuitive and easy input, and so therefore greatly enhances the user interface experience for many users. FIG. 8B shows an example screen 806 that allows for the schedule mode to be entered. FIG. 8C shows the selection of a mode icon 809 representing a heating/cooling/off mode screen, the mode icon 809 comprising two disks 810 and 812 and causing the display of a mode menu if it appears in the active window 822 when the user makes an inward click. In screen 808, a small blue disk 810 represents cooling mode and a small orange-red disk 812 represents heating mode. According to some embodiments the colors of the disks 810 and 812 match the background colors used for the thermostat as described with respect to FIG. 7A. One of the disks, in this case the heating disk 812 is highlighted with a colored outline, to indicate the current operating mode (i.e. heating or cooling) of the thermostat. In one alternative embodiment, the mode icon 809 can be replaced with the text string "HEAT/COOL/OFF" or simply the word "MODE". If in inward click is performed from screen 808, a menu screen 814 appears (e.g. using a "coin flip" transition). In screen 814 the user can view the current mode (marked with a check mark) and select another mode, such as "COOL" or "OFF." If "COOL" is selected then the thermostat will change over to cooling mode (such changeover as might be performed in the springtime), and the cooling disk icon will highlighted on screens 814 and 808. The menu can also be used to turn the thermostat off by selecting "OFF." In cases the connected HVAC system only has heating or cooling but not both, the words "HEAT" or "COOL" or "OFF" are displayed on the menu 820 instead of the colored disks.

Figure 9A:
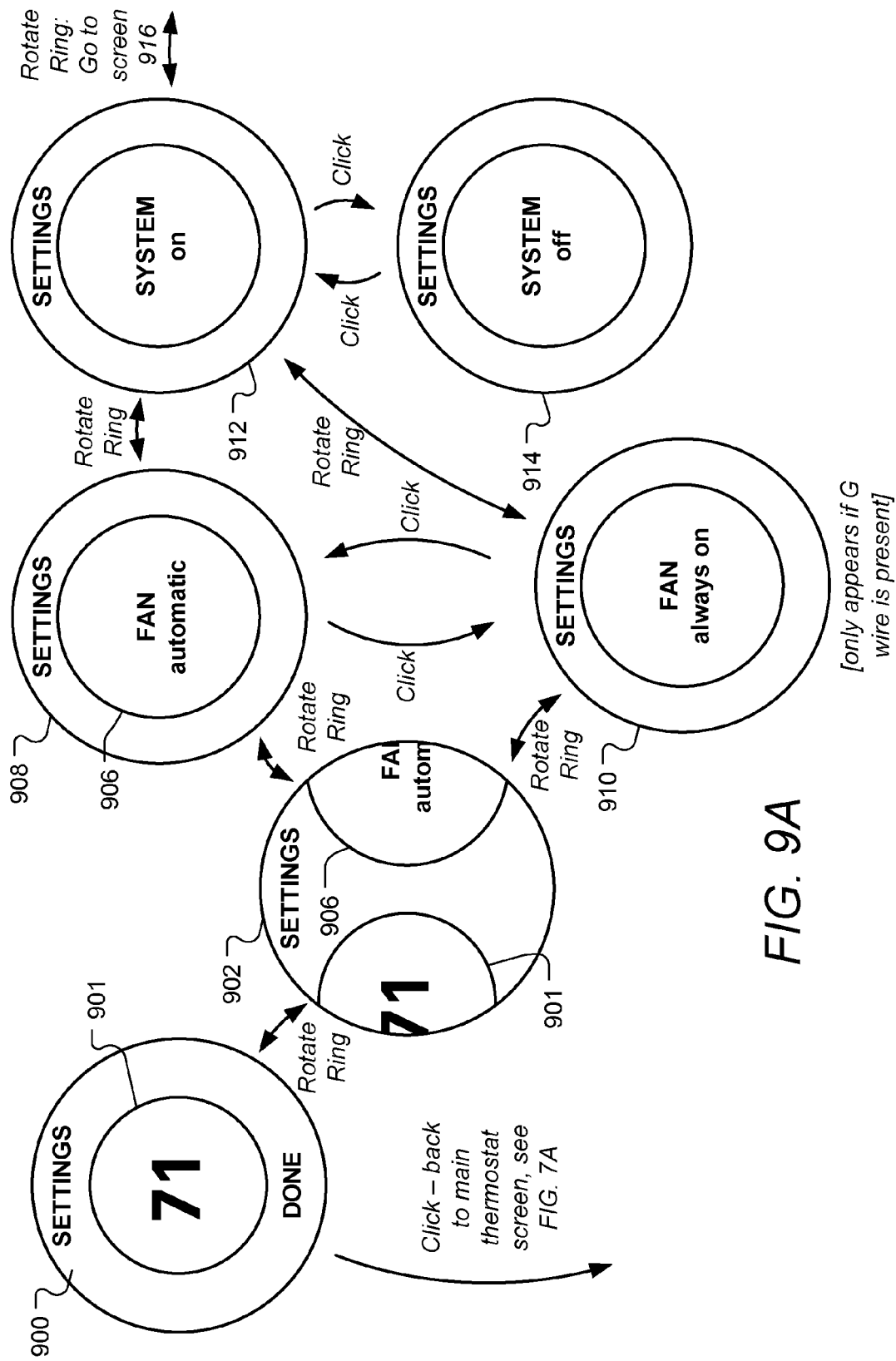
FIGS. 9A-H and 10A-I illustrate example user interface screens on a user-friendly a programmable thermostat for making various settings, according to some embodiments.

FIGS. 9A-J and 10A-I illustrate example user interface screens for making various settings, according to some embodiments. The screens shown, according to some embodiments, are displayed on a thermostat 300 on round dot-matrix electronic display 316 having a rotatable ring 312 such as shown and described in FIGS. 3A-4. In FIG. 9A, screen 900 is initially displayed following a user selection of "SETTINGS" from the main menu, such as shown in screen 804 of FIG. 8A. The general layout of the settings menu in this example is a series of sub-menus that are navigated using the rotatable ring 312. For example, with reference to FIG. 9A, the user can cause the initial screen 900 to be shifted or translated to the left by a clockwise rotation of the rotatable ring 312, as shown in the succession of screens 902 and 908.

The animated translation or shifting effect is illustrated in FIG. 9A by virtue of a portion of the previous screen disk 901 and a portion of the new screen disk 906 shifting as shown, and is similar to the animated shifting translation illustrated in the commonly assigned U.S. Ser. No. 29/399,621, supra. Further rotation of the ring leads to successive sub-menu items such as "system on" screen 912, and lock setting screen 916 (see FIG. 9B). Rotating the ring in the opposite direction, i.e., counterclockwise, translates or shifts the screens in the opposite direction (e.g., from 916 to 908 to 900). The "initial screen" 900 is thus also used as a way to exit the settings menu by an inward click. This exit function is also identified by the "DONE" label on the screen 900. Note that inner disk 901 shows the large central numerals that correspond to the current setpoint temperature and can include a background color to match the thermostat background color scheme as described with respect to FIG. 7A, so as to indicate to a user, in an intuitive way, that this screen 900 is a way of exiting the menu and going "back" to the main thermostat display, such as shown in FIGS. 7A-K. According to some embodiments, another initial/done screen such as screen 900 is displayed at the other end (the far end) of the settings menu, so as to allow means of exit from the settings menu from either end. According to some embodiments, the sub-menus are repeated with continued rotation in one direction, so that they cycle through in a circular fashion and thus any sub menu can eventually be accessed by rotating the ring continuously in either one of the two directions.

Screen 908 has a central disk 906 indicating the name of the sub-menu, in this case the Fan mode. Some sub menus only contain a few options which can be selected or toggled among by inward clicking alone. For example, the Fan sub-menu 908 only has two settings "automatic" (shown in screen 908) and "always on" (shown in screen 910). In this case the fan mode is changed by inward clicking, which simply toggles between the two available options. Ring rotation shifts to the next (or previous) settings sub-menu item. Thus rotating the ring from the fan sub-menu shift to the system on/off sub-menu shown in screens 912 (in the case of system "ON") and 914 (in the case of system "OFF"). The system on/off sub-menu is another example of simply toggling between the two available options using the inward click user input.

Figure 9B:
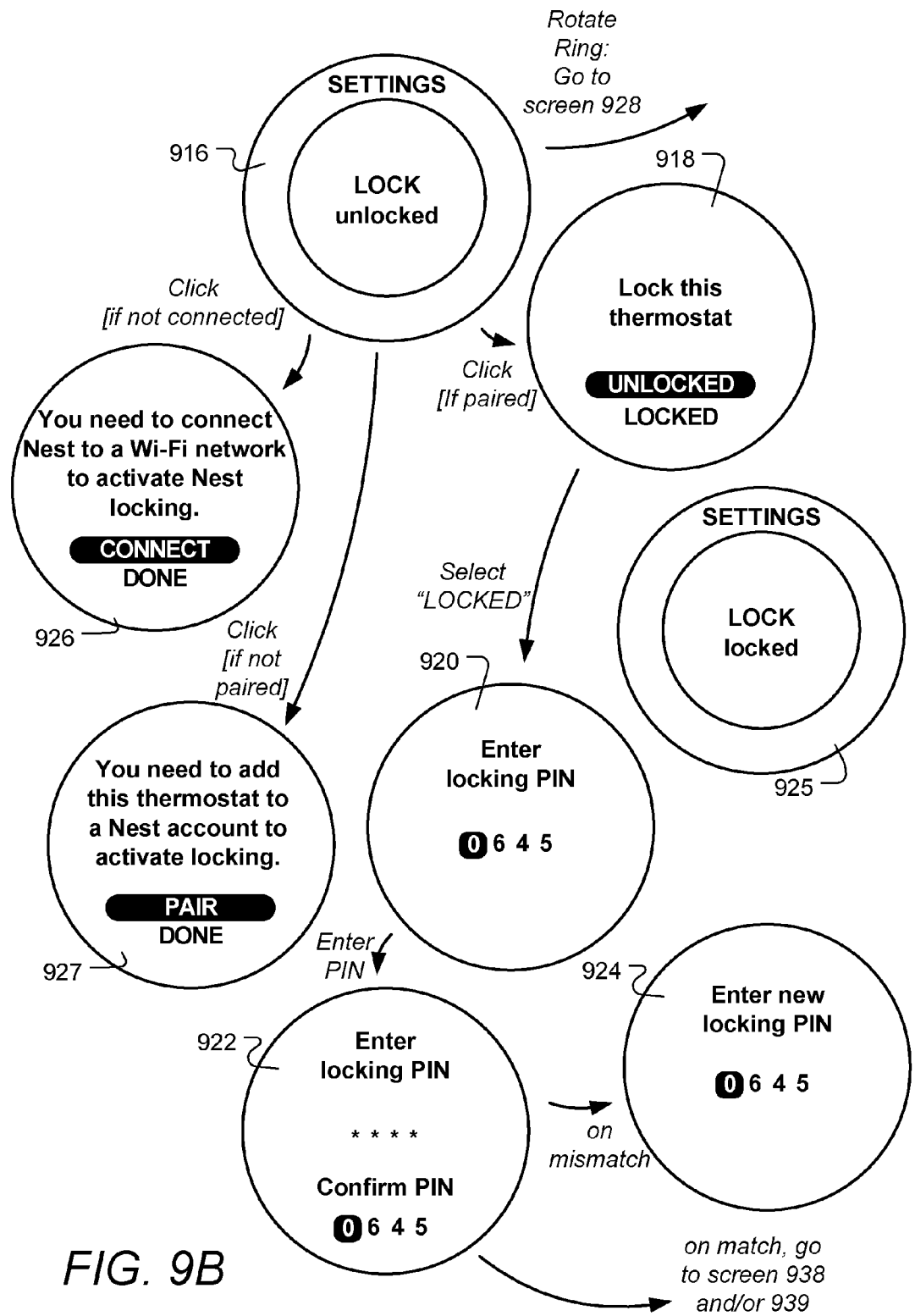

In FIG. 9B, screen 916 is the top level of the lock sub-menu. If the thermostat is connected and paired (i.e., has Internet access and is appropriately paired with a user account on a cloud-based server), an inward click will lead to screen 918. At screen 918, the user can vary the highlighting between the displayed selections by rotating the rotatable ring 312, and then can select the currently displayed menu item by inward clicking the rotatable ring 312. If "LOCKED" is selected then the user is asked to enter a locking PIN in screen 920. If the thermostat is already locked then screen 925 is displayed instead of screen 916. If the thermostat is unlocked then a PIN confirmation is requested such as in screen 922. If the confirmation PIN does not match then the user is asked to enter a new PIN in screen 924. If the confirmation PIN matches, then the temperature limits are set in screens 938 and/or 939 in FIG. 9C. The described locking capability can be useful in a variety of contexts, such as where a parent desires the limit the ability of their teenager to set the temperature too high in winter or too low in summer. According to some embodiments, locking of the thermostat is not permitted if the thermostat is not connected to the Internet or is not paired to an account, so that an online backup method of unlocking the thermostat is available should the user forget the PIN number. In such case, if the thermostat is not connected to the Internet, then screen 926 is displayed, and if the thermostat is not paired then screen 927 is displayed.

Figure 9C:
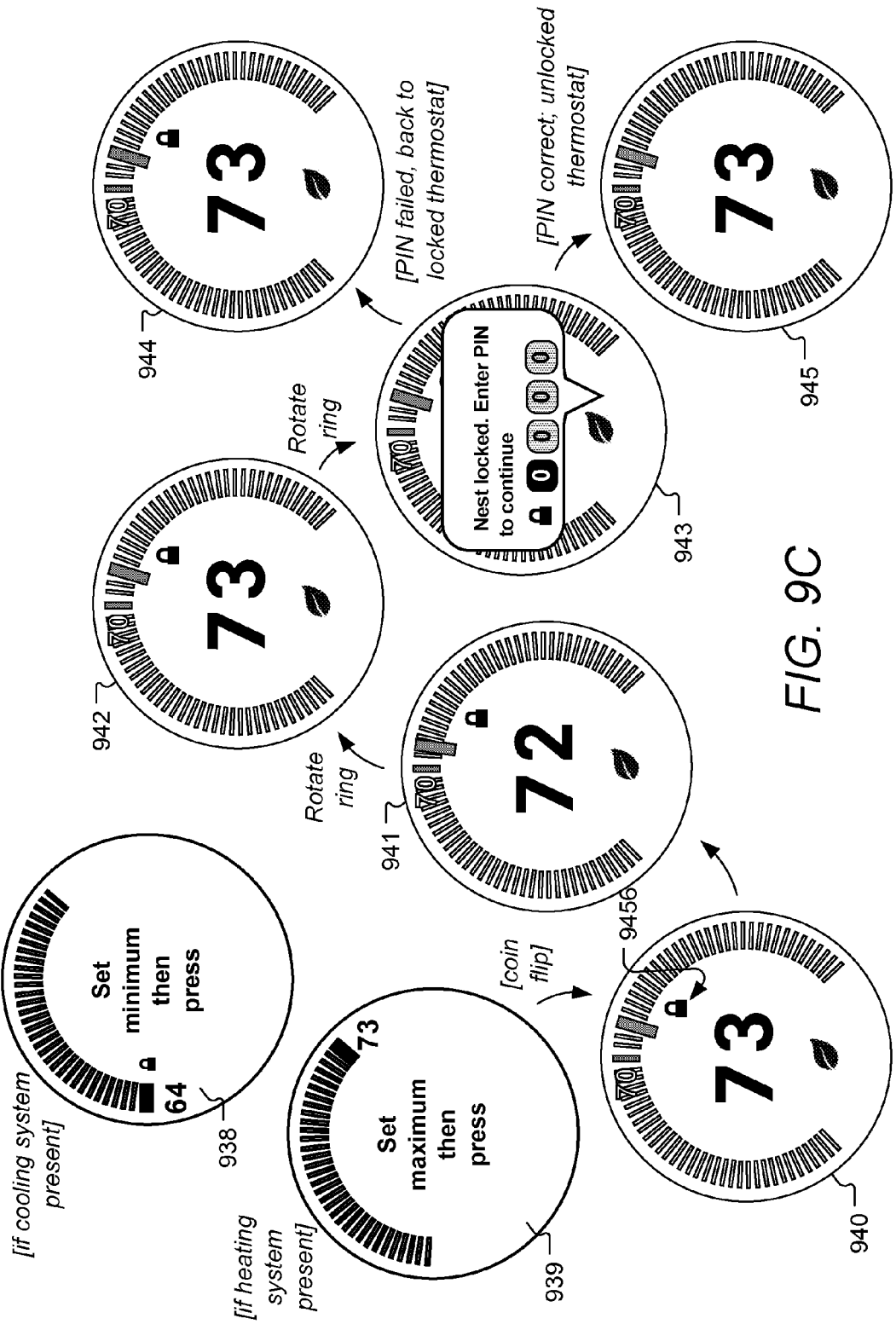

FIG. 9C shows further details of the locking feature, according to some embodiments. In screen 938 the user is allowed to set the minimum setpoint temperature using the rotatable ring followed by an inward click (in the case where a cooling system is present). Screen 939 similarly allows the user to set the maximum setpoint temperature (when a heating system is present). After setting the limits in screens 938 and/or 939 a coin flip transition returns to the main thermostat operation screen such as shown in screen 940. In the case shown in screen 940, a maximum setpoint of 73 degrees F. has been input. A lock icon 946 is displayed on the dial to notify the user that a maximum setpoint temperature has been set for the heating system. Screens 941, 942, 943, 944 and 945 show the behavior of the thermostat when locked, according to some embodiments. In this example, the user is trying to adjust the setpoint temperature above the maximum of 73 degrees. In screen 943 the user is asked for the PIN. If the PIN is incorrect, then the thermostat remains locked as shown in screen 944. If the PIN is correct the thermostat is unlocked and lock icon is removed as shown in screen 945, in which case the user can then proceed to change the current setpoint above 73 degrees F.

Figure 9D:
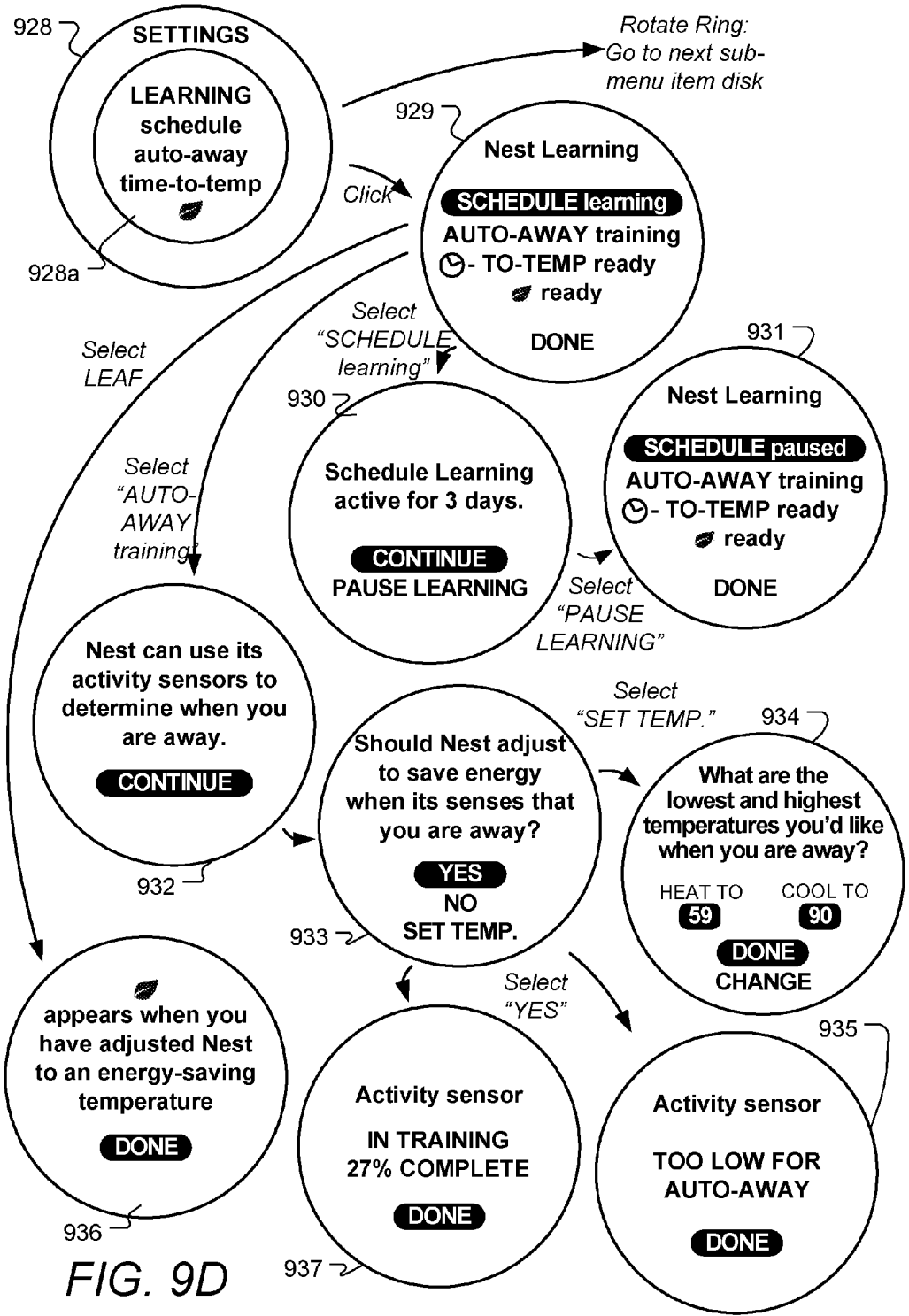

FIG. 9D shows a sub-menu for settings and information relating to learning, according to some preferred embodiments. Screen 928 displays a learning sub-menu disk 928a which, when entered into by inward clicking, leads to screen 929. From screen 929 four different options can be selected. If "SCHEDULE learning" is selected, then in screen 930 the user is notified of how long the learning algorithm has been active (in the example shown, learning has been active for three days). If the user selects "PAUSE LEARNING" then learning is paused, which is reflected in the screen 931. If the user selects "AUTO-AWAY training" then the user is notified of the auto-away function in screen 932. By clicking to continue, the user is asked if the auto away feature should be active in screen 933. If the user selects "SET TEMP." then in screen 934 the user can input the energy-saving temperatures to be used when the home or business is non-occupied, these temperatures being applicable upon either an automatically invoked or a manually invoked away condition. In an alternative embodiment (not shown), the user is able to enter different temperature limits for the automatically invoked away condition versus the manually invoked away condition. According to some embodiments an energy saving icon, such as the leaf icon, is displayed next to the temperatures in screen 934 if those selected temperatures conforms to energy-saving standards or other desirable energy-saving behavior. If the user selects "YES" from screen 933 then the user is notified of the confidence status of the activity/occupancy sensor used for automated auto-away invocation. Screen 935 is an example showing that the activity sensor confidence is too low for the auto-away feature (the automated auto-away invocation) based on to be effective. Screen 937 is an example of a screen shown when the activity/occupancy sensor is "in training" and the progress in percentage is displayed. If and when the activity/occupancy sensor confidence is high enough for the auto-away function to be effective, then another message (not shown) is displayed to notify the user of such. Screen 936 is an example of information displayed to the user pertaining to the leaf icon and is accessed by selecting the leaf icon from the screen 929.

Figure 9E:
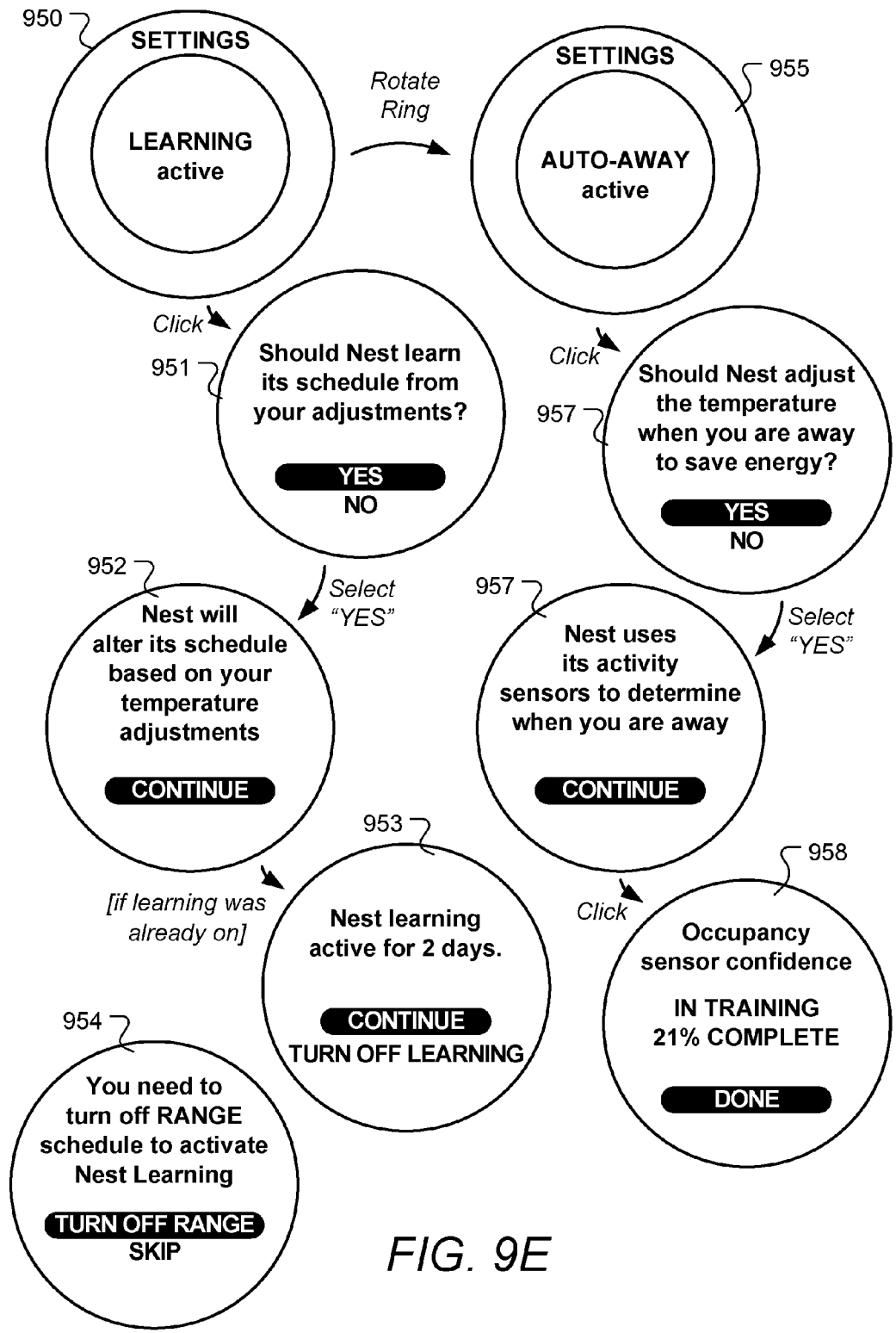

FIG. 9E shows settings sub-menus for learning and for auto-away, according to some alternate embodiments. Screens 950-958 show alternative screens to those shown in FIG. 9D. Upon clicking at the screen 950, in screen 951 the user is asked if learning should be activated based on the user's adjustments, and if yes, then in screen 952 the user is informed that the thermostat will automatically adjust the program schedule based on the user's manual temperature adjustments. In screen 953 the user is notified of how long the learning feature has been active (if applicable). In screen 954 the user is notified that learning cannot be activated due to a conflict with another setting (in this case, the use of a RANGE mode of operation in which both upper and lower setpoint temperatures are enforced by the thermostat).

Upon user ring rotation at screen 950, screen 955 is displayed which allows entry to the auto-away sub-menu. Screen 956 asks if the auto-away feature should be active. Screen 957 notifies the user about the auto-away feature. Screen 958 is an example showing the user the status of training and/or confidence in the occupancy sensors. Other examples instead of screen 958 include "TOO LOW FOR AUTO-AWAY" and "ENOUGH FOR AUTO-AWAY," as appropriate.

Figure 9F:
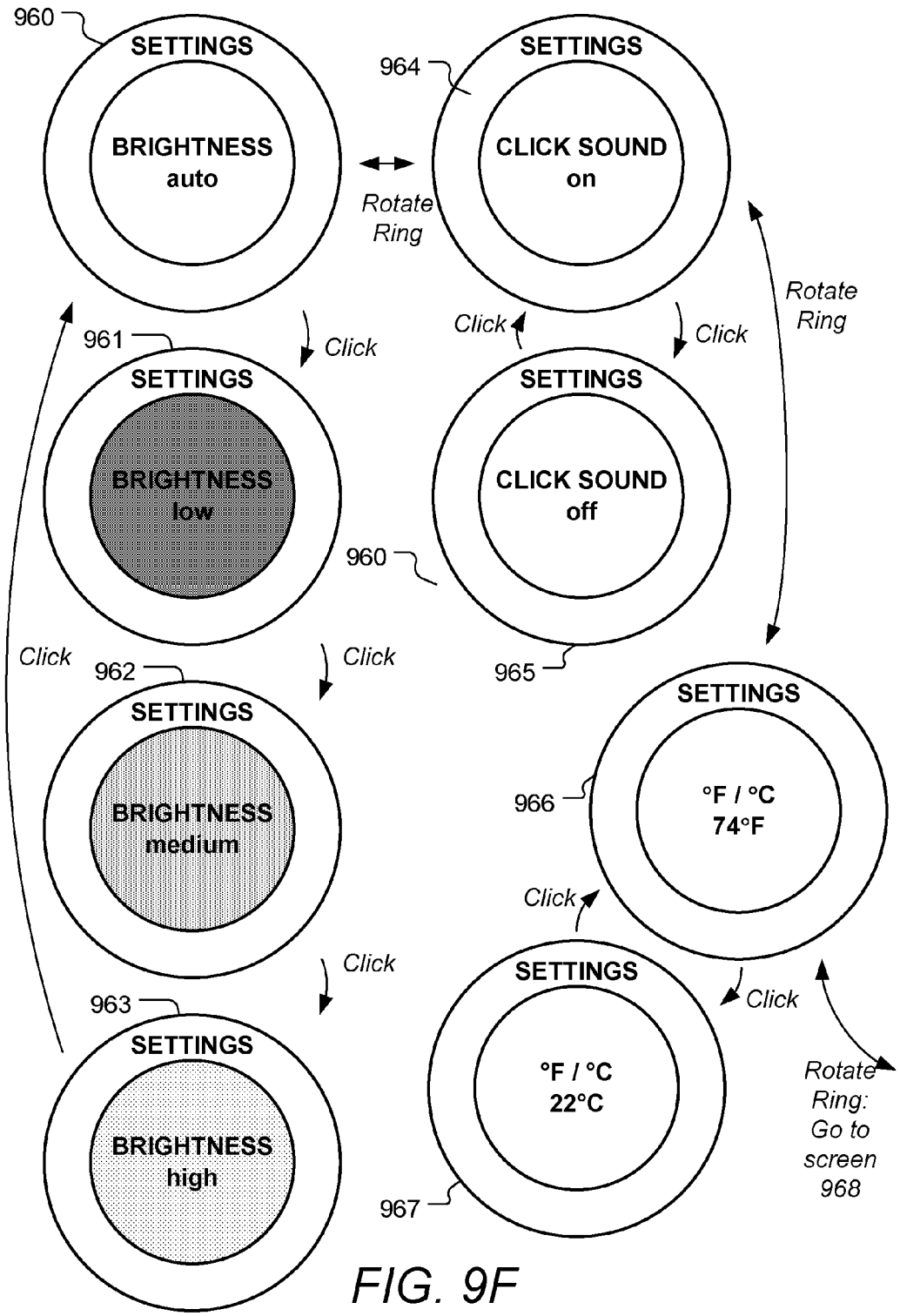

FIG. 9F shows sub-menu screen examples for settings for brightness, click sounds and Celsius/Fahrenheit units, according to some embodiments. Screens 960, 961, 962 and 963 toggle among four different brightness settings using the inward click input as shown in FIG. 9F. Specifically, the settings for auto-brightness, low, medium and high can be selected. According to some embodiments, the brightness of the display is changed to match the current selection so as to aid the user in selecting an appropriate brightness setting. Screens 964 and 965 toggle between providing, and not providing, audible clicking sounds as the user rotates the rotatable ring 312, which is a form of sensory feedback that some users prefer and other users do not prefer. Screens 966 and 967 are used to toggle between Celsius and Fahrenheit units, according to some embodiments. According to some embodiments, if Celsius units is selected, then half-degrees are displayed by the thermostat when numerical temperature is provided (for example, a succession of 21, $21^5$, 22, $22^5$, 23, $23^5$, and so forth in an example in which the user is turning up the rotatable ring on the main thermostat display). According to another embodiment, there is another sub-menu screen disk (not shown) that is equivalent to the "Brightness" and "Click Sound" disks in the menu hierarchy, and which bears one of the two labels "SCREEN ON when you approach" and "SCREEN ON when you press," the user being able to toggle between these two options by an inward click when this disk is displayed. When the "SCREEN ON when you approach" is active, the proximity sensor-based activation of the electronic display screen 316 is provided (as described above with the description accompanying FIG. 8C), whereas when the "SCREEN ON when you press" option is selected, the electronic display screen 316 does not turn on unless there is a ring rotation or inward click.

Figure 9G:
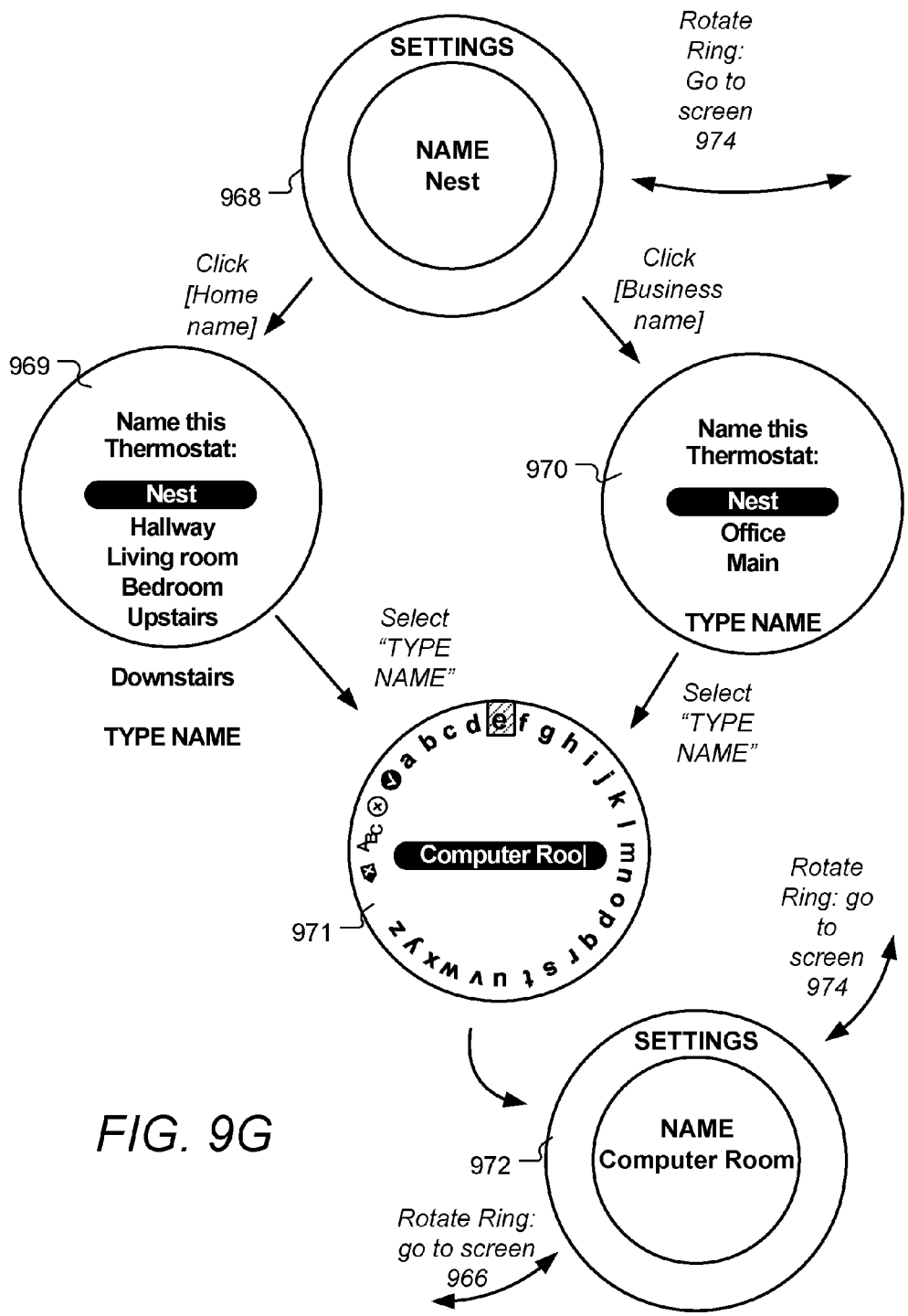

FIG. 9G shows a sub menu for entering or modifying a name for the thermostat, according to some embodiments. Clicking on screen 968 leads to either screen 969 in the case of a home installation or screen 970 in the case of a business installation. In screens 969 and 970 several common names are offered, along with the option of entering a custom name. If "TYPE NAME" is selected from either screen a character input interface 971 is presented through which the user can enter a custom name. The newly selected (or inputted) name for the thermostat is displayed in the central disk as shown in screen 972.

Figure 9H:
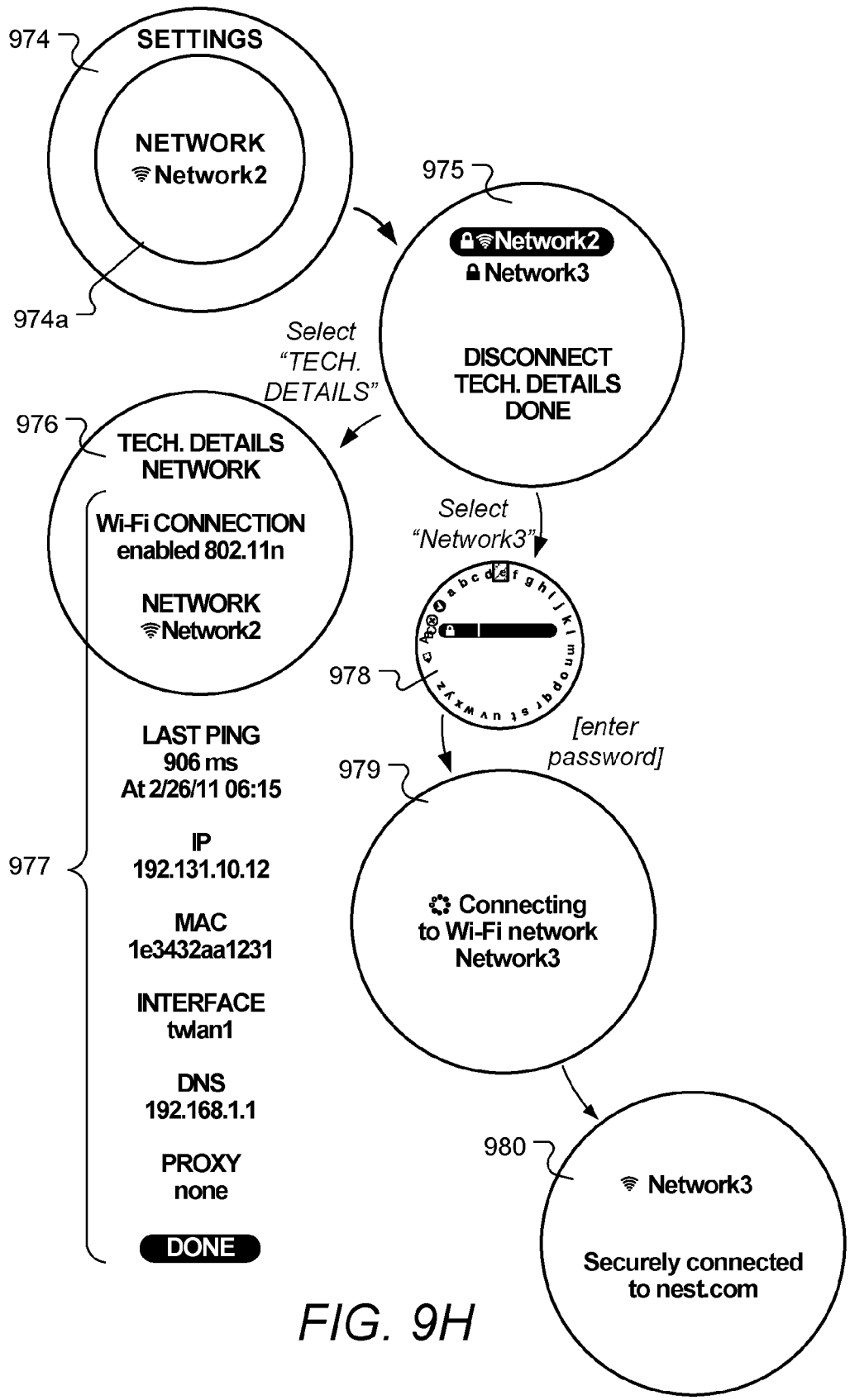

FIG. 9H shows sub-menu screens relating to network connection, according to some embodiments. In FIG. 9H, screen 974 shows a network sub menu disk 974a showing the current connected network name, in this case "Network2." The wireless symbol next to the network name indicates that the wireless connection to that network is currently active. Clicking leads to screen 975 which allows the user to select a different wireless network if available (in this case there is another available network called "Network3"), disconnect or obtain technical network details. If "TECH. DETAILS" is selected then screen 976 is displayed which, by scrolling using the rotatable ring 312, the user can view various technical network details such as shown in the list 977. If a different network is selected from screen 975, then the user is prompted to enter a security password (if applicable) using interface 978, after which a connection attempt is made while screen 979 is displayed. If the connection is successful, then screen 980 is displayed.

Figure 10A:
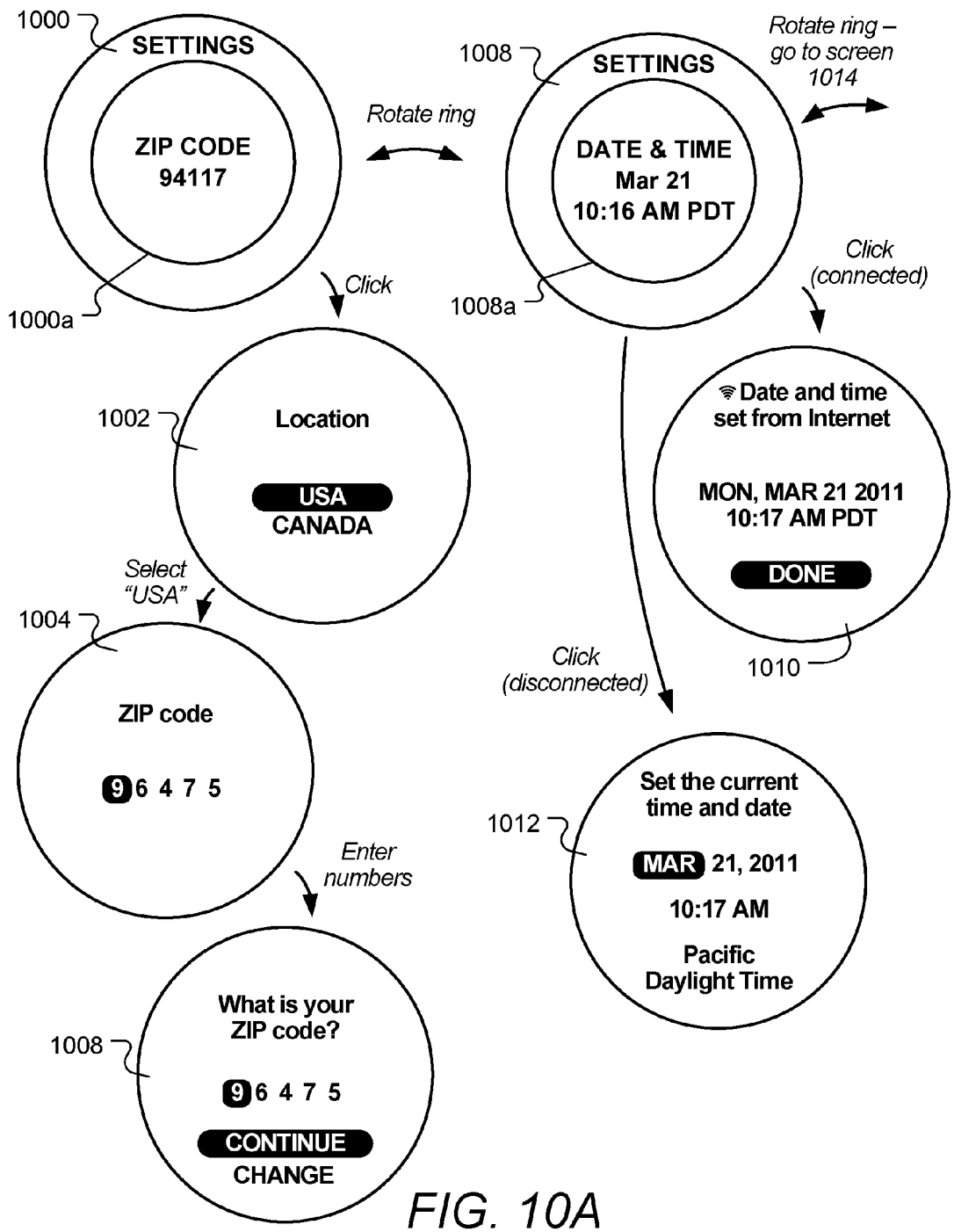

FIG. 10A shows settings screens relating to location and time, according to some embodiments. Screen 1000 shows a sub-menu disk 1000a having the currently assigned zip code (or postal code). Clicking leads to screen 1002 for selecting the country. Selecting the country (e.g. "USA") provides the appropriate ZIP code/postal code format for the following screen. In this case "USA" is selected and the ZIP code is entered on screens 1004 and 1006. Screen 1008 shows a sub-menu disk 1008a having the current time and date. Clicking when the thermostat is connected to the Internet and in communication with the associated cloud-based server automatically sets the time and date as shown in screen 1010. If the thermostat is not connected to the Internet, clicking leads to screen 1012 in which the user can manually enter the time, date and daylight savings time information.

Figure 10B:
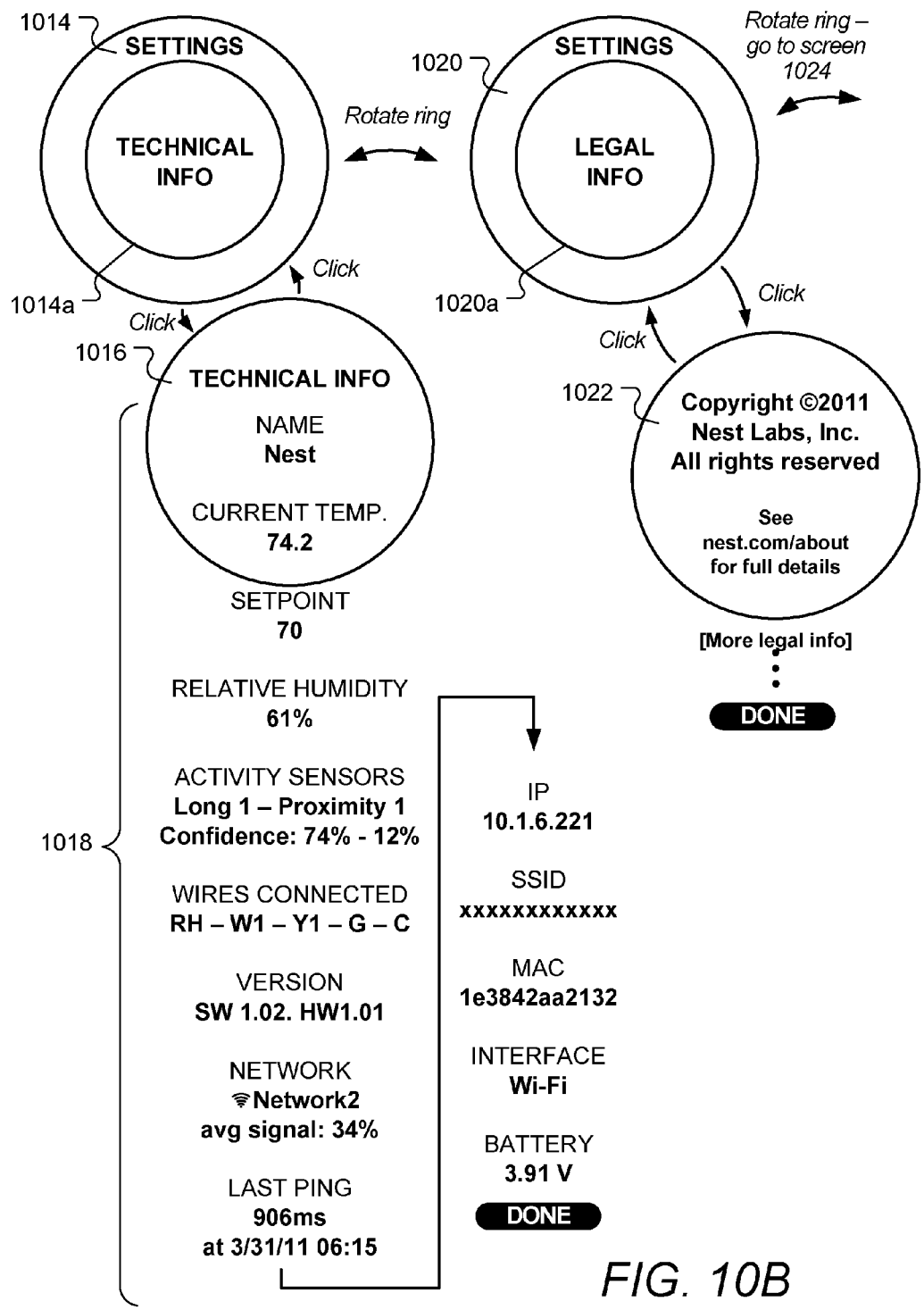

FIG. 10B shows settings screens relating to technical and legal information, according to some embodiments. Screen 1014 shows a sub-menu disk 1014a bearing the TECHNICAL INFO moniker, whereupon clicking on screen 1014 leads to screen 1016 which displays a long list 1018 of technical information which is viewed by scrolling via the rotatable ring 312. Similarly, screen 1020 shows a sub-menu disk 1020a bearing the LEGAL INFO moniker, whereupon clicking on screen 1020 leads to screen 1022 which displays various legal information.

Figure 10C:
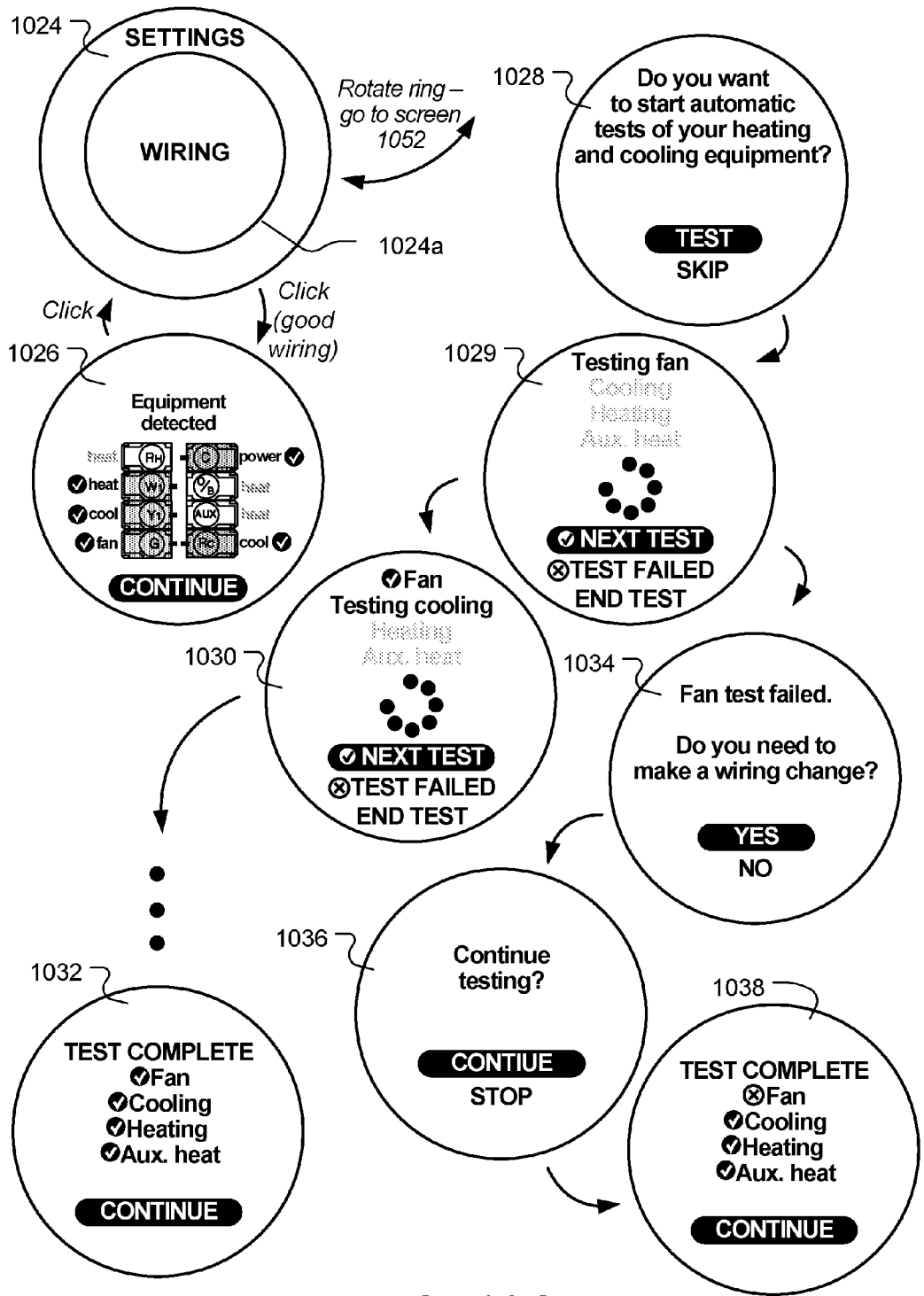
Figure 10D:
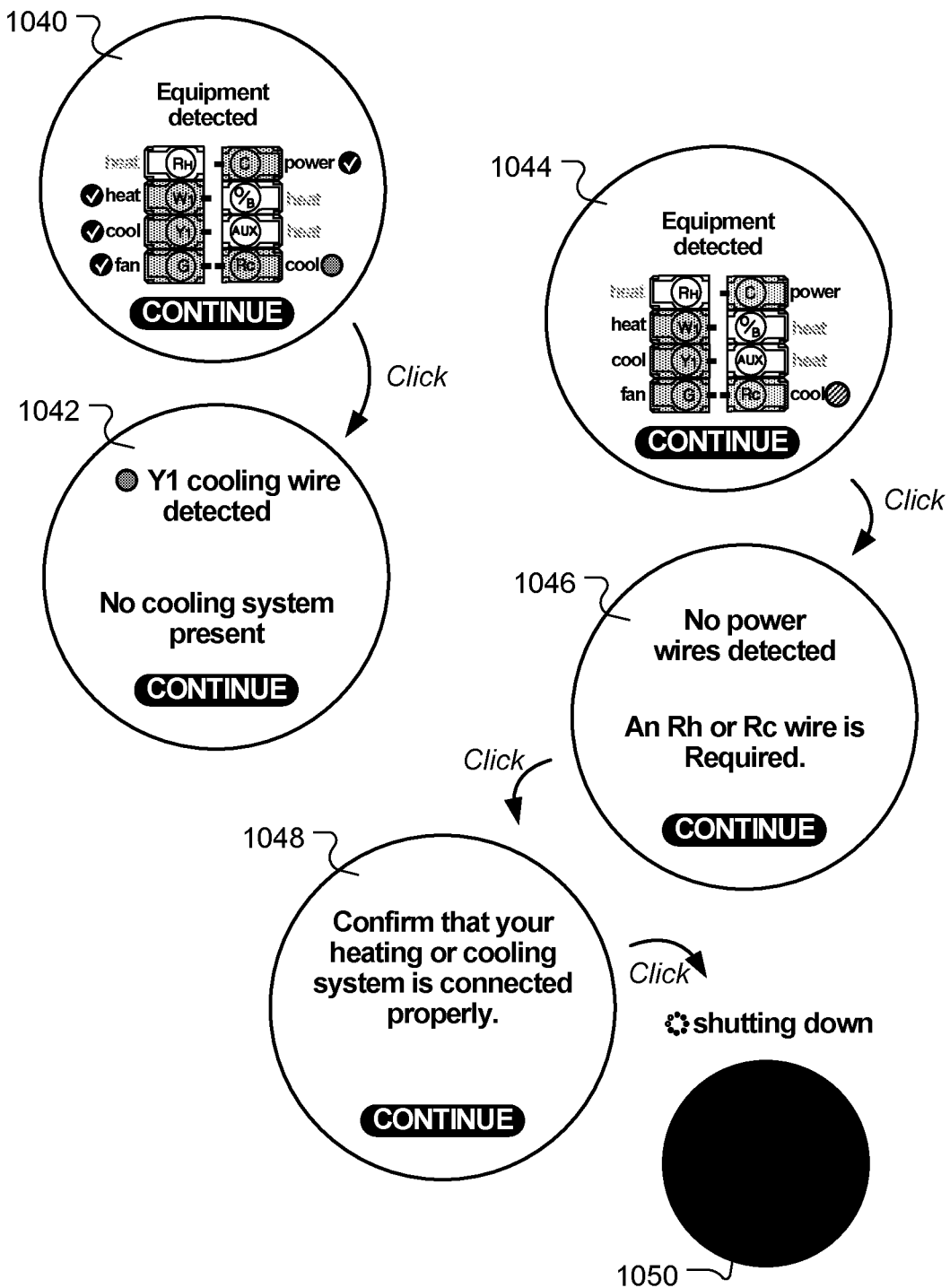

FIGS. 10C and 10D show settings screens relating to wiring and installation, according to some embodiments. In FIG. 10C, screen 1024 shows a sub-menu disk 1024a the provides entry to the wiring settings sub-menu. If no wiring warnings or errors are detected then the wiring is considered "good wiring" and a click displays screen 1026 which shows the connection terminals having the wires connected and the HVAC functionality related to each. This screen is analogous to screen 574 shown in FIG. 5E. According to some embodiments, the wiring and installation settings sub-menu can also perform testing. For example, screen 1028 asks the user if an automatic test of the heating and cooling equipment should be undertaken. Screen 1029 shows an example screen during the automatic testing process when the first item, the fan, is being tested. If the fan test returns satisfactory results (screen 1030) the next testing step is carried out, in this case cooling, with a checkmark next to the word "Fan" notifying the user of the successful completion of the fan test. Screen 1032 shows an example screen where all of the automatic tests have been successfully completed (for an installation that includes a fan, heating, cooling and auxiliary heating). Screen 1034 shows an example of a failed automatic test, in this case the fan test, and asks the user if a wiring change should be made. In screen 1036 the user can elect to continue with the other testing steps, and screen 1038 shows an example of the completion of the testing where one of the steps had an error or test failure (in this case the fan test).

In FIG. 10D, screen 1040 shows an example of a wiring warning, which is denoted by a yellow or otherwise highlighted disk next to the connector terminal label "cool". An inward click input leads to an explanation of the warning, in this case being an error in which there is a wire insertion detected at terminal Y1 but no electronic signature consistent with a cooling system can be sensed. Note that the wiring warning shown in this example is not serious enough to block operation. However, some wiring errors are serious enough such that HVAC operation is blocked. An example is shown in screen 1044 where the wires are detected on the C and Rc terminals but no power is detected. A red disk appears next to the terminal connected labeled "cool" which indicates a wiring error. Clicking leads to an explanation screen 1046 and a notification screen 1048, followed by a mandatory thermostat shut down (blank screen 1050). Examples of detected wiring warnings that do not block operation, and wiring errors that block operation, are discussed supra with respect to FIG. 5E.

Figure 10E:
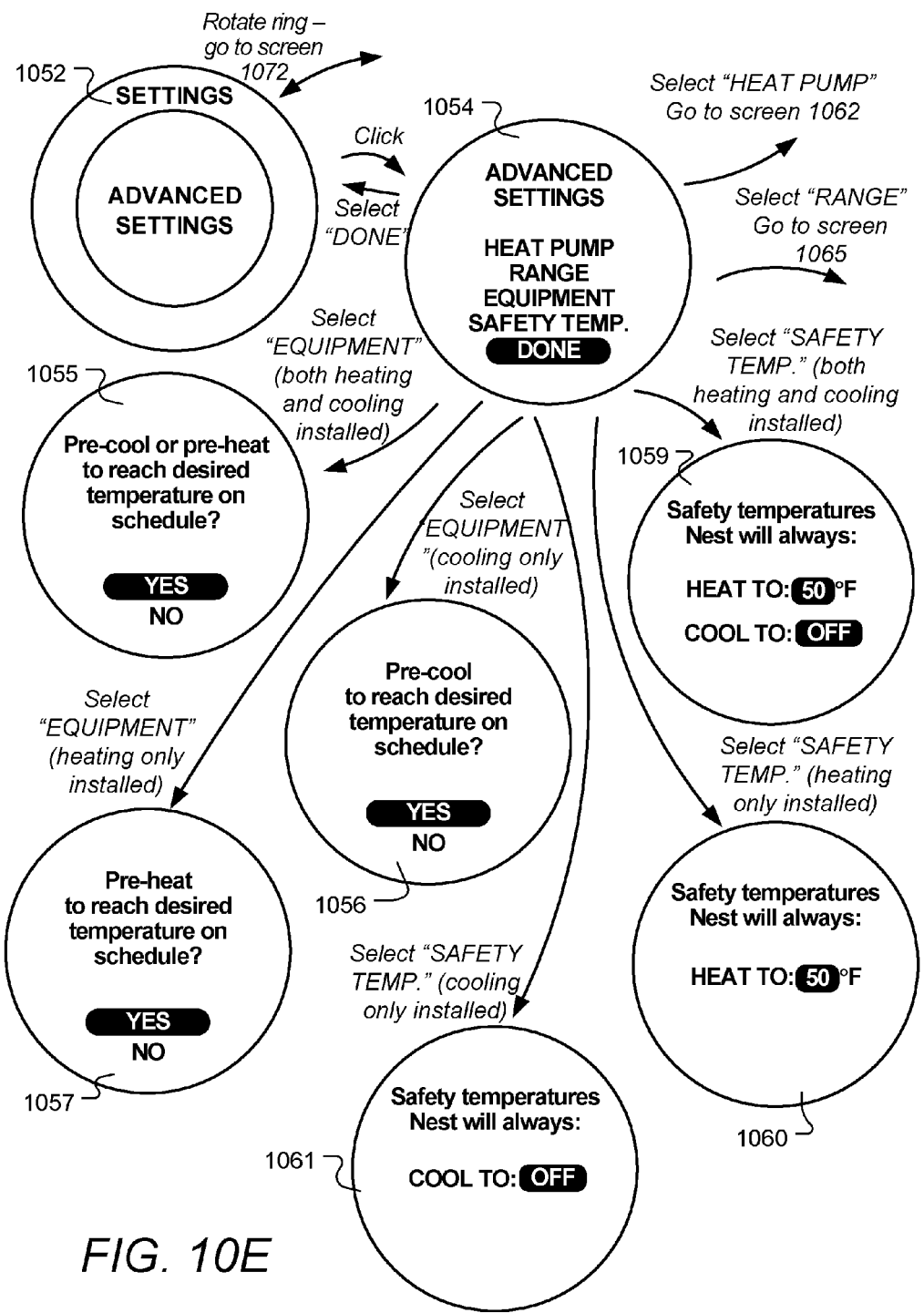
Figure 10F:
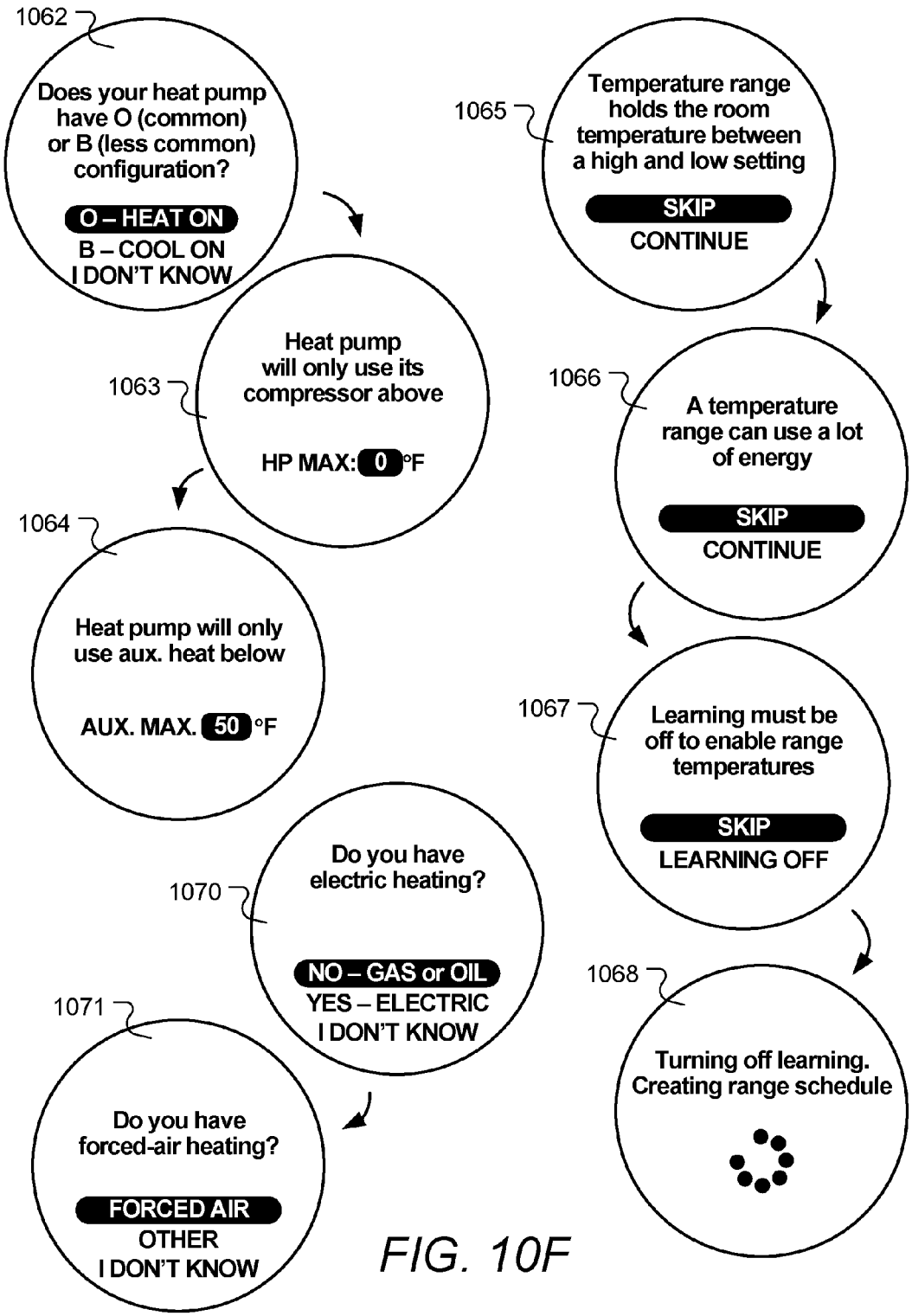

FIGS. 10E and 10F show screens relating to certain advanced settings, according to some embodiments. Screen 1052 shows entry to the advanced settings sub-menu. Inward clicking on the sub-menu disk at screen 1052 leads to an advanced settings sub-menu selection screen 1054. Selecting "EQUIPMENT" leads to some advanced equipment related settings. For example, screens 1055, 1056 and 1057 allow the user to activate pre-heating or pre-cooling, according to what type of equipment is installed. Selecting "SAFETY TEMP." from screen 1054 leads to screens 1059, 1060 and 1061 that allow settings for safety temperatures, which are minimum and maximum temperatures that will be maintained so long as the thermostat is operational. Safety temperatures can be useful, for example, to prevent damage such as frozen pipes, due to extreme temperatures. Selecting "HEAT PUMP" leads to screen 1062 in FIG. 10F. Note that according to some preferred embodiments, the heat pump option in screen 1054 will only appear if a heat pump is installed. Screens 1062, 1063 and 1064 allow settings for heat pump and auxiliary heating configurations. Since heat pump effectiveness decreases with decreasing outside temperature, the user is provided with an option at screen 1063 to not invoke the heat pump below a selected outside temperature. Since auxiliary resistive electric heating is very energy intensive, the user is provided with an option at screen 1064 to not invoke the auxiliary heat above a selected outside temperature. By lowering the temperature in screen 1064, the user can save auxiliary heating energy that might otherwise be used simply to speed up the heating being provided by the slower, but more energy-efficient, heat pump. For some embodiments, the real-time or near-real-time outside temperature is provided to the thermostat 300 by the cloud-based server based on the ZIP code or postal code of the dwelling. Selecting "RANGE" from screen 1054 leads to temperature range settings screens 1065, 1066, 1067 and 1068. The user is warned that enabling temperature ranges can use high levels of energy and that automatic learning has to be disabled. Screens 1070 and 1071 show examples of questions to ascertain the type of heating system installed.

Figure 10G:
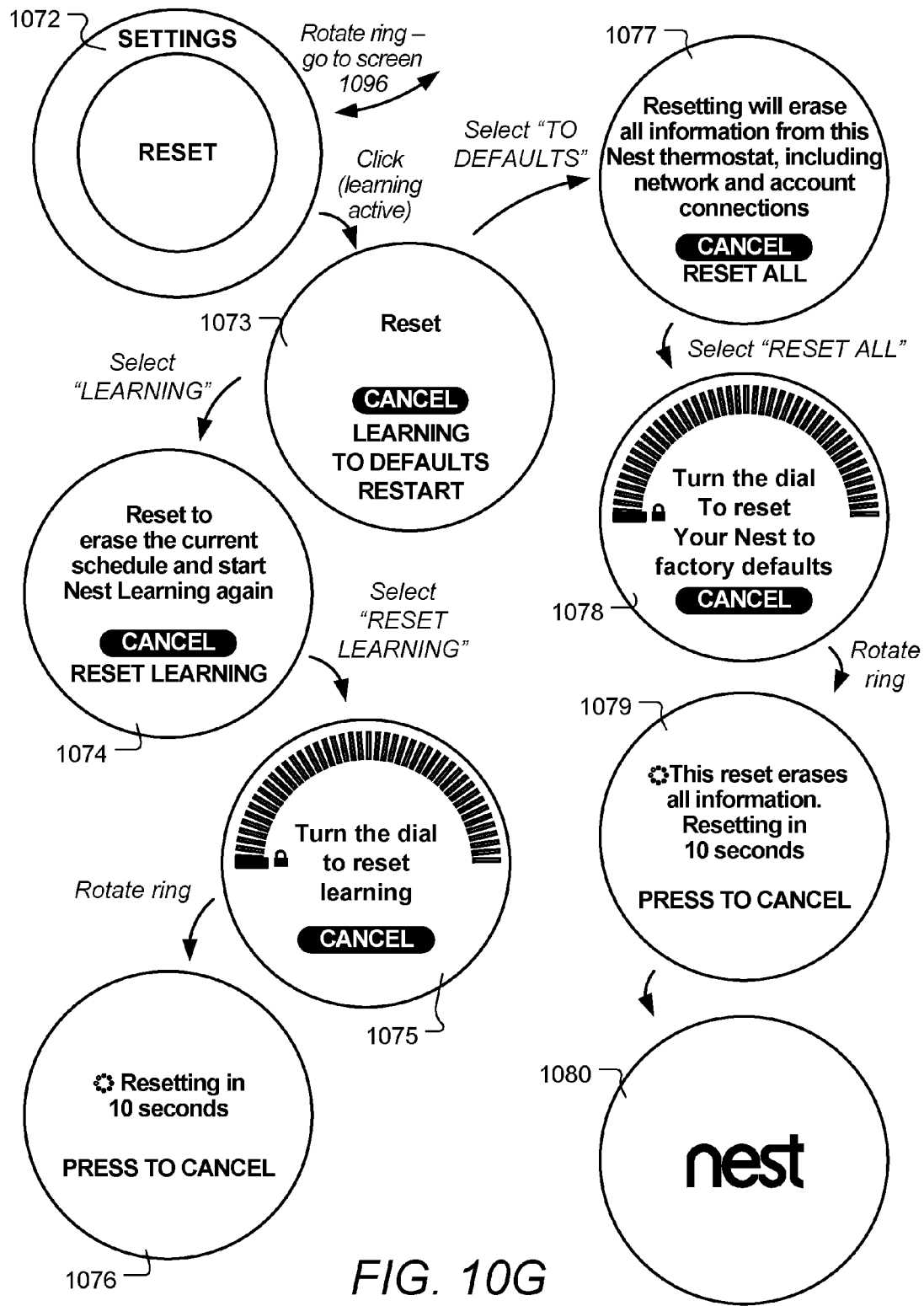
Figure 10H:
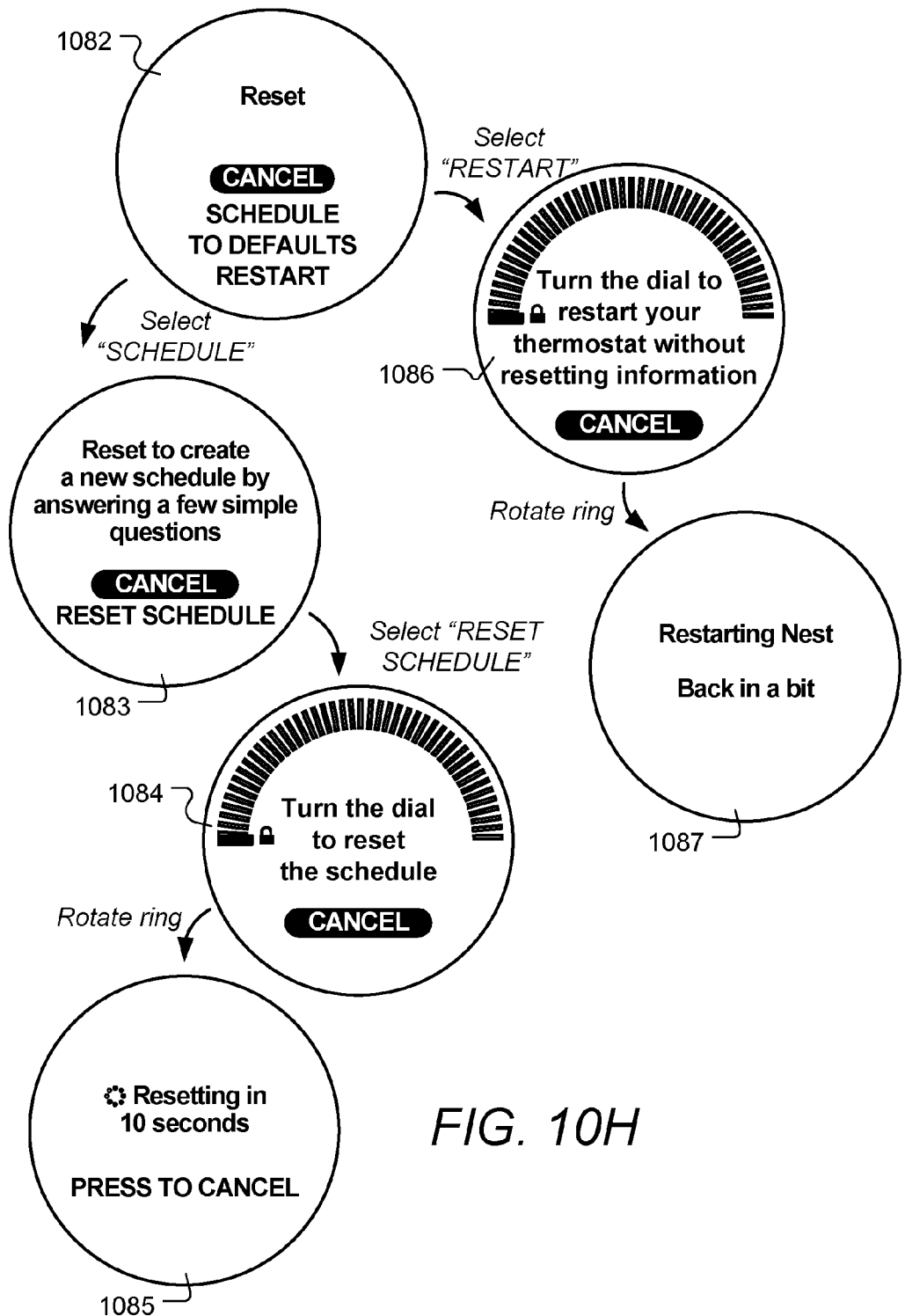
Figure 10I:
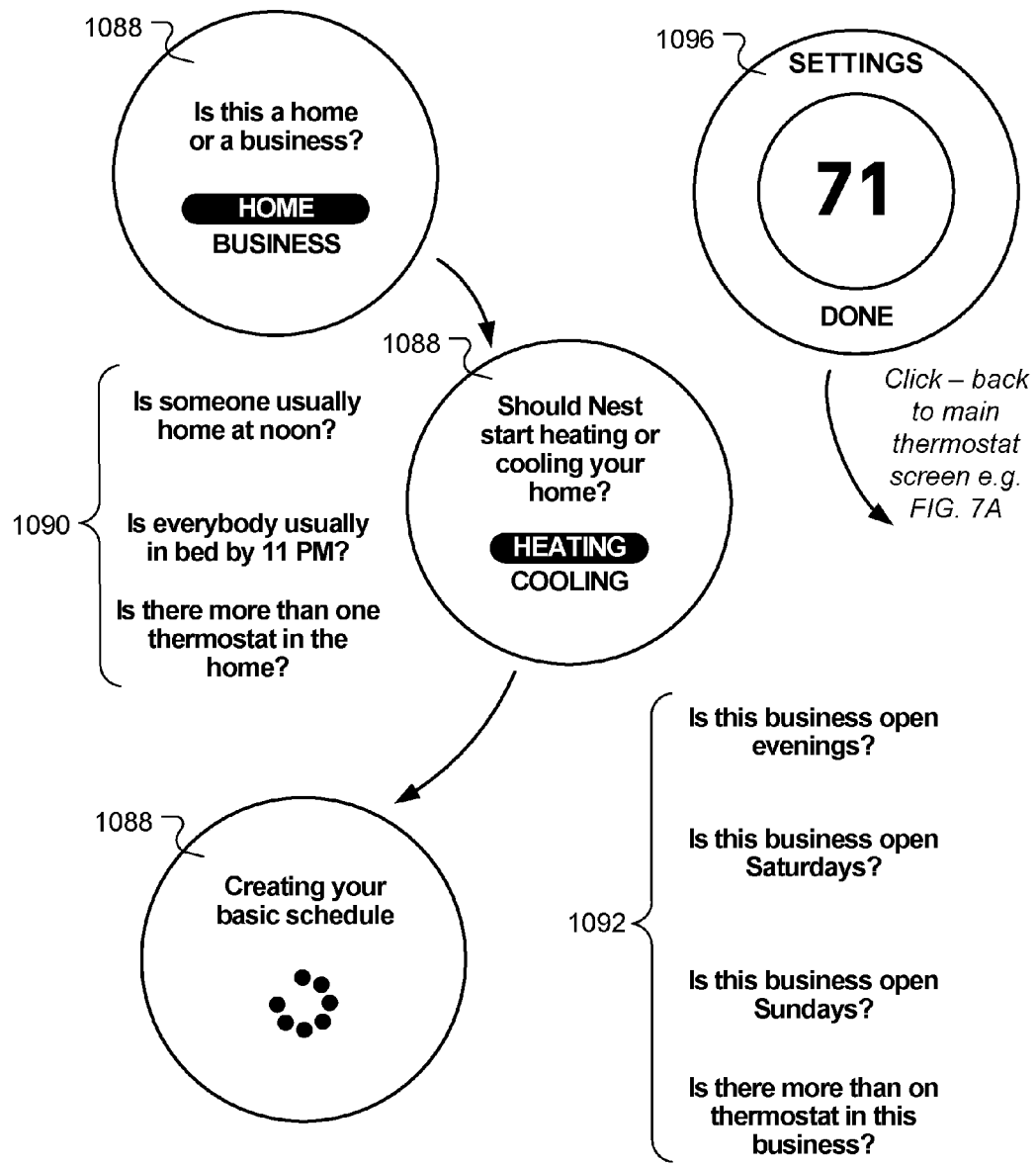

FIGS. 10G, 10H and 10I show screens relating to resetting the thermostat, according to some embodiments. Screen 1072 shows entry into the reset settings sub-menu. If learning is currently active, clicking at screen 1072 leads to screen 1073. If "LEARNING" is selected, then in screens 1074, 1075 and 1076 the user can reset the learning so as to erase the current schedule and learning data. Note that screen 1075 provides a way of confirming the user's agreement with the procedure (which includes forgetting the data learned up until the present time) by asking the user to rotate the rotatable ring to that the large tick mark moves through the background tick-arc as shown. Further, the user in screen 1076 is given a time interval, in this case 10 seconds, in which to cancel the learning reset process. The reset dial and the cancellation interval effectively reduce the risk of the user inadvertently performing certain reset operations involving learned data loss. Selecting "DEFAULTS" from screen 1073 leads to screens 1077, 1078, 1079 and 1080 which erases all information from the unit and returns the thermostat unit to factory defaults. This operation could be useful, for example if the user wishes to sell the unit to someone else. If learning is not active when screen 1072 is clicked, then screen 1082 is displayed instead of screen 1073. Selecting "SCHEDULE" at screen 1082 leads to screens 1083, 1084 and 1085 which allow the user to reset the current schedule information. Selecting "RESTART" leads to screens 1086 and 1087 in which the user can re-boot the thermostat, again providing some protection against unintended data loss (in this case, the particular schedule that the user may have taken some time to establish).

FIG. 10I shows example screens following a reset operation. If the reset operation erased the information about home or business installation then screen 1088 can be displayed to obtain this setting. According to some embodiments basic questions are used to establish a basic schedule. Example questions 1090 are for a home installation, and example questions 1092 are for a business installation. Screens 1094 and 1095 show further screens in preparing a basic schedule. Screen 1096 shows the final settings screen, which is reachable by rotating the ring from screen 1072, allowing for a way for the user to exit the settings menu and return to standard thermostat operation. According to some embodiments, one or more other "exit" methods can be provided, such as clicking and holding to exit the settings menus.

Figure 11A:
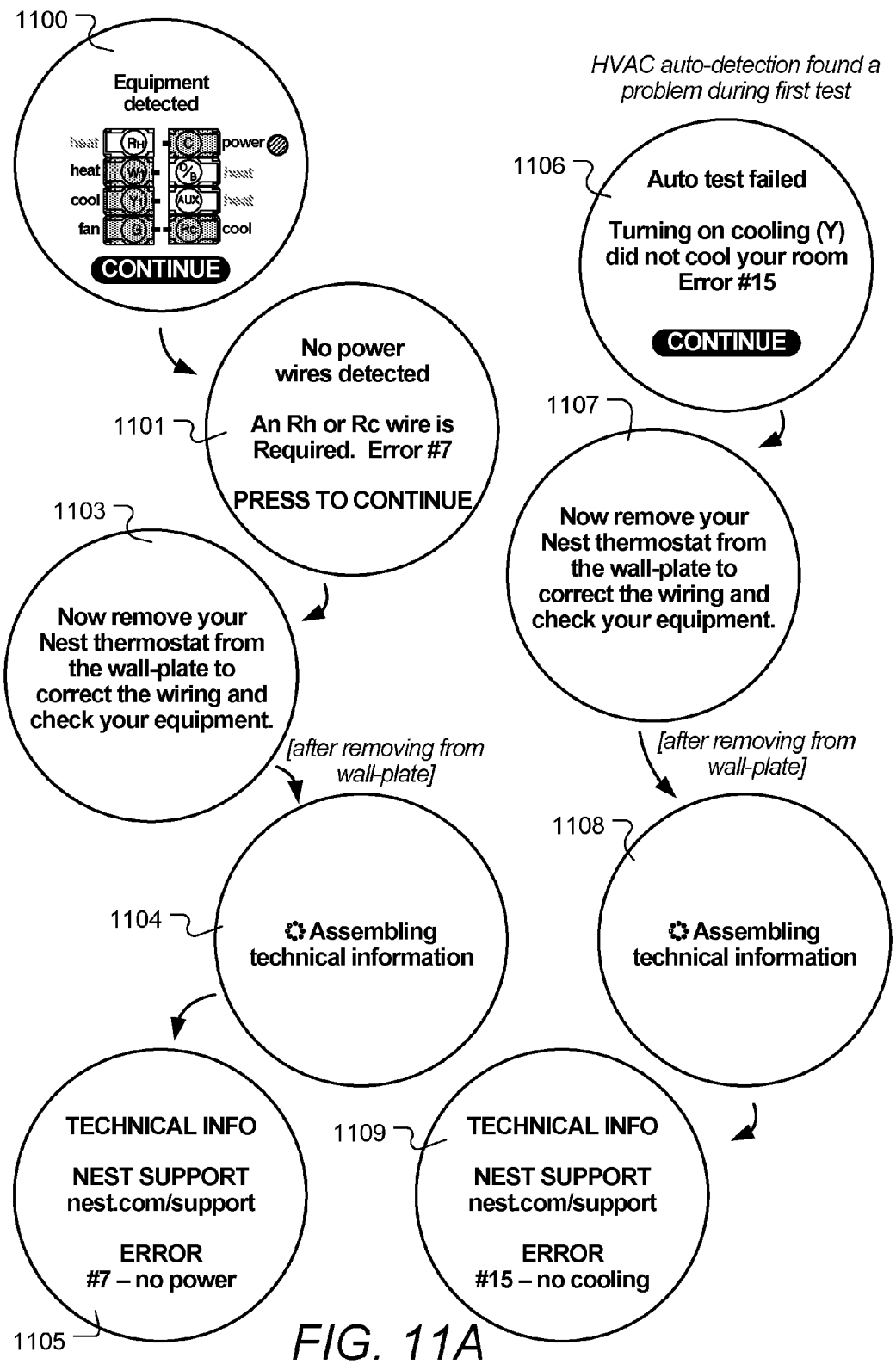
FIGS. 11A-D show example screens for various error conditions on a user-friendly a programmable thermostat, according to some embodiments.
Figure 11B:
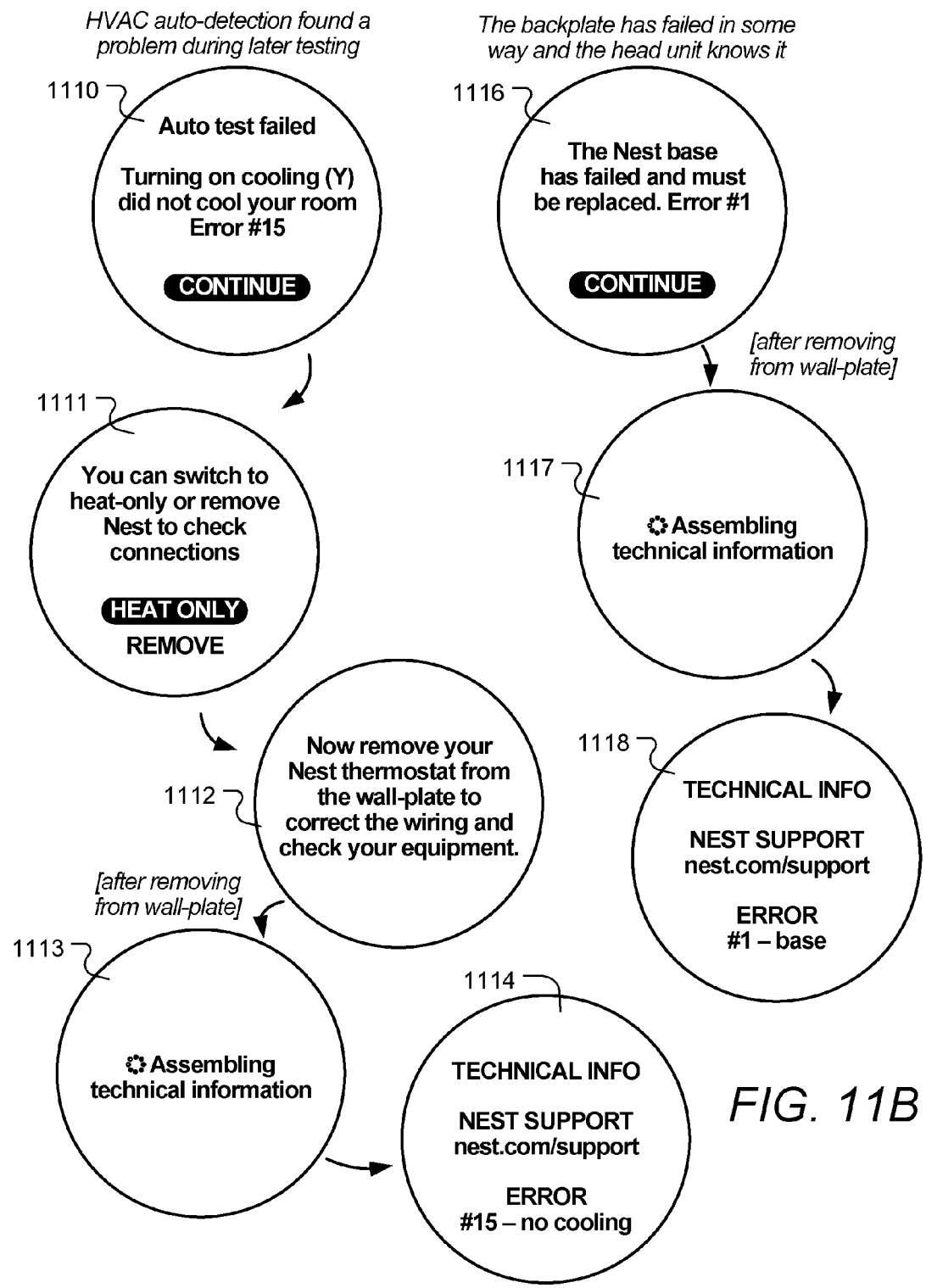
Figure 11C:
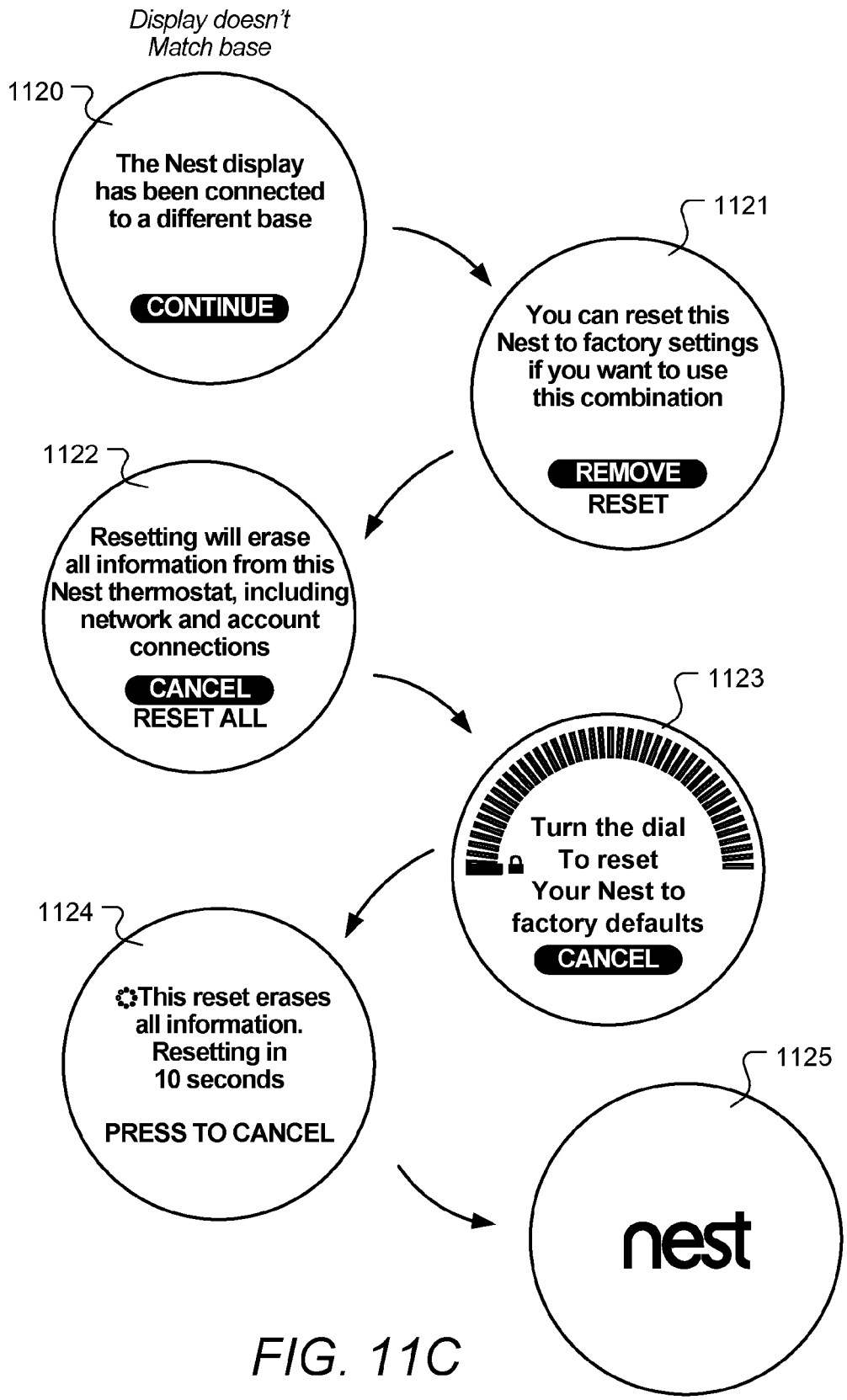
Figure 11D:
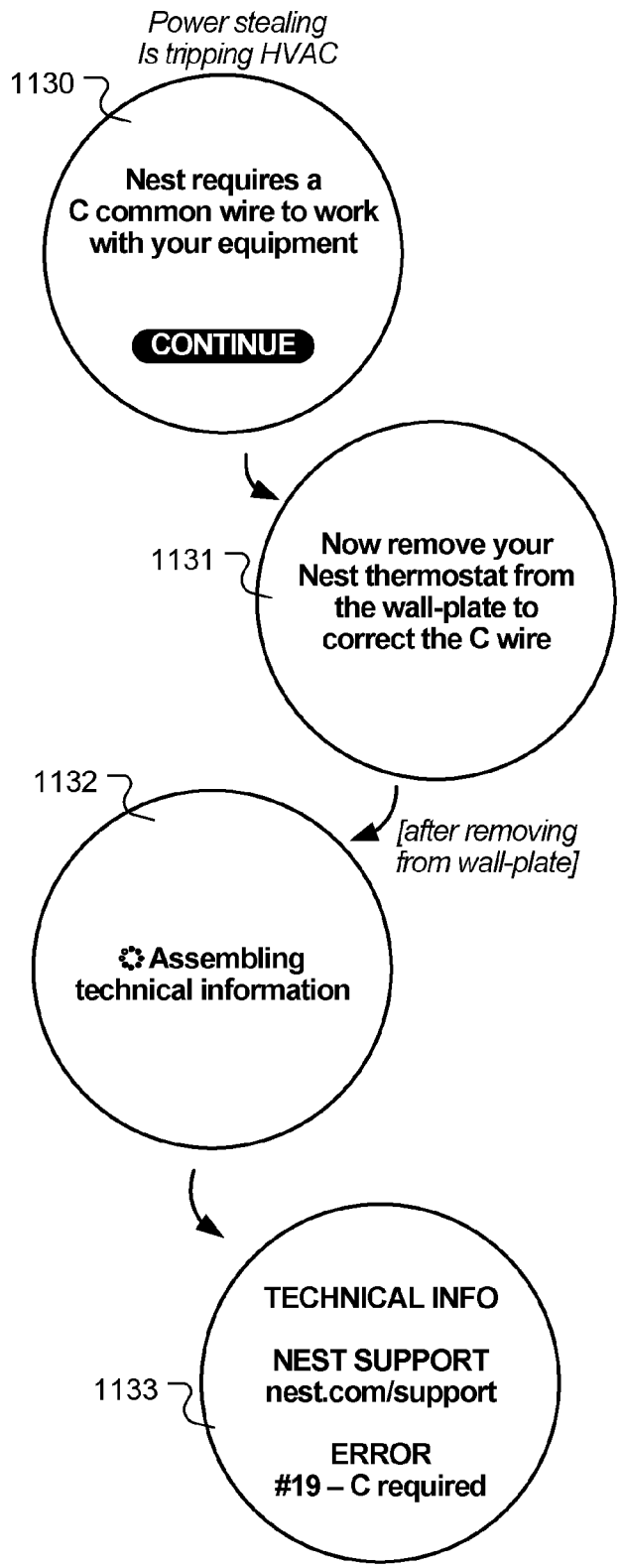

FIGS. 11A-D show example screens for various error conditions, according to some embodiments. The screens shown, according to some embodiments, are displayed on a thermostat 300 on round dot-matrix electronic display 316 having a rotatable ring 312 such as shown and described in FIGS. 3A-4. In FIG. 11A, screens 1100, 1101, 1103, 1104 and 1105 show an example of a power wiring error. A red disk next to the power connector terminal label in screen 1100 shows the there is a power wire related error. Clicking leads to screen 1101 that explains the wiring error condition, including an error number associated with the error. Screen 1103 instructs the user to remove the thermostat head unit from the back-plate and to make corrective wiring connections, if possible. Screen 1104 is displayed while the thermostat is performing a test of the wiring condition following re-attachment of the head unit to the back-plate. If the error persists, screen 1105 displays information for the user to obtain technical support, as well as an error number for reference. Screens 1106, 1107, 1108 and 1109 show an example for an error where HVAC auto-detection found a problem during its initial automated testing (e.g. performed during the initial installation of the thermostat), such initial automated testing being described, for example, in U.S. Ser. No. 13/038,191, supra. In FIG. 11B, screens 1110, 1111, 1112, 1113 and 1114 show an example for an error where HVAC auto-detection found a problem during later testing. Screens 1116, 1117 and 1118 show an example where the head unit (see FIG. 4, head unit 410) had detected that the back-plate (see FIG. 4, back plate 440) has failed in some way. In FIG. 11C, thermostat screens 1120, 1121, 1122, 1123, 1124 and 1125 show an example of when the head unit detects that it has been attached to a different baseplate than it expects. The user given the option in screen 1120, to either remove the head unit from the baseplate, or reset the thermostat to its factory default settings. In FIG. 11D, screens 1130, 1131, 1132 and 1133 show an example in which power stealing (or power harvesting) is causing inadvertent tripping or switching of the HVAC function (e.g. heating or cooling). In this case the user is informed that a common wire is required to provide power to the thermostat.

Figure 12A:
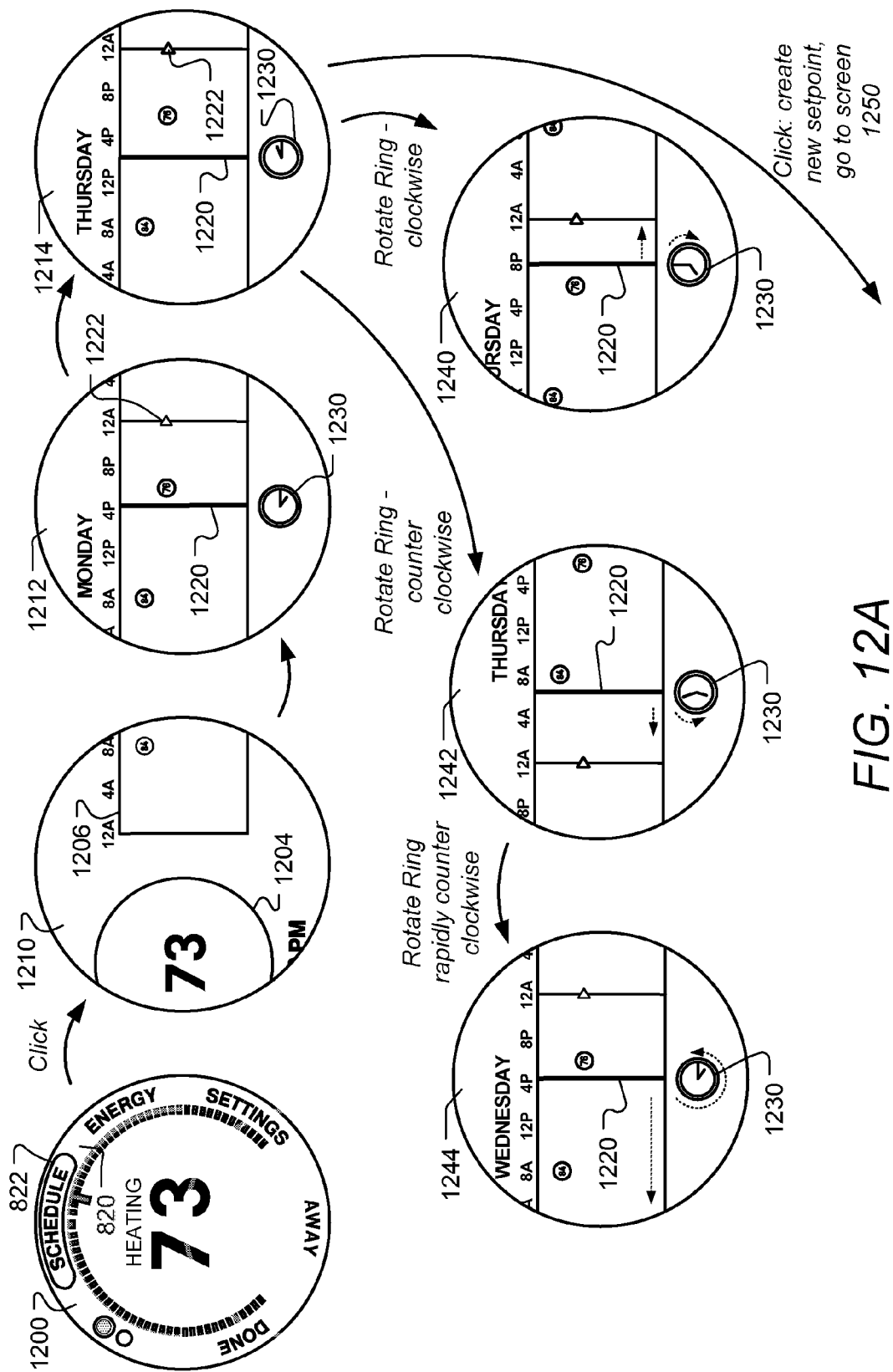
FIGS. 12A and 12B show certain aspects of user interface navigation trough a multi-day program schedule on a user-friendly programmable thermostat, according to some preferred embodiments.
Figure 12B:
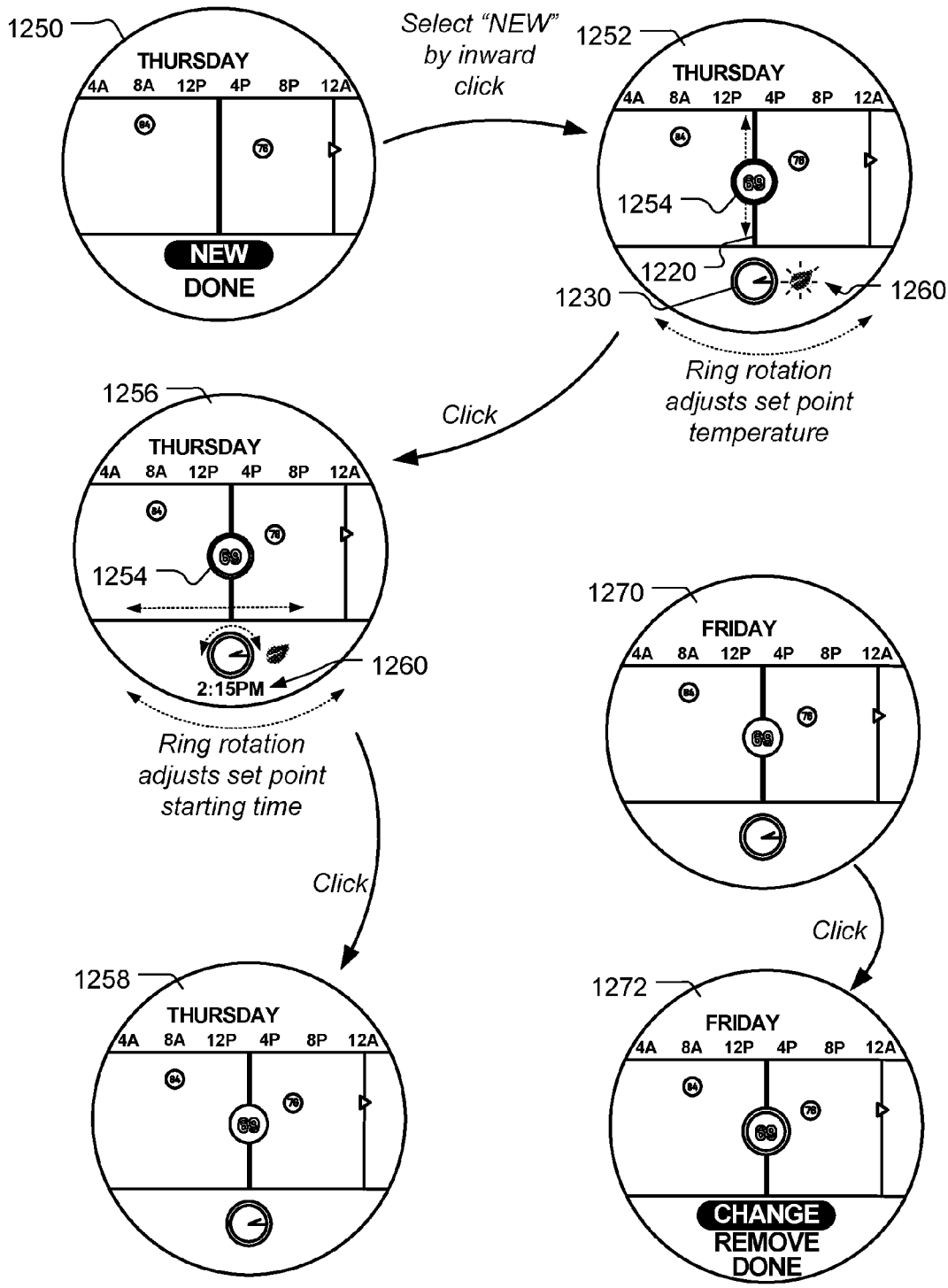

FIGS. 12A and 12B show certain aspects of user interface navigation through a multi-day program schedule, according to some preferred embodiments. The screens shown, according to some embodiments, are displayed on a thermostat 300 on round dot-matrix electronic display 316 having a rotatable ring 312 such as shown and described in FIGS. 3A-4. In FIG. 12A, screen 1200 includes a rotating main menu 820 with an active window 822, as shown and described with respect to FIG. 8A. Selecting "SCHEDULE" leads to an animated transition from the rotating main menu screen to a horizontally-oriented week-long schedule viewer/editor. One example of an animated transition from the rotating main menu screen to a horizontally-oriented week-long schedule according to some embodiments is illustrated in the commonly assigned U.S. Ser. No. 29/399,636, supra. Screens 1210, 1212 and 1214 show portions of the animated transition. Screen 1210 shows a shifting or translation to the schedule display that preferably begins with a removal of the circular main menu (e.g. similar to FIG. 7A), followed by a shrinking (or zoom-out) of the circular standard thermostat view 1204. Along with the shrinking, the circular standard view 1204 begins to shift or translate to the left while the rectangular horizontally-oriented week-long schedule 1206 begins to appear from the right as shown in screen 1210. The week-long schedule begins with Monday, as shown in screen 1212, and continues to translate to a position that corresponds to the current time and day of the week, which in this example is 2:15 PM on Thursday, which is shown in screen 1214. The horizontally-oriented schedule has a plot area in which the vertical axis represents the temperature value of the setpoints and the horizontal axis represents the effective time (including the day) of the setpoints. The schedule display includes a day of the week label, labels for each 4 hours (e.g. 12A, 4A, 8A, 12P, 4P, 8P and 12P), a central horizontal cursor bar 1220 marking the current schedule time, as well as a small analog clock 1230 that displays hands indicating the current schedule time. Setpoints are indicated as circles with numbers corresponding to the setpoint temperature, and having a position corresponding to the setpoint temperature and the time that the setpoint becomes effective. According to some embodiments, the setpoint disks are filled with a color that corresponds to heating or cooling (e.g. orange or blue). Additionally, a continuation indicator mark 1222 may be included periodically, for example at each day at midnight, that show the current setpoint temperature at that point in time. The continuation indicator mark can be especially useful, for example, when there are large time gaps between setpoints such that the most recent setpoint (i.e. the active setpoint) may no longer be visible on the current display.

According to some embodiments, timewise navigation within the week-long schedule is accomplished using the rotatable ring 312 (shown in FIG. 3A). Rotating the ring clockwise shifts the schedule in one direction, such as in screen 1240, which is moves forward in time (i.e. the schedule plot area shifts to the left relative to the centrally located current schedule time cursor bar 1220, and the analog clock 1230 spins forward in displayed time). Rotating the ring counter-clockwise does the opposite, as shown in screen 1242, shifting the schedule backwards in time (i.e. the schedule plot area shifts to the right relative to the centrally located current schedule time cursor bar 1220, and the analog clock 1230 spins backward in displayed time). According to some preferred embodiments, the schedule time adjustment using the rotatable ring is acceleration-based. That is, the speed that the schedule time is adjusted is based on the speed of rotation of the ring, such that detailed adjustments in the current schedule time can be made by slowly rotating the ring, while shifts from day to day or over multiple days can be made by rapidly rotating the ring. According to some embodiments, the difference in acceleration rate factor is about 4 to 1 between the fastest and slowest rotating speeds to achieve both adequate precision and easy movement between days, or to the end of the week. Screen 1244 shows an example of more rapid movement of the rotatable ring, where the schedule has been shifted at a higher rate factor than in screen 1242. According to some embodiments the schedule time adjustments are accompanied by audible "click sound" or other noise to provide further feedback and further enhance the user interface experience. According to some preferred embodiments, the audible clicks correspond to each 15 minutes of schedule time that passes the time cursor bar 1220.

If the time cursor bar 1220 is not positioned on an existing setpoint, such as shown in screen 1214, and an inward click is received, a create new setpoint option will be offered, as in screen 1250 of FIG. 12B. In screen 1250, if the user selects "NEW" then a new setpoint disk 1254 will appear on the time cursor bar 1220, as shown in screen 1252. For some embodiments, this "birth" of the new setpoint disk 1254 proceeds by virtue of an animation similar to that illustrated in the commonly assigned U.S. Ser. No. 29/399,637, supra, wherein, as soon as the user clicks on "NEW," a very small disk (much smaller than the disk 1254 at screen 1252) appears near the top of the cursor bar 1220, and then progressively grows into its full-size version 1254 as it visibly "slides" downward to "land" at a vertical location corresponding to a starting temperature setpoint value. For some embodiments, the starting temperature setpoint value is equal to that of an immediately preceding setpoint in the schedule. Rotating the ring will then adjust the setpoint temperature of the new setpoint disk 1254 upward or downward from that starting temperature setpoint value. According to some embodiments, an energy savings encouragement indicator, such as the leaf logo 1260, is displayed when the new setpoint temperature corresponds to energy-saving (and/or cost saving) parameters, which aids the user in making energy-saving decisions. Once the temperature for the new setpoint is satisfactory, an inward click allows adjustment of the setpoint time via the rotatable ring, as shown in screen 1256. Once the start time for the new setpoint is satisfactory, another inward click establishes the new setpoint, as shown in screen 1258. If the time cursor bar 1220 is positioned on an existing setpoint, such as shown in screen 1270, an inward click brings up a menu screen 1272 in which the user can choose to change the setpoint, remove the setpoint or return out of the schedule viewer/editor. If the user selects "CHANGE" then the user can make adjustments to the temperature and start time similar to the methods shown in screens 1252 and 1256, respectively.

According to some embodiments, setpoints must be created on even quarter-hours (i.e. on the hour, or 15, 30 or 45 minutes past), and two setpoints cannot be created or moved to be less than 60 minutes apart. Although the examples shown herein display a week-long schedule, according to other embodiments, other time periods can be used for the displayed schedule, such as daily, 3-day, two weeks, etc.

Figure 13:
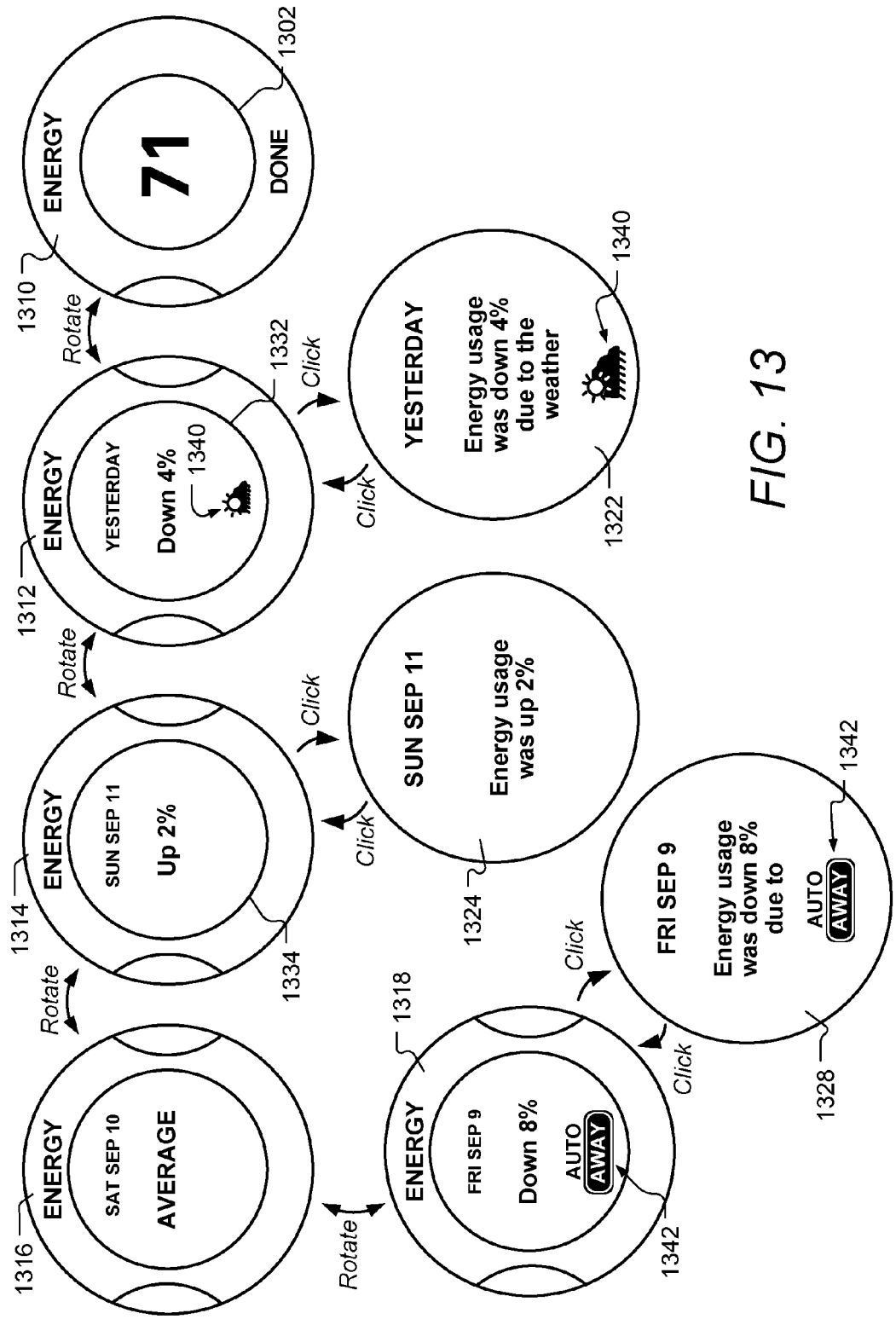
FIG. 13 shows example screens relating to the display of energy usage information on a user-friendly a programmable thermostat, according to some embodiments.

FIG. 13 shows example screens relating to the display of energy usage information, according to some embodiments. The screens shown, according to some embodiments, are displayed on a thermostat 300 on round dot-matrix electronic display 316 having a rotatable ring 312 such as shown and described in FIGS. 3A-4. From the rotating main menu such as shown in FIG. 8A, if the "ENERGY" option is selected, an interactive energy information viewer is displayed. According to some embodiments a shrinking and shifting of the standard thermostat display transition is used similar to the transition to the schedule viewer/editor described above. For example, screen 1310 (see upper right side of FIG. 13) includes a shrunken disk 1302 that corresponds to the current standard thermostat display (such as FIG. 7A), except that it is reduced in size. Rotating the ring shifts the energy viewer to display energy information for a progression of prior days, each day being represented by a different window or "disk". For example, rotating the ring from the initial position in screen 1310 leads first to screen 1312 (showing energy information for "yesterday"), then to screen 1314 (showing energy information for the day before yesterday), then to screen 1316 (for three days prior), and then to screen 1318 (for four days prior), and so on. Preferably, the shifts between progressive disks representative of respectively progressive time periods proceeds as an animated shifting translation in a manner similar to that described for FIG. 9A (screens 900-902-908) and the commonly assigned U.S. Ser. No. 29/399,621, supra. According to some embodiments, the shifting information disks continue for 7 days prior, after which summary information is given for each successive prior week. Shown on each energy information disk is a measure of the amount of energy used relative to an average. For example, in disk 1332 for "yesterday" the energy usage was 4% below average, while in disk 1334 for Sunday September 11 the energy usage was up 2%. Additionally, according to some embodiments, an explanatory icon or logo is displayed where a primary reason for the change in energy usage can be determined (or estimated). For example, in screen 1322 a weather logo 1340 is displayed when the usage change is deemed primarily due to the weather, and an auto-away logo 1342 is displayed when the usage change is deemed primarily due to the auto-away detection and settings. Other logos can be used, for example, to represent changes in usage due to manual setpoint changes by users. Clicking on any of the information disk screens 1312, 1314 and 1318 lead to more detailed information screens 1322, 1324 and 1328 respectively.

Figure 14:
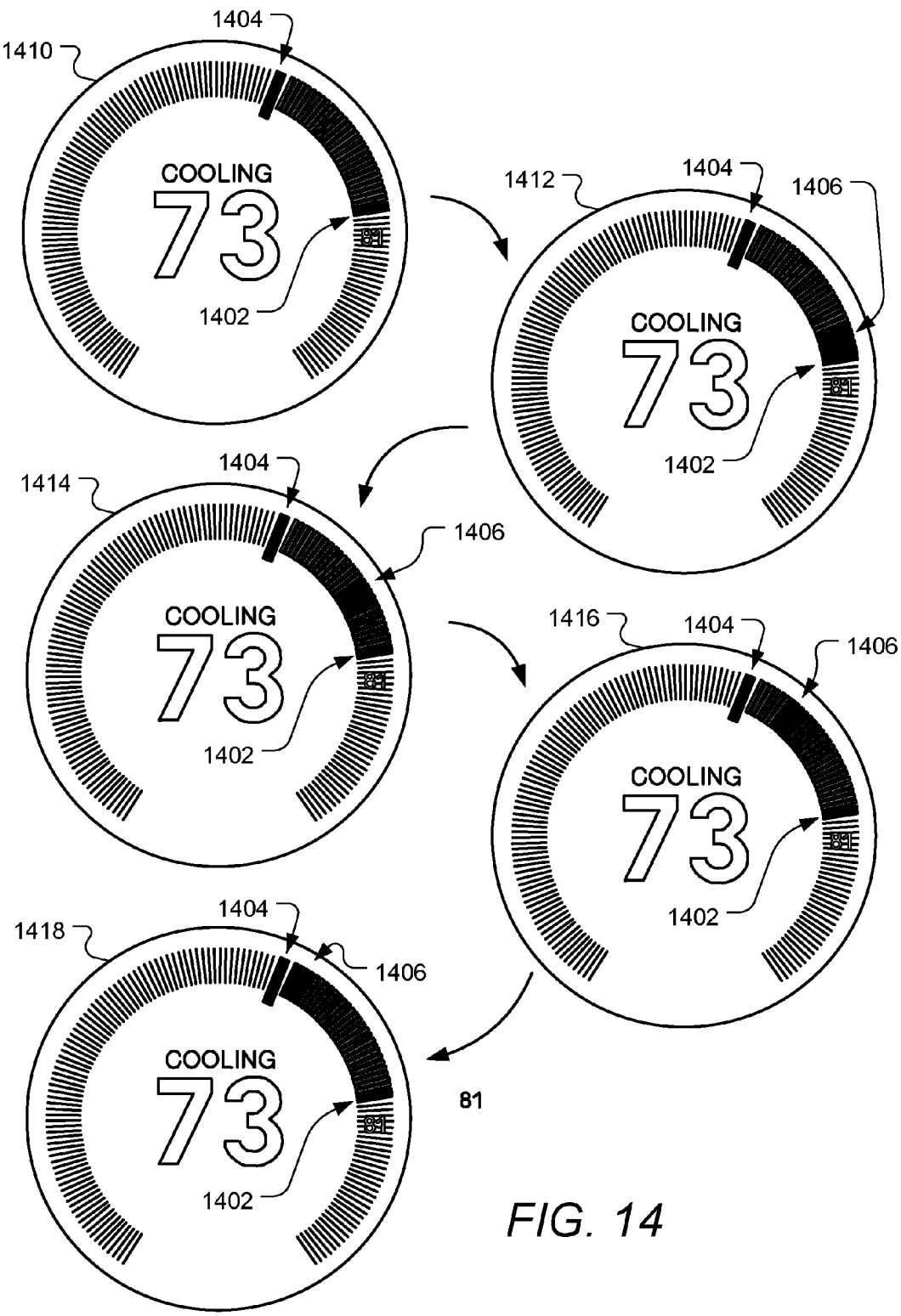
FIG. 14 shows example screens for displaying an animated tick-sweep on a user-friendly a programmable thermostat, according to some embodiments.

FIG. 14 shows example screens for displaying an animated tick-sweep, according to some embodiments. The screens shown, according to some embodiments, are displayed on a thermostat 300 on round dot-matrix electronic display 316 having a rotatable ring 312 such as shown and described in FIGS. 3A-4. An animation is preferably displayed to enhance the user interface experience in which several highlighted background tick marks "sweep" across the space starting at the current temperature tick mark and ending at the setpoint temperature tick mark. One example of an animated tick-sweep according to some embodiments is illustrated in the commonly assigned U.S. Ser. No. 29/399,630, supra. In the case of cooling, shown in successive screens 1410, 1412, 1414, 1416 and 1418, highlighted background tick marks 1406 "sweep" from the current temperature tick mark 1402 to the setpoint tick mark 73. In the case of heating, the highlighted background tick marks sweep in the opposite direction.

Figure 15A:
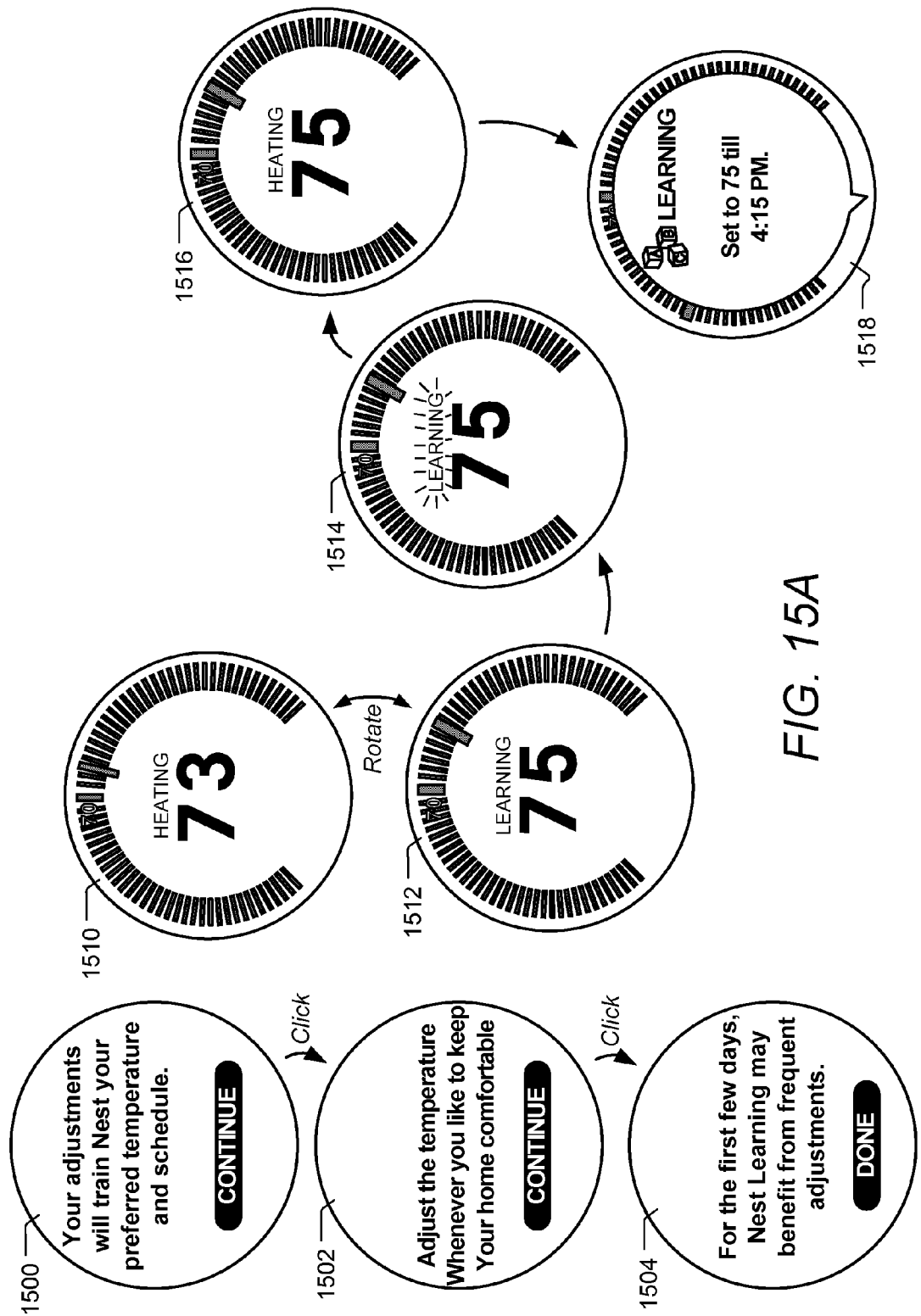
FIGS. 15A-C show example screens relating to learning on a user-friendly a programmable thermostat, according to some alternate embodiments.
Figure 15B:
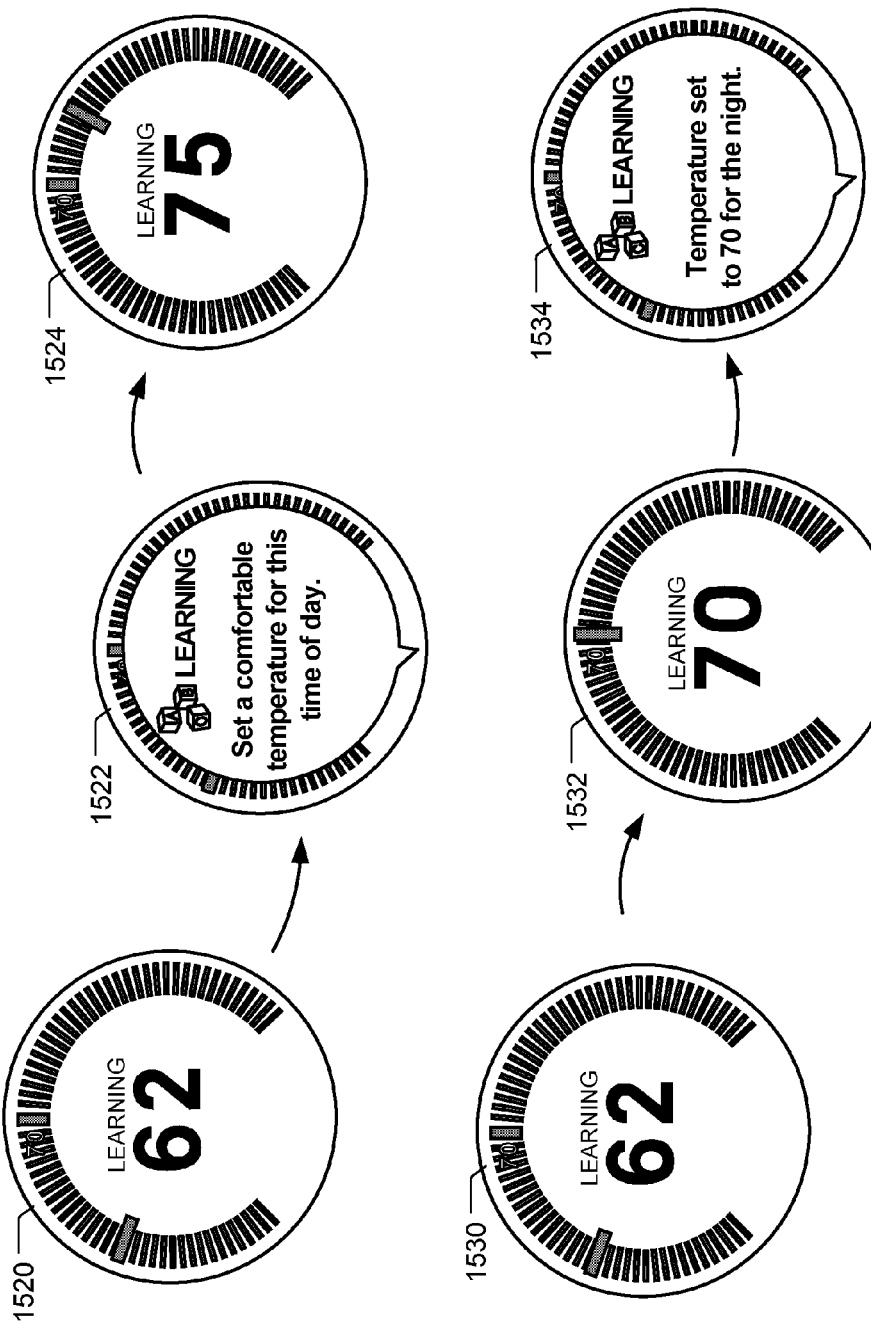
Figure 15C:
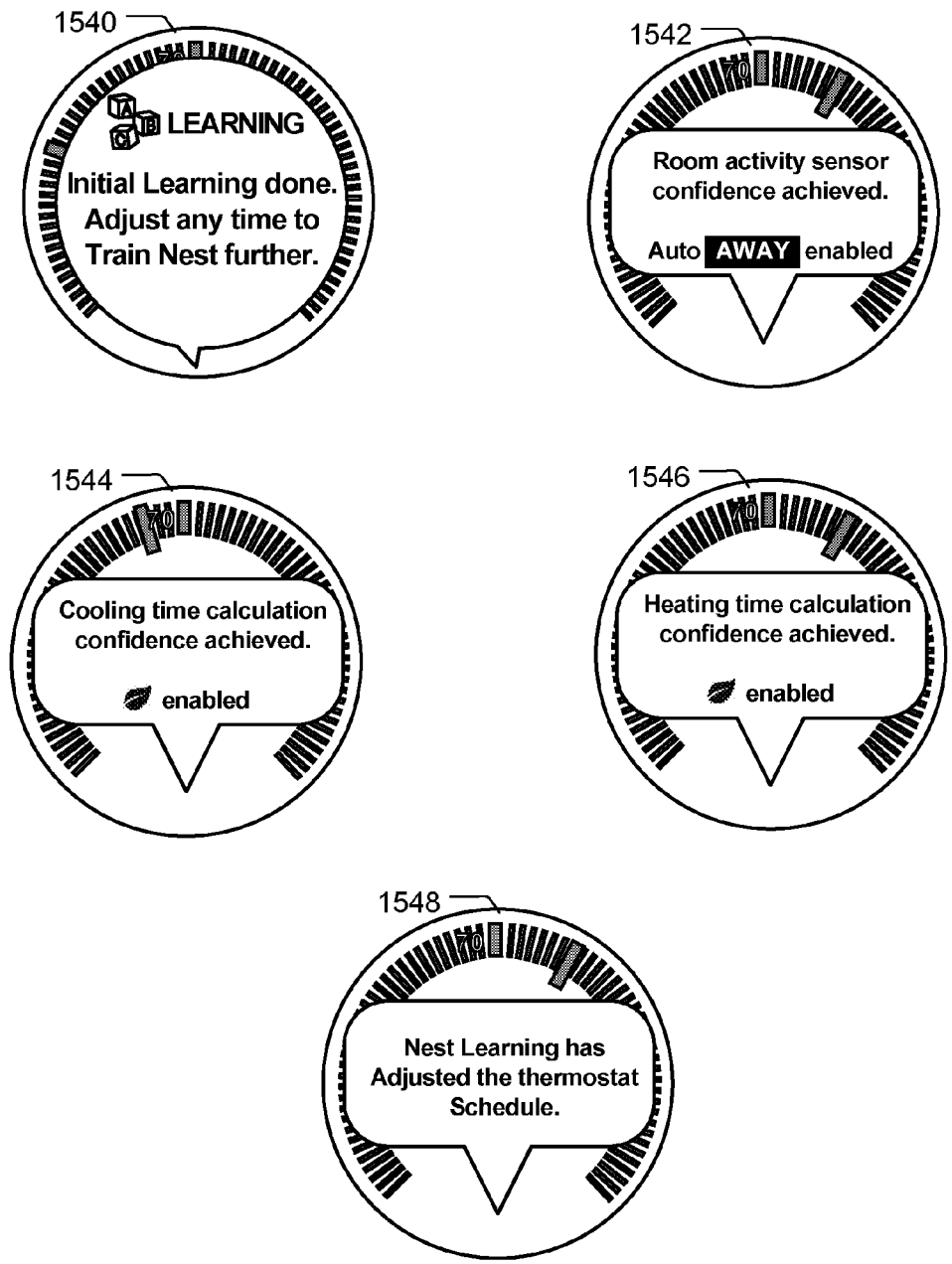

FIGS. 15A-C show example screens relating to learning, according to some alternate embodiments. The screens shown, according to some embodiments, are displayed on a thermostat 300 on round dot-matrix electronic display 316 having a rotatable ring 312 such as shown and described in FIGS. 3A-4. In FIG. 15A, screens 1500, 1502 and 1504 display information to a user indicating in general terms how the thermostat will learn from their actions according to some embodiments. During a learning period the thermostat learns from the user's adjustments, according to some embodiments. Screens 1510 to 1512 show a user adjustment to set the setpoint to 75 degrees F. by a ring rotation input. The message "LEARNING" is flashed on and off twice to notify the user that the adjustment is being used to "train" the thermostat. After flashing, the regular message "HEATING" is displayed in screen 1516 (which could also be a time-to-temperature display if confidence is high enough). Screen 1518 is an example of a message reminding the user that the manual setpoint 75 degrees F. will only be effective until 4:15 PM, which can be due, for example, to an automatic setback imposed for training purposes (which urges the user to make another manual setpoint adjustment). In FIG. 15B, screen 1520 shows an example of a case in which the setpoint temperature has automatically been set back to a low temperature value (in this case 62 degrees) which will encourage the user can make a setpoint change according to his/her preference. Screen 1522 reminds the user that, for the learning algorithm, the user should set the temperature to a comfortable level for the current time of day, which is has been done a shown in screen 1524. According to some embodiments, during the evening hours the automatic setback to a low temperature (such as 62 degrees F.) is not carried out so as to improve comfort during the night. In screen 1530, 1532 and 1534, the temperature in the evening is automatically set to 70 degrees for user comfort. In FIG. 15C, screen 1540 shows a message informing the user that the initial learning period has completed. Screen 1542 informs the user that the auto-away confidence is suitably high and the auto-away feature is therefore enabled. Screens 1544 and 1546 inform the user that sufficient cooling and heating time calculation confidence has been achieved, respectively, for enabling sufficiently accurate time to temperature calculations, and also to notify the user that, since enough information for suitable energy-saving encouragement using the leaf logo has taken place, the leaf logo will be appearing in ways that encourage energy-saving behavior. Screen 1548 shows a message informing the user that an automatic schedule adjustment has been made due to the learning algorithm.

Figure 16A:
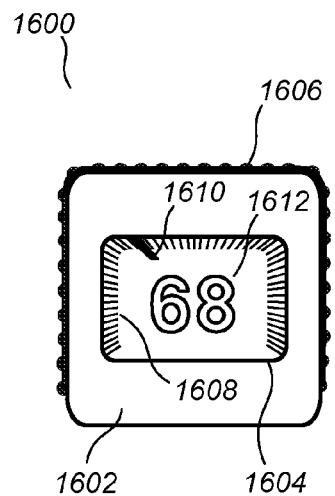
FIGS. 16A-B illustrate a thermostat having a user-friendly interface, according to some embodiments.
Figure 16B:
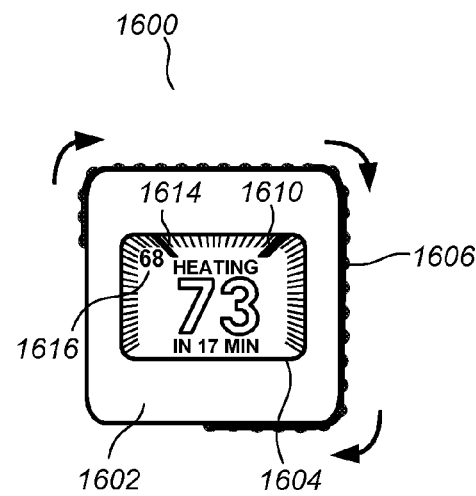

FIGS. 16A-16B illustrate a thermostat 1600 according to an alternative embodiment having a different form factor that, while not believed to be quite as advantageous and/or elegant as the circular form factors of one or more previously described embodiments, is nevertheless indeed within the scope of the present teachings. Thermostat 1600 comprises a body 1602 having a generally rounded-square or rounded-rectangular shape. An electronic display 1604 which is of a rectangular or rounded-rectangular shape is centrally positioned relative to the body 1602. A belt-style rotatable ring 1606 is provided around a periphery of the body 1602. As illustrated in FIGS. 16A-16B, it is not required that the belt-style rotatable ring 1606 extend around the centrally located electronic display 1604 by a full 360 degrees of subtended arc, although it is preferable that it extend for at least 180 degrees therearound so that it can be conveniently contacted by the thumb on one side and one or more fingers on the other side and slidably rotated around the centrally located electronic display 1604. The body 1602 can be mounted on a backplate (not shown) and configured to provide an inward click capability when the user's hand presses inwardly on or near the belt-style rotatable ring 1606. Illustrated on the electronic display 1604 is a population of background tick marks 1608 arcuately arranged within a range area on the electronic display 1604. Although not circular in their distribution, the background tick marks 1608 are arcuately arranged in that they subtend an arc from one angular location to another angular location relative to a center of the electronic display 1604. The particular arcuate arrangement of the background tick marks can be termed a rectangular arcuate arrangement, analogous to the way the minutewise tick marks of a rectangular or square clockface can be termed a rectangular arcuate arrangement. It is to be appreciated that the arcuate arrangement of tick marks can correspond to any of a variety of closed or semi-closed shapes without departing from the scope of the present teachings, including circular shapes, oval shapes, triangular shapes, rectangular shapes, pentagonal shapes, hexagonal shapes, and so forth. In alternative embodiments (not shown) the arrangement of background tick marks can be linear or quasi-linear, simply extending from left to right or bottom to top of the electronic display or in some other linear direction, wherein an arc is subtended between a first line extending from a reference point (such as the bottom center or center right side of the display) to the beginning of the range, and a second line extending from the reference point to the end of the tick mark range. A setpoint tick mark 1610 is displayed in a manner that is more visible to the user than the background tick marks 1608, and a numerical setpoint representation 1612 is prominently displayed in the center of the electronic display 1604.

As illustrated in FIGS. 16A-16B, the user can perform a ring rotation to change the setpoint, with FIG. 16B showing a new setpoint of 73 degrees along with a shift in the setpoint tick mark 1610 to a different arc location representative of the higher setpoint, and with a current temperature tick mark 1614 and current temperature numerical display 1616 appearing as shown. As with other embodiments, there is preferably a "sweeping" visual display of tick marks (not illustrated in FIGS. 16A-16B) that sweeps from the current temperature tick mark 1614 to the setpoint temperature tick mark 1610, analogous to the tick mark sweep shown in FIG. 14, supra. With the exception of the differently implemented ring rotation facility and the changing of various display layouts to conform to the rectangular electronic display screen 1604, operation of the thermostat 1600 is preferably similar to that of the circularly-shaped thermostat embodiments described supra. Thus, by way of non-limiting example, the thermostat 1600 is configured to provide a menu options screen (not shown) on electronic display 1604 that contains menu options such as Heat/Cool, Schedule, Energy, Settings, Away, and Done, and to function similarly to that shown in FIGS. 8A-8C responsive to rotation of the belt-style rotatable ring 1606, with the exception that instead of the electronically displayed words moving around in a circular trajectory, those words move around in a rectangular trajectory along the periphery of the electronic display 1604.

Figure 17A:
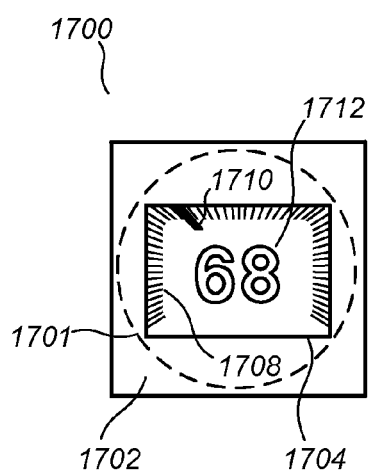
FIGS. 17A-B illustrate a thermostat having a user-friendly interface, according to some embodiments.
Figure 17B:
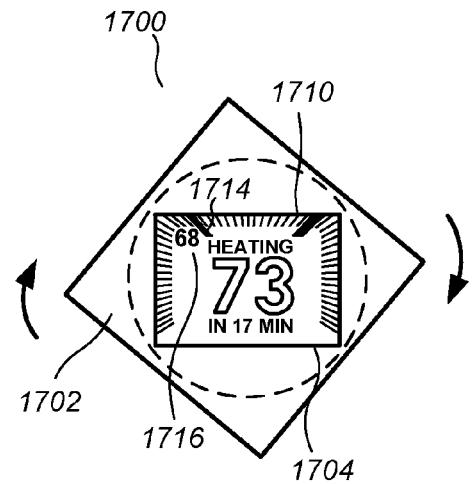

FIGS. 17A-17B illustrate a thermostat 1700 according to another alternative embodiment likewise having a different form factor that, while not believed to be quite as advantageous and/or elegant as the circular form factor, is nevertheless indeed within the scope of the present teachings. Thermostat 1700 comprises a body 1702 having a square or rectangular shape, and further comprises a rectangular electronic display 1704 that is centrally positioned relative to the body 1702. The body 1702 and electronic display 1704 are configured, such as by virtue of appropriate mechanical couplings to a common underlying support structure 1702, such that the body 1702 is manually rotatable by the user while the electronic display 1704 remains at a fixed horizontal angle, and further such that the body 1702 can be inwardly pressed by the user to achieve an inward click input, whereby the body 1702 itself forms and constitutes an inwardly pressable ring that is rotatable relative to an outwardly extending axis of rotation. With the exception of the different form factor assumed by the rotating ring/body 1702 and altered display layouts to conform to the rectangular electronic display screen 1704, operation of the thermostat 1700 is preferably similar to that of the circularly-shaped thermostat embodiments described supra. Background tick marks 1708, setpoint tick mark 1710, current temperature tick mark 1714, numerical current setpoint 1712, and numerical current setpoint 1716 appear and function similarly to their counterpart numbered elements 1608, 1610, 1614, 1612, and 1616 of FIGS. 16A-16B responsive to ring rotations and inward clicks. It is to be appreciated that the square or rectangular form factor of the body/rotatable ring 1702 and/or electronic display 1704 can be selected and/or and mixed-and-matched from among a variety of different shapes without departing from the scope of the present teachings, including circular shapes, oval shapes, triangular shapes, pentagonal shapes, hexagonal shapes, and so forth.

Although the foregoing has been described in some detail for purposes of clarity, it will be apparent that certain changes and modifications may be made without departing from the principles thereof. By way of example, it is within the scope of the present teachings for the rotatable ring of the above-described thermostat to be provided in a "virtual," "static," or "solid state" form instead of a mechanical form, whereby the outer periphery of the thermostat body contains a touch-sensitive material similar to that used on touchpad computing displays and smartphone displays. For such embodiments, the manipulation by the user's hand would be a "swipe" across the touch-sensitive material, rather than a literal rotation of a mechanical ring, the user's fingers sliding around the periphery but not actually causing mechanical movement. This form of user input, which could be termed a "virtual ring rotation," "static ring rotation", "solid state ring rotation", or a "rotational swipe", would otherwise have the same purpose and effect of the above-described mechanical rotations, but would obviate the need for a mechanical ring on the device. Although not believed to be as desirable as a mechanically rotatable ring insofar as there may be a lesser amount of tactile satisfaction on the part of the user, such embodiments may be advantageous for reasons such as reduced fabrication cost. By way of further example, it is within the scope of the present teachings for the inward mechanical pressability or "inward click" functionality of the rotatable ring to be provided in a "virtual" or "solid state" form instead of a mechanical form, whereby an inward pressing effort by the user's hand or fingers is detected using internal solid state sensors (for example, solid state piezoelectric transducers) coupled to the outer body of the thermostat. For such embodiments, the inward pressing by the user's hand or fingers would not cause actual inward movement of the front face of the thermostat as with the above-described embodiments, but would otherwise have the same purpose and effect as the above-described "inward clicks" of the rotatable ring. Optionally, an audible beep or clicking sound can be provided from an internal speaker or other sound transducer, to provide feedback that the user has sufficiently pressed inward on the rotatable ring or virtual/solid state rotatable ring. Although not believed to be as desirable as the previously described embodiments, whose inwardly moving rotatable ring and sheet-metal style rebounding mechanical "click" has been found to be particularly satisfying to users, such embodiments may be advantageous for reasons including reduced fabrication cost. It is likewise within the scope of the present teachings for the described thermostat to provide both the ring rotations and inward clicks in "virtual" or "solid state" form, whereby the overall device could be provided in fully solid state form with no moving parts at all.

By way of further example, although described above as having ring rotations and inward clicks as the exclusive user input modalities, which has been found particularly advantageous in terms of device elegance and simplicity, it is nevertheless within the scope of the present teachings to alternatively provide the described thermostat with an additional button, such as a "back" button. In one option, the "back" button could be provided on the side of the device, such as described in the commonly assigned U.S. Ser. No. 13/033,573, supra. In other embodiments, plural additional buttons, such as a "menu" button and so forth, could be provided on the side of the device. For one embodiment, the actuation of the additional buttons would be fully optional on the part of the user, that is, the device could still be fully controlled using only the ring rotations and inward clicks. However, for users that really want to use the "menu" and "back" buttons because of the habits they may have formed with other computing devices such as smartphones and the like, the device would accommodate and respond accordingly to such "menu" and "back" button inputs.

Figure 18A:
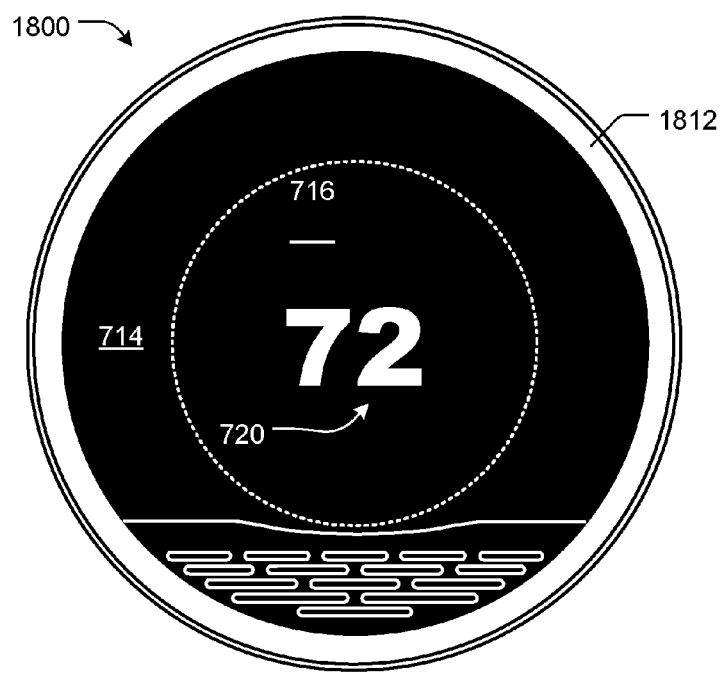
FIGS. 18A-P illustrate a thermostat having a user interface capable of viewing and editing future set points and review historical information, according to some embodiments.

FIGS. 18A-P illustrate a thermostat having a user interface capable of viewing and editing future set points and review historical information, according to some embodiments. Thermostat 700 is preferably designed as shown in and described with respect to FIGS. 3A-C and 5. As in the case of thermostat 300, thermostat 1800 is wall mounted and has circular in shape and has an outer rotatable ring 1812 for receiving user input, a cover 1814 and a display area 1816 marked by the dotted white circle. Large central numerals 1820 are shown in FIG. 18A, and in this case represent the current temperature. According to some embodiments, in FIG. 18A, the background of display area 1816 is black indicating that the HVAC system is inactive (i.e. neither currently heating nor currently cooling) and numerals 1820 are white.

Figure 18B:
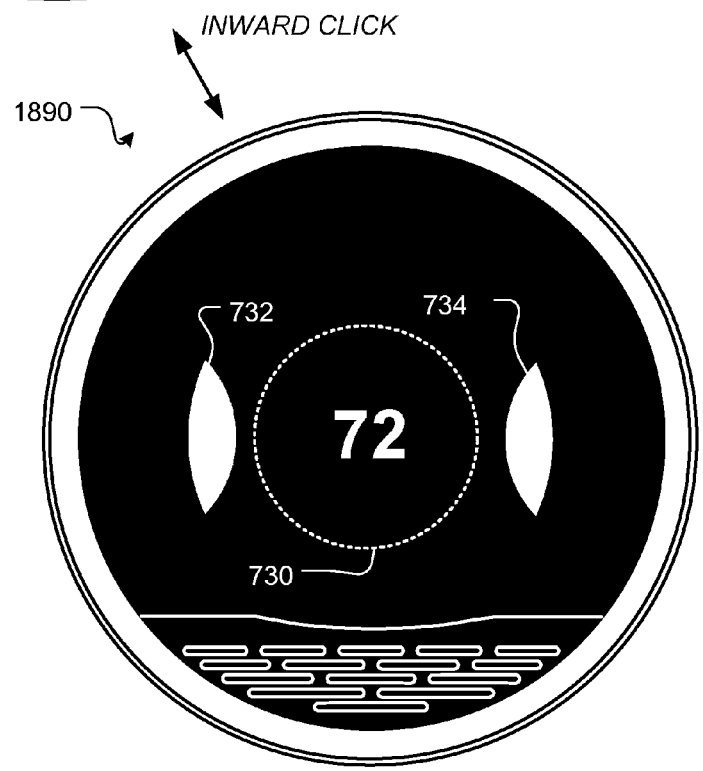

According to some embodiments, the future scheduled program and/or historical information are accessed by the user via a inward click. FIG. 18B shows the thermostat 1800 immediately following an inward click. The information that was previously displayed showing the current status, in this case the current temperature of 72 is shrunk down in size as shown by the dotted ring 1830 in FIG. 18B. Note that if the current status had shown current heating or cooling, such as with alternative colors, the color and set point temperature would be displayed in the area within dotted ring 1830 of FIG. 18B. The two partial circles 1832 and 1834 on the left and right sides of circle 1830, respectively, indicate to the user that another screen lies to the left and right that can be accessed via rotating the ring 1812.

FIG. 18C is a view of display 1816 as shown in FIG. 18B. In response to a ring rotation the program schedule is accessed. FIG. 18D shows that later today, as indicated by the text 1840 "TODAY" at 10 pm, as indicated by the text 1842 "10 PM," the set point is scheduled to be changed to 65, as indicated by the numerals 1820 "65." Note that the two partial circles 1832 and 1834 are shown to aid the user in navigation. In the example shown in FIG. 18D, the left partial circle 1832 is shown in black, or whatever color was being used to indicate the current status, as discussed with respect to FIGS. 18A-C. By rotating the ring further in the same direction (e.g. clockwise), the further programmed set points, shown in FIGS. 18E, 18F and 18G are progressively displayed. By rotating the ring 1812 in the opposite direction (e.g. counterclockwise), progressively earlier programmed set points are displayed.

Figures 18H, 18I, 18J, 18K:
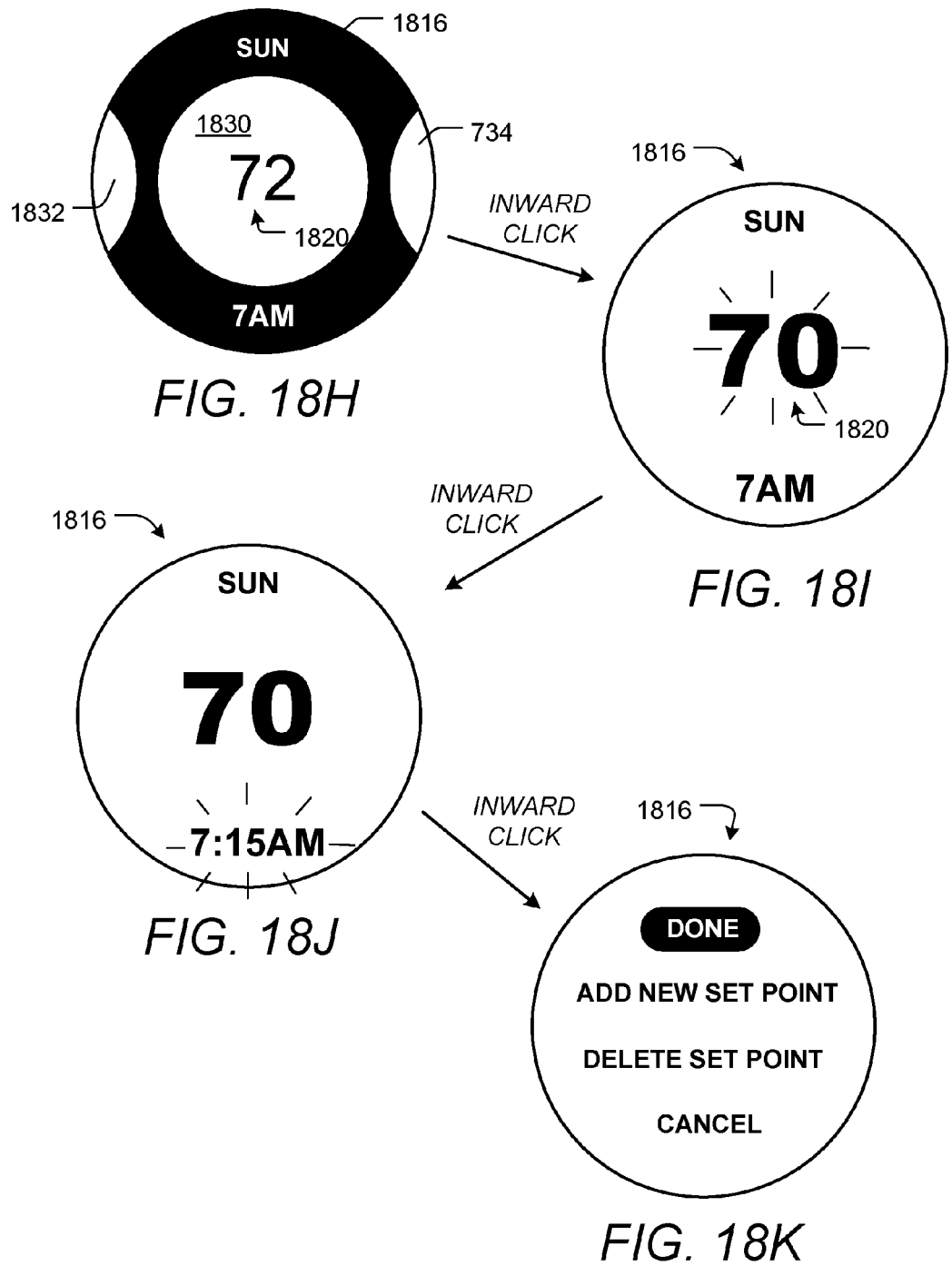

According to some embodiments the scheduled program can be edited by a user. From any of the displayed programmed set points, such as shown in screen 1816 in FIG. 18H, an inward click is used to indicate the desire to edit the set point. In response to an inward click, the white inner circle 1830 expands to fill the display area 1816 as shown in FIG. 18I. The set point temperature indicated by numerals 1820 also blinks that indicates to the user the value that will be altered by rotating ring 1812. When the desired set point temperature is set using the ring 1812, another inward click will advance to FIG. 18J. In FIG. 18J, the time blinking, and is adjusted using the rotating ring 1812. When the desired set point temperature is set using the ring 1812, another inward click will advance to FIG. 18K. In FIG. 18K, the user uses the rotating ring 1812 to select one of four choices lists. The selected choice is highlighted in black or a different suitable contrasting color or using an outline. The choices shown in FIG. 18K are: "DONE" which will accept the changes and take the user back to the displayed schedule screen shown in FIG. 18H; "ADD NEW SET POINT" which will add a new programmed set point change for the given day; "DELETE SET POINT" which sill delete the current programmed set point; and "CANCEL" which will return the user to the displayed schedule screen without making any changes. According to some embodiments, the thermostat has a predefined number of set points (such as 4 per day=28 per week) which can each be edited as shown in FIGS. 18I and 18J, but for simplicity and ease of use, the user cannot add new set points or delete set points.

According to some embodiments, historical information can be displayed to the user as shown in FIGS. 18L-P. FIG. 18L shows the display area 1816 as in FIG. 18A. An inward click from a user causes the display are 1816 to change to the navigation mode shown in FIG. 18M which corresponds to display area 1816 in FIG. 18B. By rotating the ring in the opposite direction as would cause the display of future programmed set points (such as shown in FIGS. 18D-G), a display of historical information can be accessed by the user. According to some embodiments, as shown in FIG. 18N historical temperature can be displayed in graphical form.

FIGS. 19A-F illustrates how other thermostat settings can be made using a user interface, according to some embodiments. FIG. 19A shows a display area 1916 that corresponds to the display area 316 in the previous figures and as described herein. In FIG. 19A, the thermostat is displaying a current temperature of 72, for examples using numerals 1920. According to some embodiments, settings are accessed by an inward press and hold of the upper cap of the thermostat. The settings navigation screen shown in FIG. 19B, following a press and hold, where the current temperature is shown with numerals 1920, two partial circles 1932 and 1934 indicate to the user that by rotating the outer ring further settings screens can be accessed. The word "SETTINGS" is displayed text 1940 to indicate to the user that the settings menu is being displayed. By rotating the ring, various settings can be displayed and edited. For example, FIG. 19C shows a screen for setting Fahrenheit or Celsius and FIG. 19D shows a screen for setting WiFi access. According to some embodiments, the particular setting is viewed and can be altered by a press and hold operation while the desired setting type is being displayed. For example, if a user wanted to update the WiFi settings, a press and hold from screen 19D would cause a display of the current WiFi settings such as the name of the network currently being used, and an option to select a different network and/or enter network security passwords.

According to some embodiments, the settings mode is exited by navigating to the "DONE" screen shown in FIG. 19E, and then making an inward click. According to some embodiments, the a coin flip transition is used to indicate to the user that a mode is being change, in this case as shown in FIG. 19F, the coin flip transition indicates the transition from Settings Mode back to current display. Thus, according to some embodiments, transitions between screens can graphically indicated to the user in different ways including: a coin-flip transition (see e.g. FIG. 19F); a shrinking or growing portion of the display (see e.g. 18A and 18B); and a translation or shifting of displayed elements from right-to-left or from left-to-right (see e.g. FIGS. 18C-G).

Figure 20A:
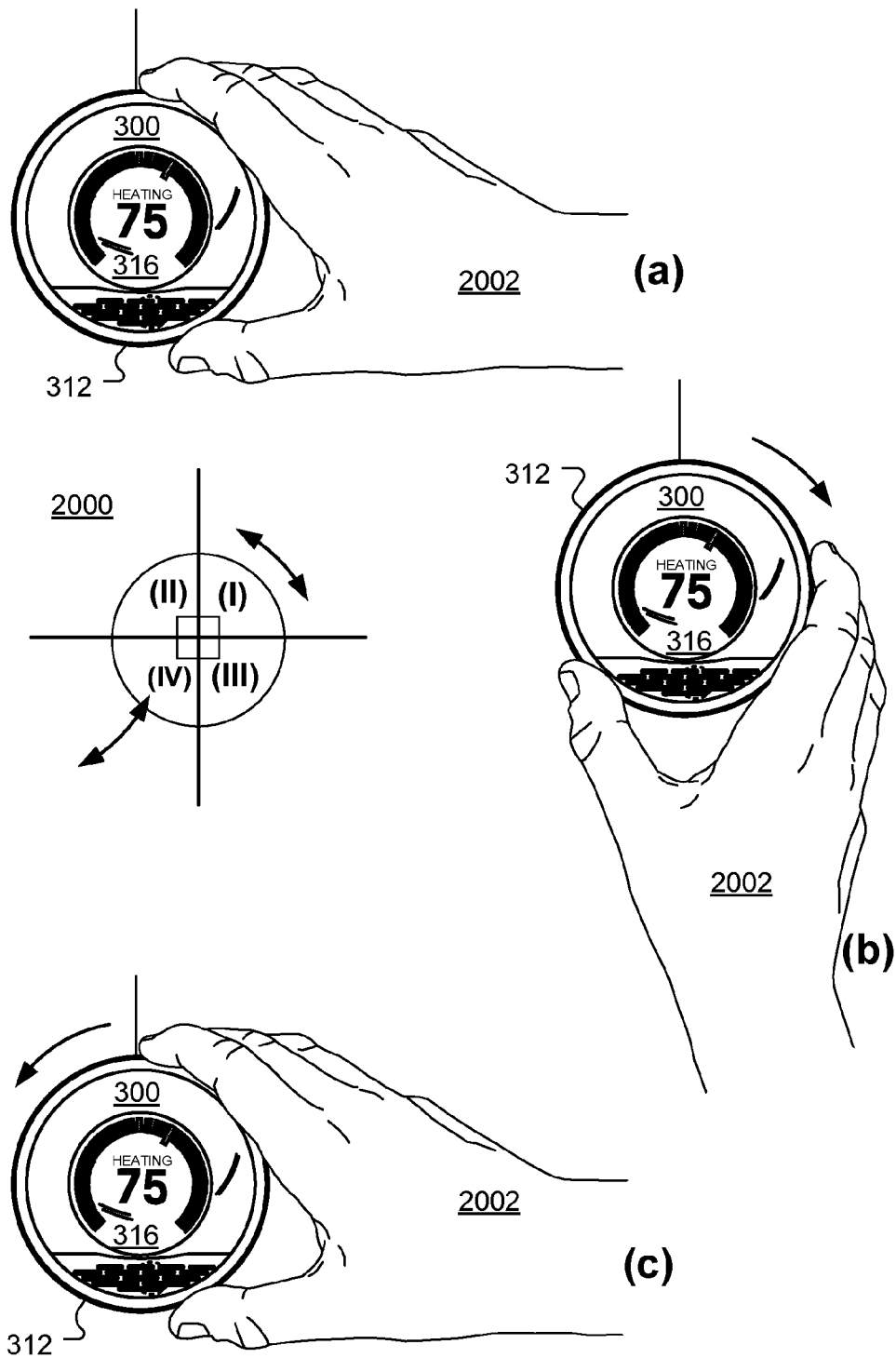
FIG. 20A illustrates thermostat and several exemplary natural and comfortable hand positions of a user manipulating the thermostat as presented through a user interface displayed on electronic display, according to some embodiments.

FIG. 20A illustrates thermostat 300 and several exemplary natural and comfortable hand positions of a user manipulating the thermostat to change some aspect of its configuration or operation as presented through a user interface displayed on electronic display 316. In some implementations the user interface may include a sequence of display elements arranged in a circular arrangement, a linear arrangement, or combinations thereof and as further described in U.S. Ser. No. 13/269,501, supra. In some embodiments, the user interface may be navigated through using a rotatable ring 312, or other rotational input device invoking a series of ring rotations to scroll through the series of display elements and inward clicks to select one of these display elements and gain additional information or access to other portions of a menu.

Usability of the user interface displayed on thermostat 300 may be positively enhanced when the user's hand position on thermostat 300 remains in a comfortable position throughout all aspects of operating the thermostat 300. In some implementations, the user's hand may initially be comfortably positioned in any one of the circular quadrants 2000 (I) through (IV) depending on the user's left or right handedness, height relative to the position of the thermostat, and a variety of other ergonomic factors. Once the user's hand is placed in a comfortable position, the user should be able to navigate most, if not all, aspects of the user interface displayed on thermostat 300 while rotating rotatable ring 312 through one or two but preferably no more three of the circular quadrants 2000 (I) through (IV). This navigation is preferably done without the user having to lift and reposition their hand.

As an example, a user's hand 2002 in starting position (a) initially begins navigation of a user interface displayed on thermostat 300, as indicated by the approximate position of the forefinger, in circular quadrant (I). The user's hand 2002 placed on thermostat 300 may then rotate clockwise approximately a quarter-revolution into intermediary position (b) and towards the lower boundary of circular quadrant (I), which may happen to be a limit on the user's ability to rotate their wrist and hand. With the user's hand remaining engaged to the thermostat 300 in intermediary position (b), the user may peer through the open area between the thumb and forefinger to read information displayed on the user interface, reposition a display element on the display, select a display element with a inward click, or other interactions with the user interface. The user may then turn an equivalent quarter-revolution counter-clockwise from the intermediary position (b) arriving in a final position (c) whereupon the user's hand continues to remain engaged to the thermostat 300 and is ready to further interact with the user interface.

Embodiments of the present invention facilitate keeping the user's hand in a comfortable position and engaged to the thermostat 300 as menus and interactions within the user interface vary in both complexity and number of display elements presented. A variable assist scroll engine for rotational inputs (not shown in FIG. 20B), also referred to as a variable assist scroll engine, designed in accordance with embodiments of the present invention uses heuristics to provide assistance in scrolling through an arbitrary number of display elements presented on the user interface while in the process also helping keep the user's hand in a natural and comfortable position on the thermostat. As described hereinabove, the user's rotational input in one embodiment may traverse a sequence of display elements preferably using less than a quarter-revolution in order to enhance the user experience and improve the usability of the thermostat. In alternate embodiments and depending on the user's preference, the variable assist scroll engine may also allow the user to configure the rotational input for scrolling to less than a half-revolution, a three-quarter revolution, or set as a measurement of angular displacement from 0 to 360 degrees.

Figure 20B:
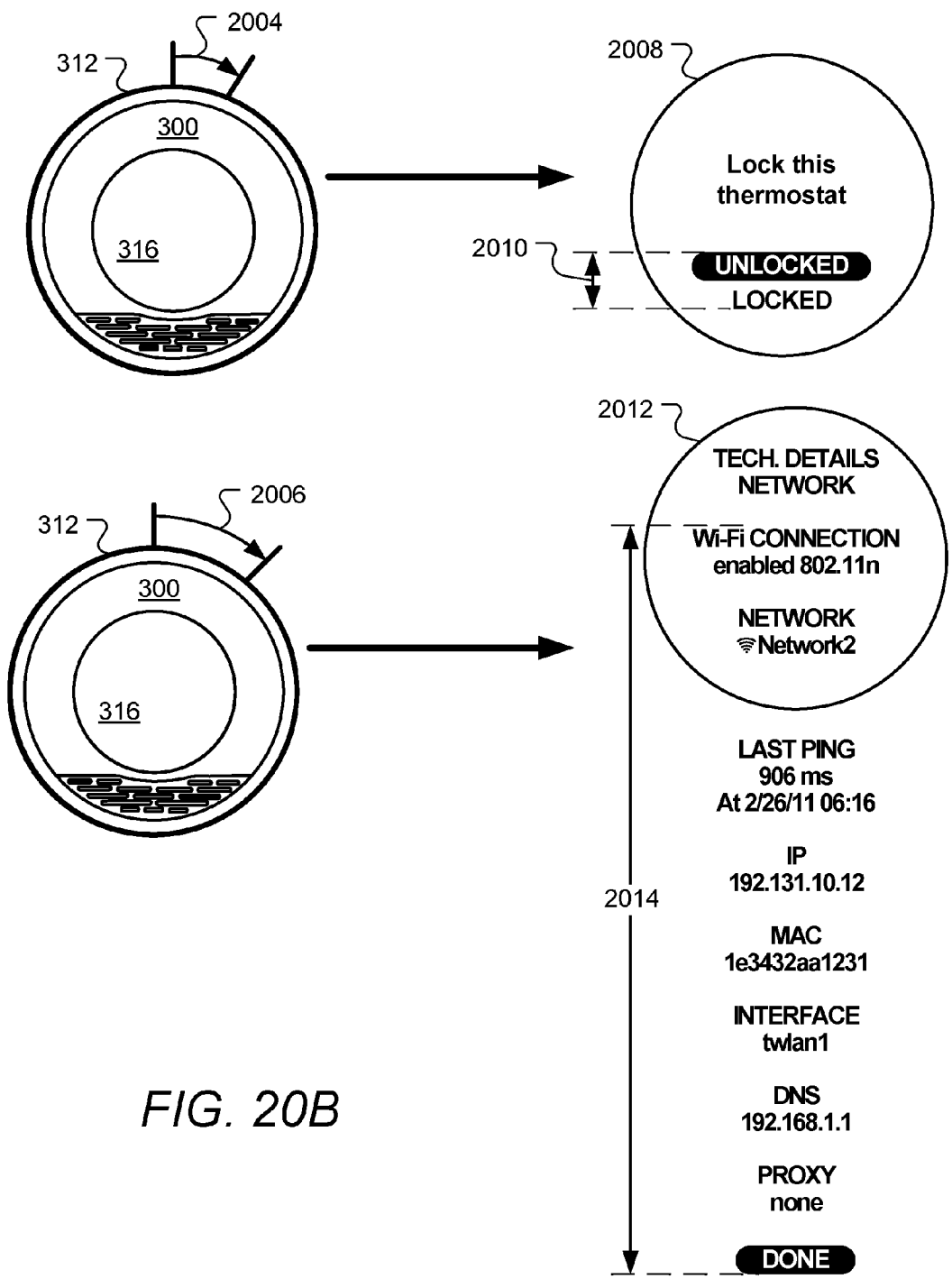
FIG. 20B illustrates a short menu from a user interface having two display elements and a long menu having eight display elements with wider spacing and multiple lines of data in accordance with some embodiments.

As a brief example, FIG. 20B illustrates, a short menu 2008 from a user interface having two display elements (i.e., "UNLOCKED" and "LOCKED") and a long menu 2012 having eight display elements with wider spacing and multiple lines of data. In accordance with some embodiments, the variable assist scroll engine may not accelerate the scrolling movement between the two display elements since the element distance 2010 (i.e., the distance between the beginning and end of the sequence of elements) is quite short might make using the short menu 2008 difficult for the user. Even if a user imparts a rapid rotational acceleration during rotational input 2004, indicating an imperative to scroll more quickly, some embodiments of variable assist scroll engine may select to actually reduce or quickly "dampen" the amount of acceleration on the short menu 2008 to a predetermined level. In some embodiments, limiting the acceleration to the predetermined level may improve the interface by providing the user with a more predictable and consistent interaction with the display elements. In comparison, the variable assist scroll engine may detect that a user has subsequently imparted the same rapid rotational acceleration to scroll through long menu 2012. In this case, the variable assist scroll engine may respond by increasing the acceleration of the scrolling movement as the associated element distance 2014 is much greater than the short menu 2008. The variable assist scroll engine assists the user entering rotational input 2006 by accelerating the scrolling movement of the sequence of display elements thereby allowing the user to quickly scroll through the more numerous display elements on the long menu 2012. In some embodiments, the user is able to scroll through the display elements while using less than quarter-revolution of the rotatable ring 312 as indicated.

Figure 21:
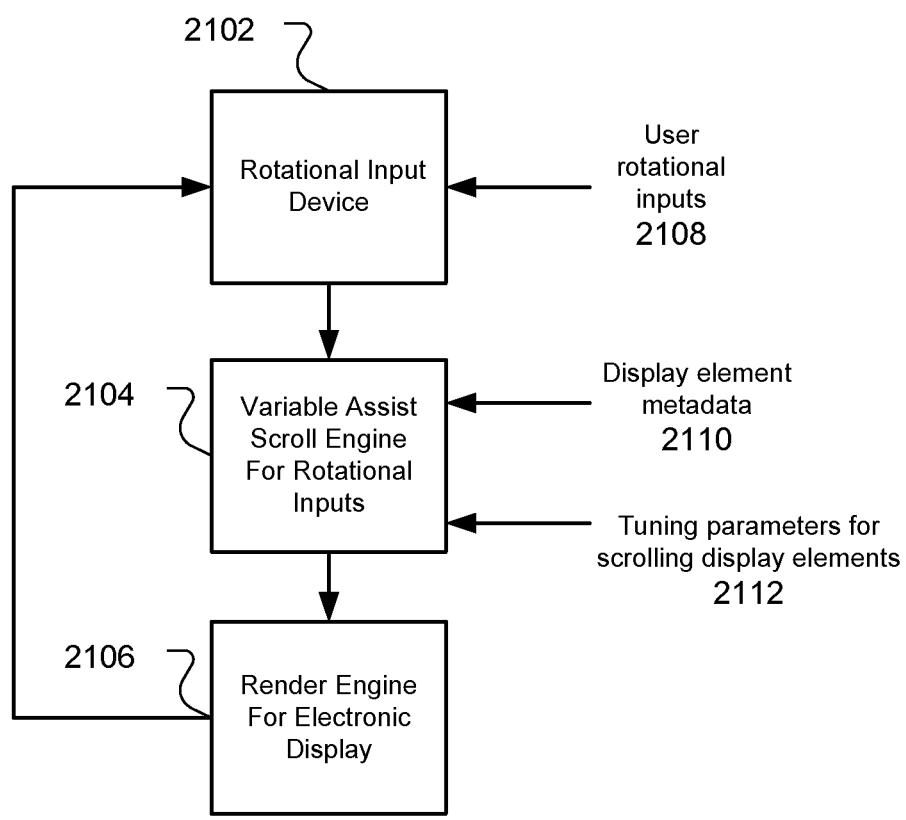
FIG. 21 illustrates a logical schematic diagram using a variable assist scroll engine to process user inputs on a control device such as a thermostat in accordance with some embodiments.

FIG. 21 illustrates a logical schematic diagram using a variable assist scroll engine 2104 to process user inputs on a control device such as a thermostat in accordance with some embodiments. As described hereinabove, rotational input device 2102 may be a rotatable ring located around a periphery of an electronic display centrally mounted on a body of the thermostat or control device, such as rotatable ring 312 shown and described supra with respect to FIG. 3. In some embodiments, the rotational input device 2102 receives rotational user inputs and provides a measurement of angular displacement at regular time intervals such as once every $\frac{1}{60}$th of a second or faster depending on the sampling capabilities of the rotational input device 2102. In other embodiments, the rotational input device 2102 may receive rotational user input and produce instead output linear displacements reflecting a linear representation of the angular distance traveled by the rotational input device 2102 in a given time interval.

In some embodiments, variable assist scroll engine 2104 receives these linear and/or rotational displacements over time and uses them to determine a scrolling movement for display elements on the electronic display. The scrolling movement may be calculated using linear or angular equations describing speed (change in displacement), velocity (speed in a direction), and acceleration (change in velocity over time with direction). Variable assist scroll engine 2104 may modify the degree of acceleration than provided through rotational input device 2102 according to the application of information such as tuning parameters for scrolling display elements 2112 (also referred to as tuning parameters 2112) as well as display elements metadata 2110, which are used to describe the shapes and sizes of display elements as they are rendered on the electronic display of the thermostat.

Some of these tuning parameters 2112 help the variable assist scroll engine 2104 model the scrolling of the display elements as physical objects having a mass and inertia being accelerated and then damped by friction or other opposing forces. Different inertial models used in simulating movement of these display elements may include a flywheel or weighted cylinder spinning around a rod as well as other variations to provide a smooth and attractive appearance of the display elements as they are rendered on the electronic display. For example, if a user enters user rotational inputs 2108 in the opposite direction to the movement of the scrolling display, variable assist scroll engine may dampen the scrolling of the display elements based on tuning parameters 2112 and the inertial model. In some embodiments, tuning parameters 2112 may also be selected to accommodate for different menu types, such as a circular menu and a linear menu either with wrapping and non-wrapping effects, and to achieve an overall effect on the scrolling of the display elements on the electronic display.

In some implementations, these tuning parameters 2112 may include an acceleration multiplier, a scroll decay factor, edge bounce decay factor, a center decay factor, and a scroll settle threshold. The acceleration multiplier is used to increase or decrease the amount of acceleration applied to a set of scrolling elements. The value may be set to a higher value if a menu has a larger sequence of display elements and it is desirable to scroll quickly through the sequence. Scroll decay factor helps simulate the effect of friction and determines how the long the elements may scroll before stopping. If the scroll decay is set to a high value, the scrolling movement may decay quickly and stop. In some embodiments, the scrolling may continue even after a user has stopped providing rotational input to the rotational input device 2102 due to simulated force and inertia. The edge bounce decay factor is used in a non-wrapping menu when it reaches the terminus element. In some embodiments, the menu will not stop quickly but "bounce" when it reaches the end and oscillate briefly as the energy decays. Accordingly, edge bounce decay determines how quickly the energy in the terminus element in a sequence of display elements will decay when it reaches the end of the menu. The center decay is used to determine how a quickly the decay will occur for a display element once it settles into a position. In some embodiments, a user interface may apply gravity to a display element and cause the display element to settle into simulated notch, groove, or indentation simulated in the user interface. Accordingly, the center decay determines the decay associated with this event and how quickly a display element may settle into position. The scroll settle threshold is a threshold value used to determine when a scrolling of elements has effectively stopped. Once the movement of the scrolling elements falls below this threshold, scrolling of the elements will be stopped. In some embodiments, the scroll settle threshold may vary for different menus depending on the simulated forces, inertia, and friction associated with the scrolling movement of the display elements.

The variable assist scroll engine 2104 sends these display elements to render engine 606 to be displayed on the electronic display at a frequency determined by the display device. In some implementations, the frequency of the electronic display device may be every 1/60th of a second or faster depending on the capabilities of the particular device and how it is configured. As this process repeats, the display elements scrolling over the electronic display appear animated, pleasing to the user and easier to navigate in accordance with embodiments of the invention.

Figure 22:
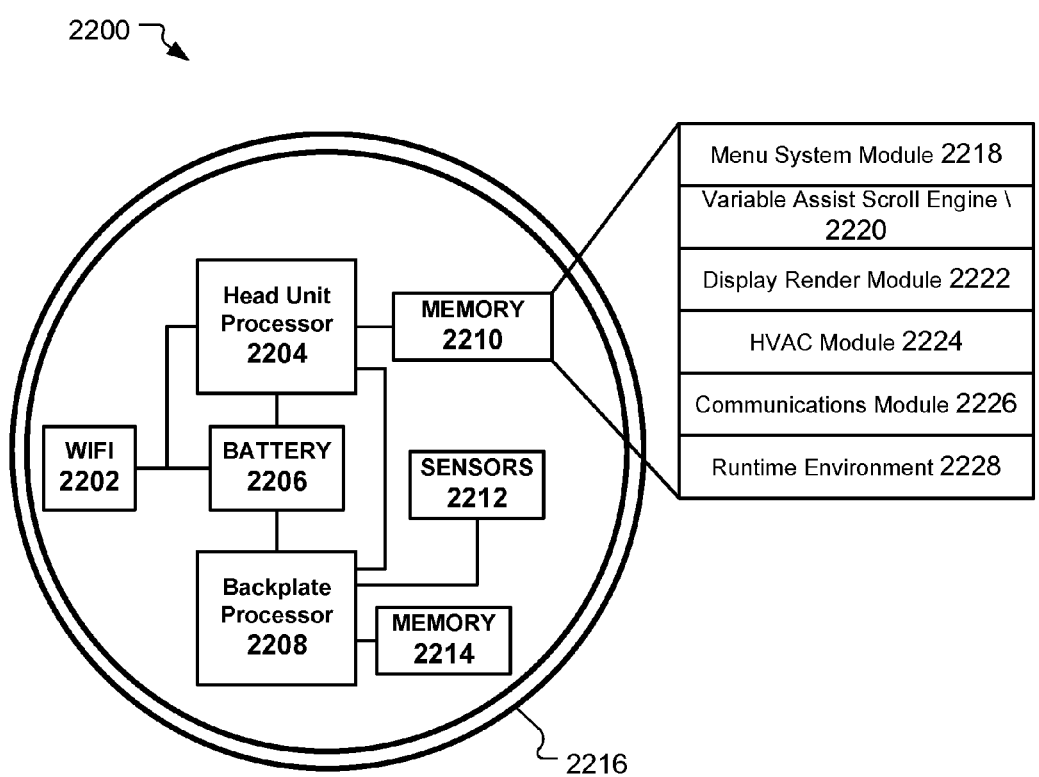
FIG. 22 is a schematic block diagram providing an overview of some components inside a thermostat in accordance with embodiments of the present invention.

Referring to FIG. 22, a schematic block diagram provides an overview of some components inside a thermostat in accordance with embodiments of the present invention. Thermostat 2200 is similar to thermostat 300 in FIG. 3 and highlights selected internal components including a Wifi module 2202, a head unit processor 2204 with associated memory 2210, a backplate processor 2208 with associated memory 2214, and sensors 2212 (e.g., temperature, humidity, motion, ambient light, proximity). Further details regarding the physical placement and configuration of the thermostat head unit, backplate, and other physical elements are described in the commonly assigned U.S. Ser. No. 13/199,108, supra. The backplate processor 2208 is coupled to, and responsible for polling on a regular basis, most or all of the sensors 2212 including the temperature and humidity sensors, motion sensors, ambient light sensors, and proximity sensors. For sensors 2212 that may not be located on the backplate hardware itself but rather are located in the head unit, ribbon cables or other electrical connections between the head unit and backplate are provided for this purpose. Notably, there may be other sensors (not shown) for which the head unit processor 2204 is responsible, with one example being a ring rotation sensor that senses the user rotation of the outer ring 2216. Battery 2206 supplies power to the electronic display (not shown in FIG. 22) used to display scrolling display elements in accordance embodiments of the present invention as well as to Wifi module 2202 and both backplate processor 2208 and head unit processor 2204.

In some embodiments, memory 2210 may include a menu system module 2218, variable assist scroll engine 2220, display render module 2222, HVAC module 2224, communications module 2226, and a runtime environment 2228 for managing these modules and their execution on head unit processor 2204. In one embodiment, menu system module 2218 may include the menu systems associated with configuring, controlling, and generally interfacing with thermostat 2200 through rotatable ring 2216. In accordance with some embodiments, variable assist scroll engine 2220 processes scrolling display elements used in menu system module 2218 to interact more efficiently with rotatable ring 2216 as well as display more attractively on the electronic display of the thermostat 2200. For example, the variable assist scroll engine 2220 may further accelerate the scrolling of display elements from a menu in menu system module 2218 and thereby reduce the required amount of rotational input applied to rotatable ring 2216. In some embodiments, variable assist scroll engine 2220 accelerates the scrolling movement allowing the user to scroll through many display elements in multiple areas of menu system module 2218. In each the areas of the menu, the user may scroll through a variable number of display elements without turning rotatable ring 2216 more than a quarter-turn. This advantageously makes the thermostat 2200 or other control devices with a rotational input easier to use since user's hand can control the thermostat without having to remove and reposition multiple times in the midst of navigating a menu, setting a set point on the thermostat, or performing some other task. The display render module 2222 receives the various display elements from variable assist scroll engine 2220 and renders them on the electronic display (not shown) of thermostat 800. HVAC module 2224 may further be used to gather commands and data from menu system module 2218 in consideration of controlling the HVAC system.

Figure 23:
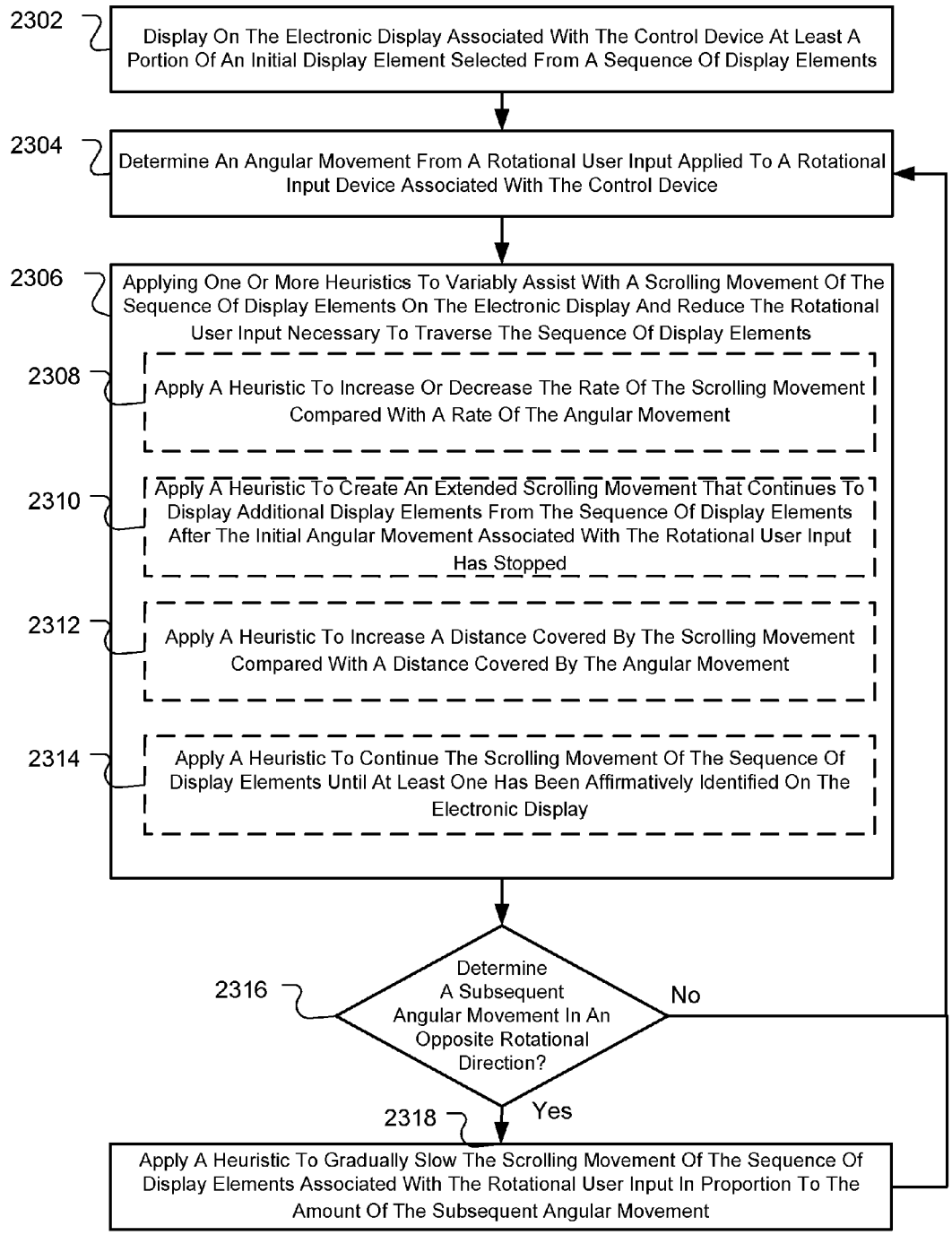
FIG. 23 illustrates a flow chart diagram of the operations for processing rotational user inputs and the control of scrolling display elements in accordance with some embodiments.

FIG. 23 illustrates a flow chart diagram of the operations for processing rotational user inputs and controlling the scrolling of display elements in accordance with some embodiments. In processing the rotational inputs, embodiments of the present invention balance usability of the interface with the need to reduce or minimize the amount of rotational input necessary to scroll through display elements on the electronic display of a control device. In some embodiments, the variable assist engine can assist with the scrolling the display elements but must still leave the user with control over the interface.

In some embodiments, aspects of the present invention may display on the electronic display associated with the control device at least a portion of an initial display element selected from a sequence of display elements. (2302) For example, the initial display element may be a symbol or image selected from a sequence of display elements arranged along on a circular menu or may be a symbol or image selected from a sequence of display elements arranged in a series on a linear menu. If the initial display element is larger then it may only be partially displayed on the electronic display while a smaller display element from a sequence of display elements may be fully displayed on the on the electronic display. In some embodiments, the electronic display is centrally mounted on a body of a control device providing for a smaller overall form factor for the device while in alternate embodiments, the display may be mounted offset or adjacent to the body of the control device.

In some embodiments, determining an angular movement is made from a rotational user input applied to a rotational input device associated with the control device. (2304) The angular movement may be determined as a measurement of the displacement, velocity, and acceleration of the rotational input device averaged over a time interval. For example, a user may impart a rotational user input with their hand using a rotatable ring around a periphery of the electronic display, such as rotatable ring 300 described and shown supra. in FIG. 3. The angular displacement on the rotatable ring sampled at regular time intervals is provided to embodiments of the present invention and used to calculate the angular movement. In alternative embodiments, the rotational input device may be a rotatable knob or other mechanism to rotate and scroll through display elements in the interface. The rotatable knob may be smaller and positioned adjacent to the display rather than surrounding the electronic display portion and adjustable with a user's fingers.

In some embodiments, one or more heuristics are applied to variably assist with a scrolling movement of the sequence of display elements on the electronic display and reduce the rotational user input necessary to traverse the sequence of display elements. (2306) The user may preferably configure one embodiment of the variable assist scroll engine to assist in scrolling through the sequence of display elements using a rotational input of less than a quarter-revolution, a half-revolution, a three-quarter revolution, or set as a measurement of an angular displacement from 0 to 360 degrees. Alternate embodiments of the variable assist scroll engine may set the default rotational input to less than quarter-revolution if the user selects to not customize or change these settings. In providing assistance with the scrolling movement, one embodiment takes into consideration an angular movement associated with the rotational user input and an element distance associated with the sequence of display elements to be displayed on the electronic display. If the angular movement has a larger rotational acceleration component and the element distance is quite long, the engine may increase the assistance with scrolling through the sequence of display elements in one or multiple ways as the user has indicated an imperative to quickly view the sequence of display elements. For example, a user may wish to read a terminus element in a menu having a long list of display elements with text and thus provide a large rotational acceleration to the rotational input device.

In some embodiments, a heuristic to reduce the required rotational user input may cause the engine to increase or decrease the rate of scrolling movement associated with the sequence of display elements compared with a rate of angular movement received from the rotational input device. (2308) To perform this function, for example, the engine may increase the acceleration of the scrolling movement to meet both the user's request to view the information quickly and reduce the rotational input required to a predetermined amount, such as a quarter-rotation of the rotational ring 312 in FIG. 3. To increase the acceleration, one embodiment may use the rotational acceleration component of the angular movement and either add a predetermined amount of acceleration or multiple of the acceleration by a factor such as an acceleration multiplier.

In some embodiments, a heuristic to reduce the required rotational user input may cause the engine to create an extended scrolling movement that continues to display additional display elements from the sequence of display elements after the initial angular movement associated with the rotational user input has stopped. (2310) For example, a rotational user input with acceleration may impart a simulated force and inertia on the sequence of display elements causing the display elements to scroll after the rotational user input has ended. As previously described hereinabove, the movement of the display may be modeled as a physical object having mass, inertia, and decay due to friction or opposing rotational forces. Incorporating this type of "virtual inertia" increases the visual attraction of the interface while simultaneously achieving the goal of reducing the rotational input required to scroll through the display elements in a manner understood and expected in the user's physical world (i.e, inertia and decay). In some embodiments, the extended scrolling movement may be reduced through successive subtraction or division by a scroll decay factor until the scrolling movement falls below a scroll settle threshold and is determined to have stopped.

In some embodiments, a heuristic to reduce the required rotational user input may cause the engine to increase a distance covered by the scrolling movement compared with a distance covered by the angular movement. (2312) For example, a user may provide a quarter-revolution on a rotatable ring as an input and cause the corresponding elements to scroll a half-revolution on the electronic display. In some embodiments, the distance traveled by the scrolling elements may be one or several times the distance provided by the user through the rotational input device. This is particularly useful if a user is scrolling through a long sequence of display elements and needs to cover the longer distance quickly.

In some embodiments, a heuristic to reduce the required rotational user input may cause the engine to continue the scrolling movement of the sequence of display elements until at least one has been affirmatively identified on the electronic display. (2314) For example, a user's rotational input may cause a sequence of display elements to scroll with a scrolling movement and land in an area between two display elements leaving it not possible to select or identify a specific display element in the context of the user interface. To keep the required rotational user input reduced or minimized, one embodiment simulates a notch, indentation, or groove coincident with each display element under the force of gravity and friction which in turn causes the scrolling movement to settle on a particular display element. In one embodiment, a distance calculation may be used to select one display element over another nearby display element as the scrolling movement of the display elements slows and comes close to falling below the scroll settle threshold.

In some embodiments, the variable assist scroll engine may determine whether a user has applied a subsequent angular movement in an opposite rotational. (2316) In some embodiments, the user applies the subsequent rotational input to the rotational input device in an opposite direction to the scrolling movement displayed on the electronic display. (2316—Yes) For example, the user may see a display element of interest and desire to quickly slow or potentially stop the scrolling of the display elements. Variable assist scroll engine responds by gradually slowing the scrolling of display elements in proportion to the amount of the subsequent angular movement. (2318) In one embodiment, variable assist scroll engine models the subsequent rotational input as an opposing rotational force upon an object thus the user experience is familiar and expected. In addition, this heuristic further reduces the required rotational user input as the variable assist scroll engine allows the user to quickly slow or stop the scrolling movement with a reduced rotational input.

Figure 24A:
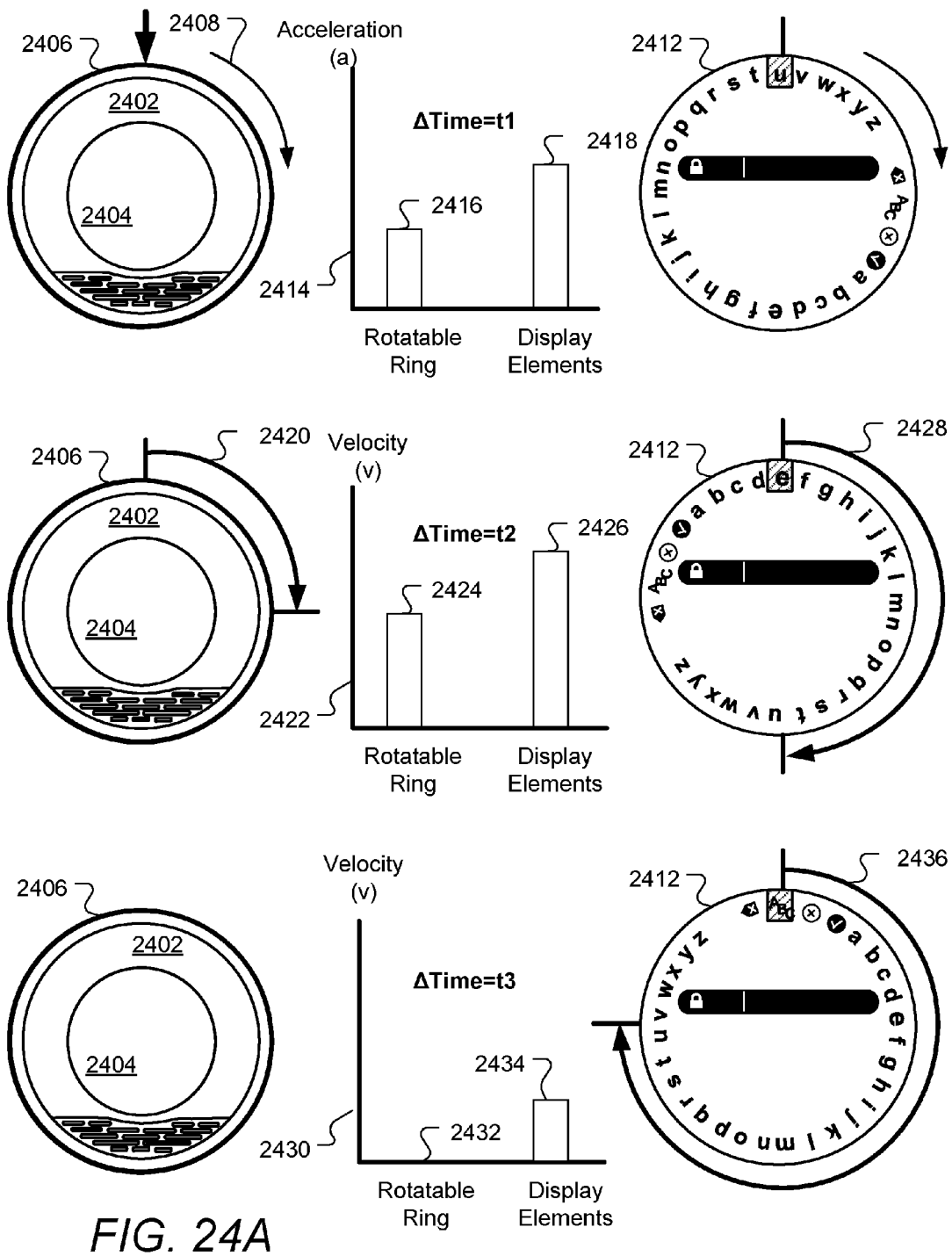
FIGS. 24A-24D illustrate one application of the variable assist scroll engine to a circular menu of display elements in accordance with some embodiments.

FIGS. 24A-24D illustrate one application of the variable assist scroll engine to a circular menu of display elements in accordance with some embodiments. Referring to FIG. 24A, a user in this example has applied a rotational force in clockwise direction 2408 to a rotatable ring 2406 surrounding an electronic display 2404 on thermostat 2402. The acceleration graph 2414 indicates schematically at ΔTime=t1 (hereinafter t1) the rotatable ring acceleration 2416 (hereinafter ring acceleration) is less than the display elements acceleration 2418 (hereinafter display acceleration) as the variable assist scroll engine has increased the simulated acceleration associated with the animation of circular menu 2412.

In one embodiment, the circular menu 2412 at t2 in FIG. 24A has a display elements velocity 2426 (hereinafter display velocity) in velocity graph 2422 which is also greater than the rotatable ring velocity 2424 (hereinafter ring velocity). Circular menu 2412 also moved through a rotational displacement 2428 at t2 that is at least twice the rotational displacement 2420 associated with the rotatable ring 2406 of the thermostat 2402. In this application, the variable assist scroll engine has applied one heuristic to reduce the rotational user input to a quarter-rotation of the rotatable ring 2406 while traversing at least half the sequence of display elements in the circular menu 2412.

At a subsequent time interval t3, the user is no longer moving rotatable ring 2406 and the ring velocity 2432 as indicated by velocity graph 2430 is negligible or zero. In contrast, circular menu 2412 continues to travel at a much more significant display velocity 2434 reduced in part by a simulated friction or decay. In this embodiment. variable assist scroll engine has imparted a rotational inertia and decay to circular menu 2412 to further reduce the rotational input required by the user. While not displayed in FIG. 24A, rotational displacement 2436 will continue to increase after t3 until display velocity 2434 decays further and circular menu 2412 stops.

Figure 24B:
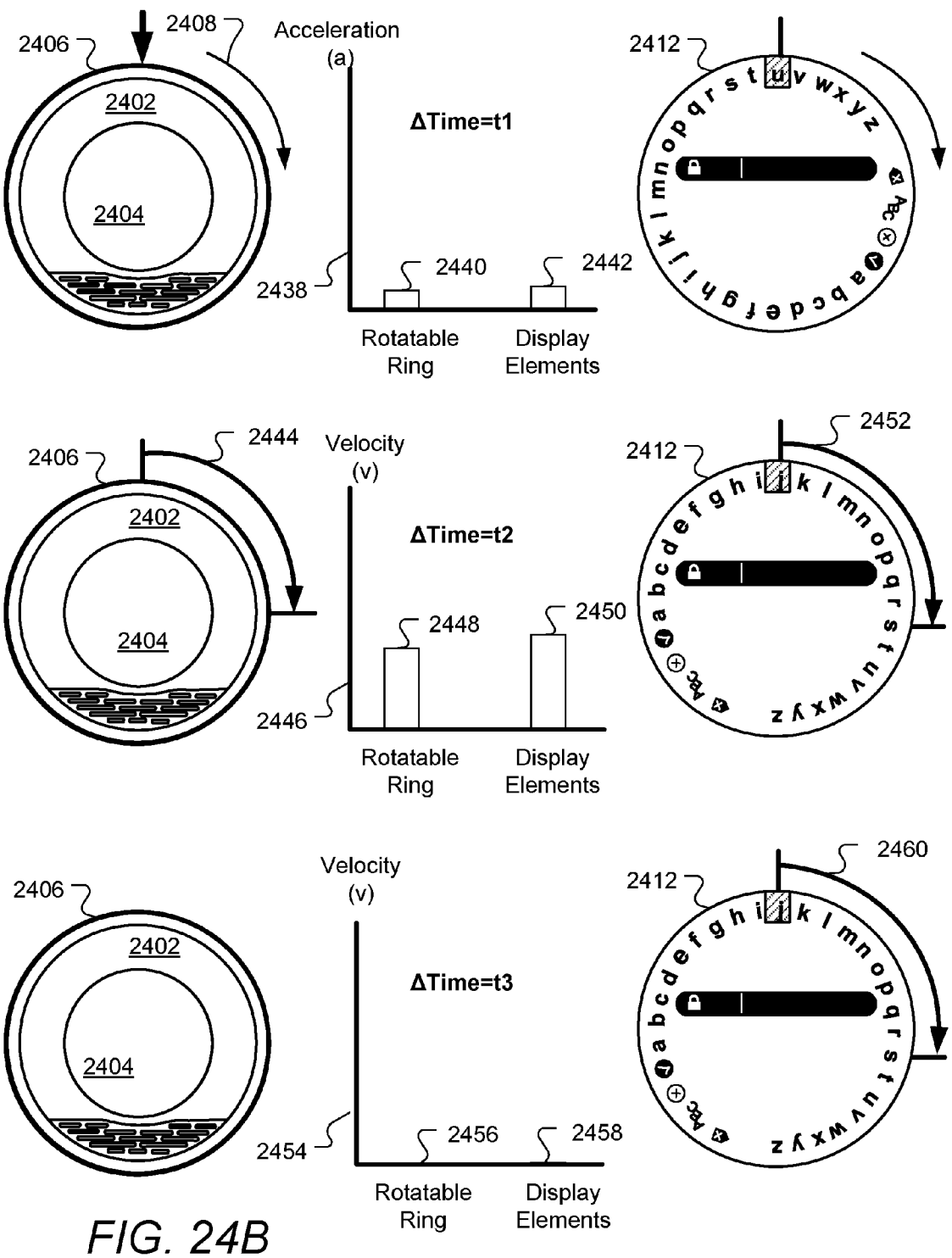

Referring to FIG. 24B, in this example a user has applied a rotational force in clockwise direction 2408 to a rotatable ring 2406 of thermostat 2402. The acceleration graph 2438 indicates schematically at t1 the ring acceleration 2440 is less than the display acceleration 2442 as the variable assist scroll engine has slightly increased the simulated acceleration associated with the animation of circular menu 2412. The ring acceleration 2440 provided in FIG. 24B is similar to the ring acceleration 2416 in FIG. 24A except that it has a much lower magnitude in comparison. As a result, the variable assist scroll engine has also responded with a lower acceleration for the animation of the circular menu 2412 to reflect the user's intent when using the interface.

In one embodiment, the circular menu 2412 at t2 in FIG. 24B has a display velocity 2450 in velocity graph 2446 which is comparable with the ring velocity 2448. It follows that circular menu 2412 has also moved through a rotational displacement 2452 at t2 that is also comparable to the rotational displacement 2444 associated with the rotatable ring 2406 of the thermostat 2402. In this application, the variable assist scroll engine has applied one heuristic of allowing the user to make a quarter-rotation of the rotatable ring 2406 that more directly controls the scrolling movement of display elements in the circular menu 2412.

At a subsequent time interval t3 in FIG. 24B, the user is no longer moving rotatable ring 2406 and the ring velocity 2456 as indicated by velocity graph 2454 is negligible or zero. Likewise, variable assist scroll engine has damped circular menu 2412 at t3 such that display velocity 2458 is also negligible or zero and the animation of circular menu 2412 has effectively stopped. In this embodiment. variable assist scroll engine has reduced the effects of any inertial energy in order to provide the user with more control over the scrolling movement of the display elements in circular menu 2412.

Figure 24C:
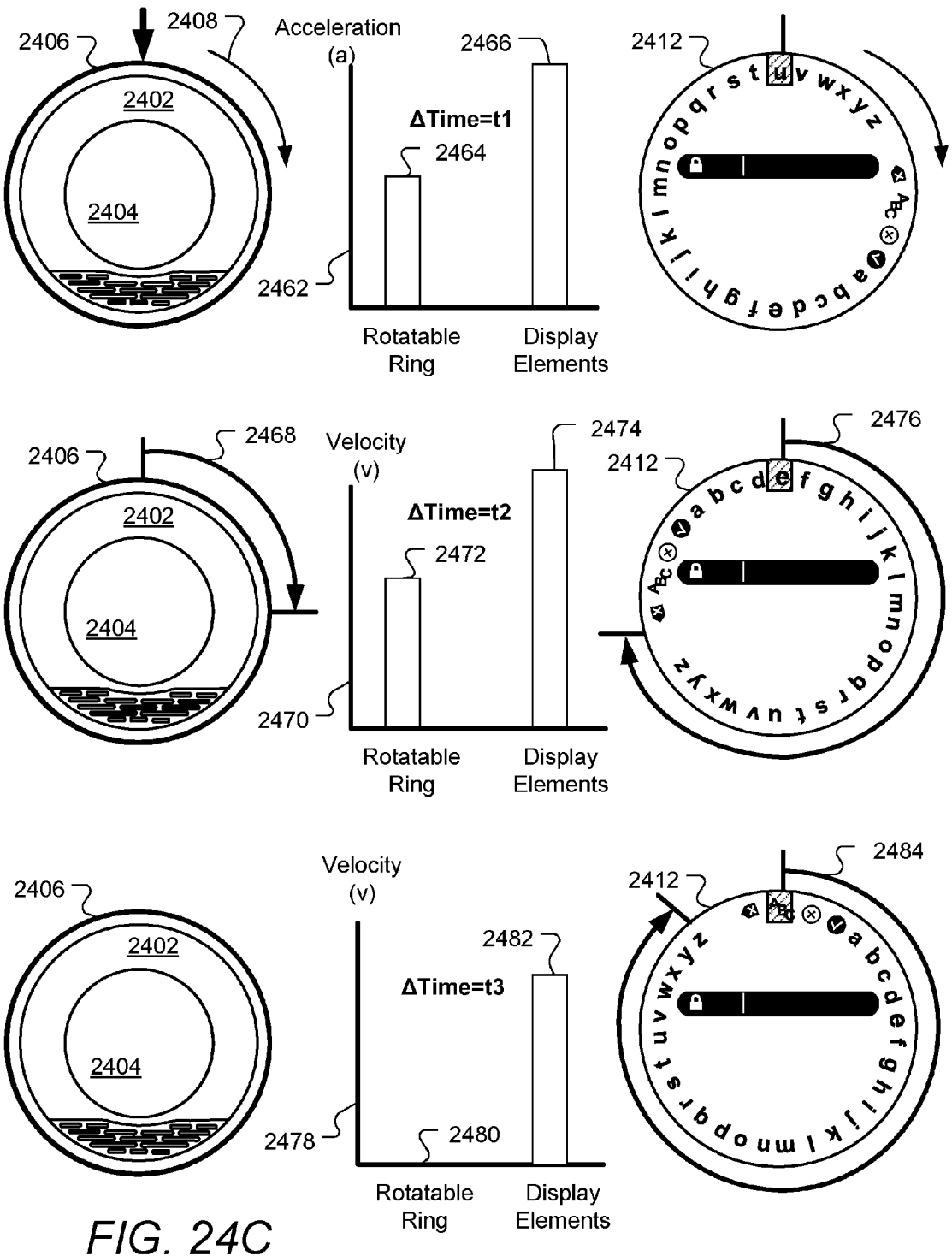

Referring to FIG. 24C, in this example a user has again applied a rotational force in clockwise direction 2408 to a rotatable ring 2406 associated with a thermostat 2402. The acceleration graph 2462 indicates schematically at t1 that ring acceleration 2464 is less than the display acceleration 2466 as the variable assist scroll engine has increased the simulated acceleration associated with the animation of circular menu 2412. The ring acceleration 2464 is similar to the ring acceleration 2416 in FIG. 24A except that it is at a much higher magnitude in comparison. As a result, the variable assist scroll engine responds with an even higher acceleration for the animation of the circular menu 2412 to reflect the user's intent when using the interface.

In one embodiment, the circular menu 2412 at t2 in FIG. 24C has a display velocity 2474 in velocity graph 2470 which is significantly greater than the ring velocity 2472. As a result of the associated relatively high acceleration and velocity, circular menu 2412 has also moved through a rotational displacement 2476 at t2 that is almost three times the rotational displacement 2468 associated with the rotatable ring 2406. In this application, the variable assist scroll engine has applied one heuristic to reduce the rotational user input to a quarter-rotation of the rotatable ring 2406 while traversing almost three-quarters of the sequence of display elements in the circular menu 2412.

Figure 24D:
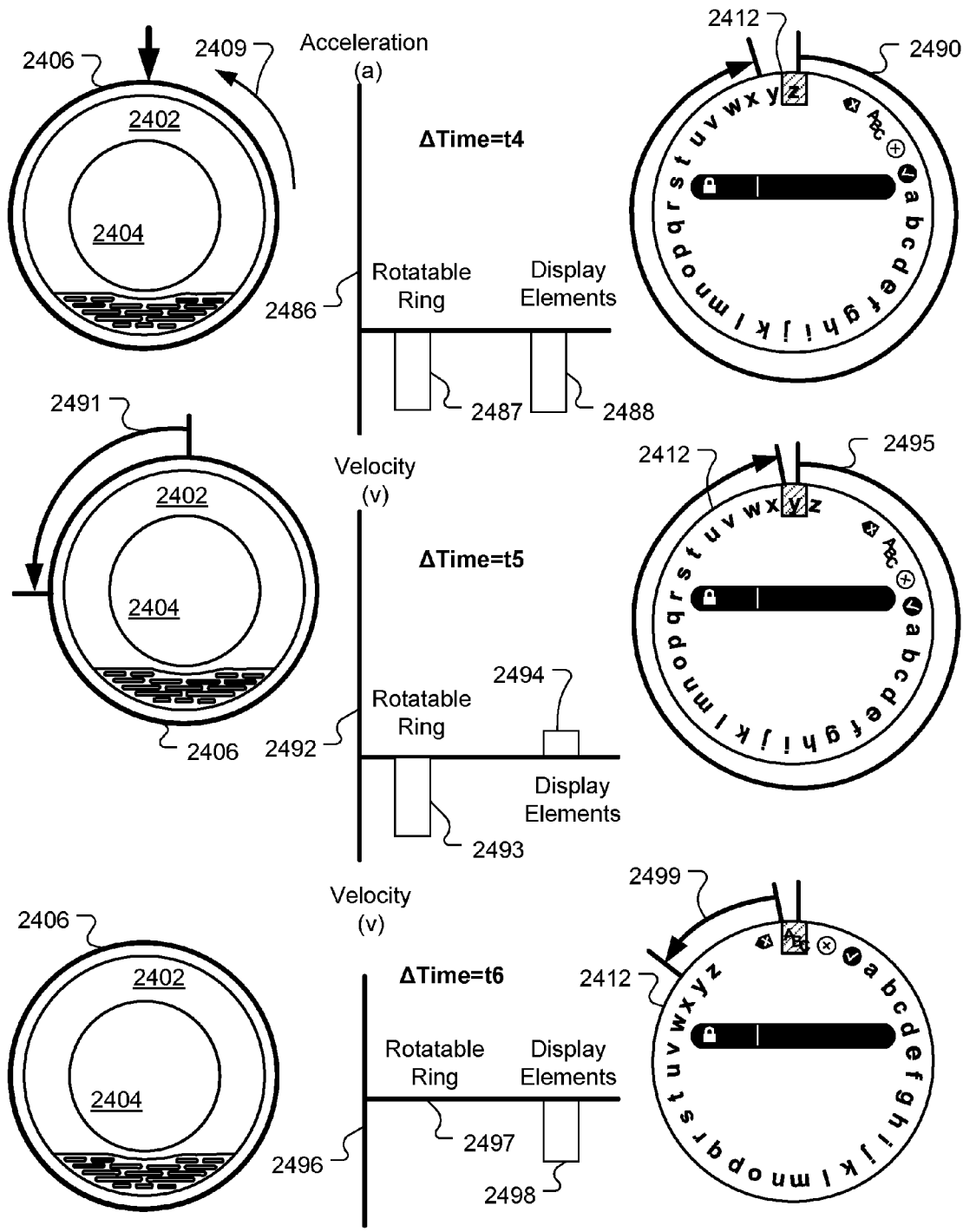

At a subsequent time interval t3 in FIG. 24C, the user is no longer moving rotatable ring 2406 and the ring velocity 2480 as indicated by velocity graph 2478 is negligible or zero. In contrast, circular menu 2412 at t3 continues to travel at a much more significant display velocity 2482 reduced only partially by the simulated friction or decay. In this embodiment, the inertia imparted a rotational to circular menu 2412 allowed the circular menu 2412 at t3 to complete almost a full-revolution from only a quarter-revolution input to rotatable ring 2406. Referring to FIG. 24D, the user at t4 has now applied a rotational force to a rotatable ring 2406 with ring acceleration 2487 in counter-clockwise direction 2409 causing circular menu 2412 at t4 to receive a "negative" acceleration and dampening force. Despite the display acceleration 2488 going negative at t4, the animation of circular menu 2412 does not immediately reverse direction but gradually slows before appearing to reverse direction. Accordingly, circular menu 2412 has a rotational displacement 2490 at t4 and continues to extend to rotational displacement 2495 in t5 with a display velocity of 2494 as indicated by velocity graph 2492. In contrast, rotatable ring 2491 has traveled at ring velocity 2493 at t5 with a rotational displacement 2491 in the opposite direction, for a brief moment, to the rotation of circular menu 2412 at t5. At t6 in FIG. 24D, the ring velocity 2497 associated with rotatable ring 2406 is negligible or zero and the display velocity 2498 has reversed direction causing the animation of circular menu 2412 to reverse direction traveling counter-clockwise with rotational displacement 2499.

FIG. 25 illustrates one application of a heuristic for affirmatively identifying a display element on a circular menu in accordance with some embodiments of the present invention. In this embodiment, a user has applied a rotational input at t1 to rotatable ring 2406 on thermostat 2402. In the same time t1, electronic display 2404 on thermostat 2402 displays an indicator 2410 on circular menu 2412 identifying a symbol "f" on the circular menu 2412. Detail 2504 illustrates schematically that each symbol is logically associated with a groove and under the force of simulated gravity identifies a display element under a similarly simulated pawl 2411.

In this example, a rotational displacement 2502 on thermostat 2402 at t1 results in circular menu 2412 at t2 experiencing a rotational displacement 2508 such that indicator 2410 momentarily falls between symbols "u" and "v" making it not possible to determine whether "u" or "v" has been identified in the context of the user interface. To resolve this dilemma, and further reduce or minimize additional required rotational input from the user, one embodiment at t3 in FIG. 25 simulating the groove associated with each symbol either advances or retreats circular menu 2412. Upon moving circular menu 2412 a slight amount, indicator affirmatively identifies a display element, such as symbol "v" as shown in detail 2510. On or about the same moment, detail 2510 also shows that an audible "Click" sound is provided in the user interface providing a user with audible feedback and providing a sense of added control, confidence, and comfort when operating the thermostat 2406.

Figure 26A:
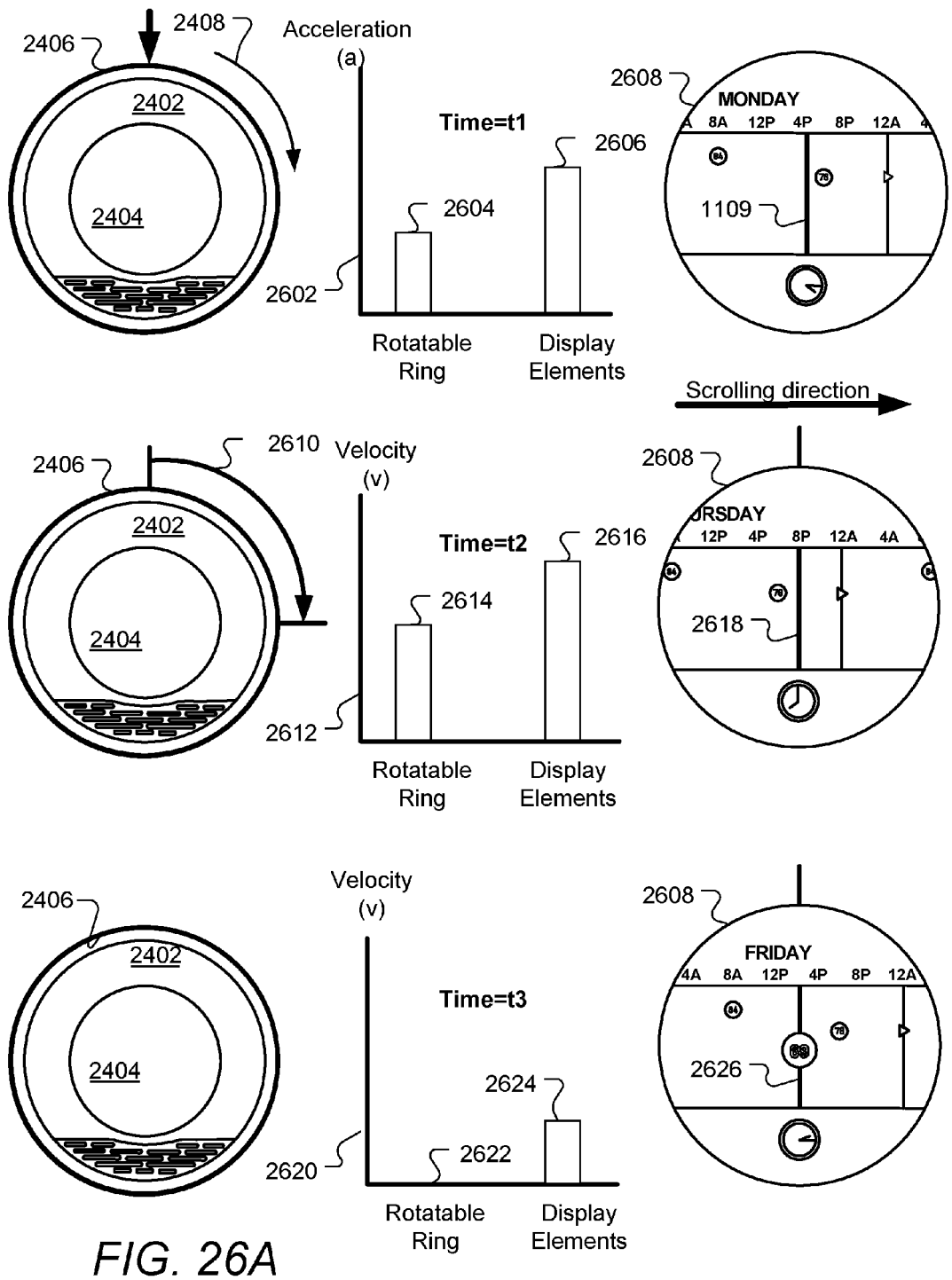
FIGS. 26A-26B illustrate another application of the variable assist scroll engine to a linear menu of display elements in accordance with some embodiments.
Figure 26B:
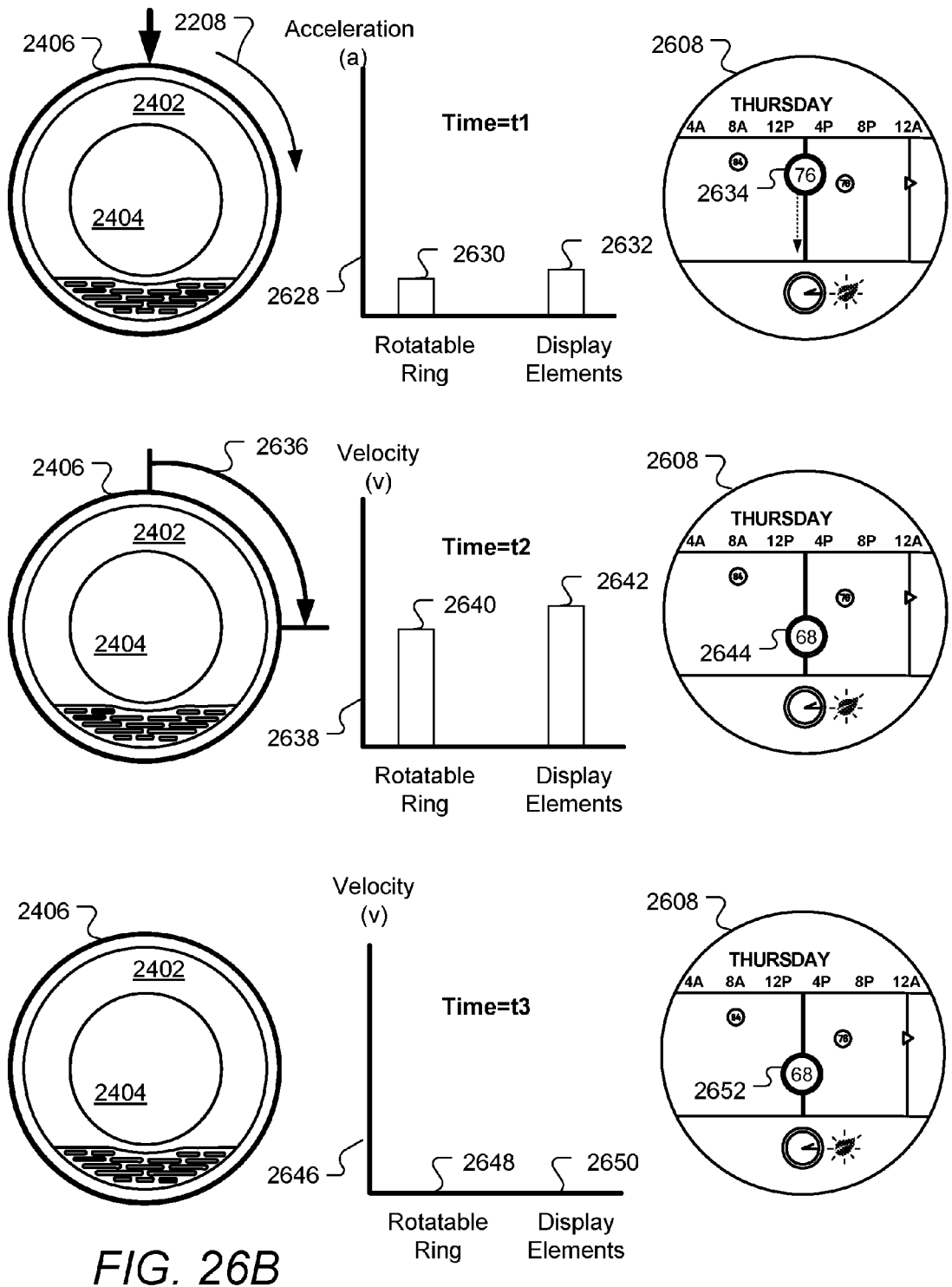

FIGS. 26A-26B illustrate another application of the variable assist scroll engine to a linear menu of display elements in accordance with some embodiments. Referring to FIG. 26A, in this example a user has applied a rotational force in clockwise direction 2408 to a rotatable ring 2406 surrounding an electronic display 2404 centrally mounted on a body of a thermostat 2402. The acceleration graph 2602 indicates schematically at t1 the ring acceleration 2604 is less than the display acceleration 2606 as the variable assist scroll engine has increased the simulated acceleration associated with the animation of linear menu. It can also be observed that linear menu 2608, which operates in the scrolling direction as indicated in FIG. 26A, is a scheduling system for operation of the thermostat at different temperature setpoints in the course of a weeklong period from Monday to Friday with indicator 2609 showing the current display element on the linear menu 2608 pointing to 4 pm on Monday.

In one embodiment, the linear menu 2608 at t2 in FIG. 24A has a display velocity 2616 in velocity graph 2612 which is also greater than the ring velocity 2614. Linear menu 2608 also moved through a linear displacement at t2 that is at least twice the rotational displacement 2610 associated with the rotatable ring 2406 of the thermostat 2402. This linear displacement can be observed as the indicator 2609 at t1 was indicates 4 pm on Monday while the indicator 2618 at t2 indicates 8 pm on Thursday. In this application, the variable assist scroll engine has applied one heuristic to reduce the rotational user input to a quarter-rotation of the rotatable ring 2406 while traversing more than twice a comparable linear distance in the sequence of display elements in the linear menu 2608.

At a subsequent time interval t3 in FIG. 26A, the user is no longer moving rotatable ring 2406 and the ring velocity 2622 as indicated by velocity graph 2620 is negligible or zero. In contrast, linear menu 2608 continues to travel at a much more significant display velocity 2624 reduced in part by a simulated friction or decay. In this embodiment, variable assist scroll engine has imparted an inertia and linear menu 2608 to further scrolls where indicator 2626 shows 2 pm Friday. While not displayed in FIG. 26A, the linear displacement of linear menu 2608 will continue to increase after t3 until display velocity 2624 decays further and the scrolling stops.

Referring to FIG. 26B, in this example a user has applied a rotational force in clockwise direction 2408 to a rotatable ring 2406 of thermostat 2402. The acceleration graph 2630 indicates schematically at t1 the ring acceleration 2630 is less than the display acceleration 2632 as the variable assist scroll engine has slightly increased the simulated acceleration associated with the animation of linear menu 2608. The ring acceleration 2630 provided in FIG. 26B is similar to the ring acceleration 2604 in FIG. 26A except that it is a lower magnitude in comparison and, more importantly, is used to change a setpoint 2634 rather than a date in the schedule of linear menu 2608. As a result, the variable assist scroll engine has also responded with a lower acceleration for the animation of the linear menu 2608 to reflect the user's intent when using the interface.

In one embodiment, the linear menu 2608 at t2 in FIG. 26B has a display velocity 2642 in velocity graph 2638 which is comparable with the ring velocity 2640. It follows that linear menu 2608 has also moved through a linear displacement at t2 that is comparable to the rotational displacement 2444 associated with the rotatable ring 2406. For example, a relatively small change between the setpoint 2634 at 76 degrees and the setpoint 2644 at 68 degrees in FIG. 26B does not require a large linear displacement. In this application, the variable assist scroll engine has applied one heuristic of allowing the user to make a quarter-rotation of the rotatable ring 2406 that more directly controls the movement of the scrolling movement of display elements in the linear menu 2608.

At a subsequent time interval t3 in FIG. 26B, the user is no longer moving rotatable ring 2406 and the ring velocity 2648 as indicated by velocity graph 2646 is negligible or zero. Likewise, variable scroll assist engine has damped linear menu 2608 at t3 such that display velocity 2650 is also negligible or zero and the animation of linear menu 2608 has effectively stopped. In this embodiment, variable assist scroll engine has reduced the effects of any inertial energy in order to provide the user with more control over the scrolling movement of the display elements in linear menu 2608.

Figure 27A:
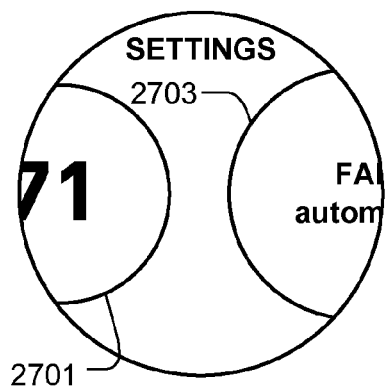
FIGS. 27A-C illustrate further additional types of menus that have also benefited from application of the variable assist scroll engine in accordance with some embodiments.
Figure 27B:
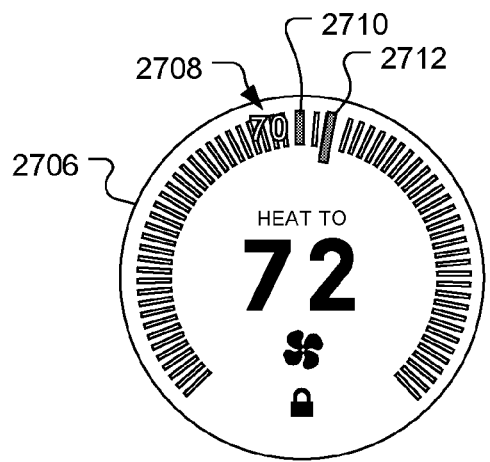
Figure 27C:
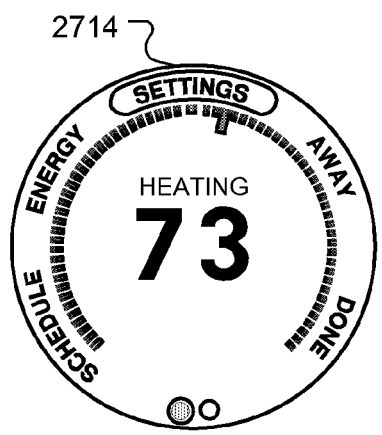

FIGS. 27A-C illustrates further additional types of menus that have also benefited from application of the variable assist scroll engine in accordance with some embodiments. In settings menu in FIG. 27A, a set of display elements shaped discs scroll linearly across the electronic display as physical objects with qualities of mass and inertia. Further, temperature setting menu in FIG. 27B is another example of a circular menu with a setpoint tick mark 2712 and a current temperature tick mark 2710. Rotating main menu in FIG. 27C is a circular type menu with settings 2714 to be scrolled using embodiments of the present invention.

Although the foregoing has been described in some detail for purposes of clarity, it will be apparent that certain changes and modifications may be made without departing from the principles thereof. By way of example, it is within the scope of the present teachings for the rotatable ring of the above-described thermostat to be provided in a "virtual," "static," or "solid state" form instead of a mechanical form, whereby the outer periphery of the thermostat body contains a touch-sensitive material similar to that used on touchpad computing displays and smartphone displays. For such embodiments, the manipulation by the user's hand would be a "swipe" across the touch-sensitive material, rather than a literal rotation of a mechanical ring, the user's fingers sliding around the periphery but not actually causing mechanical movement. This form of user input, which could be termed a "virtual ring rotation," "static ring rotation", "solid state ring rotation", or a "rotational swipe", would otherwise have the same purpose and effect of the above-described mechanical rotations, but would obviate the need for a mechanical ring on the device. Although not believed to be as desirable as a mechanically rotatable ring insofar as there may be a lesser amount of tactile satisfaction on the part of the user, such embodiments may be advantageous for reasons such as reduced fabrication cost. By way of further example, it is within the scope of the present teachings for the inward mechanical pressability or "inward click" functionality of the rotatable ring to be provided in a "virtual" or "solid state" form instead of a mechanical form, whereby an inward pressing effort by the user's hand or fingers is detected using internal solid state sensors (for example, solid state piezoelectric transducers) coupled to the outer body of the thermostat. For such embodiments, the inward pressing by the user's hand or fingers would not cause actual inward movement of the front face of the thermostat as with the above-described embodiments, but would otherwise have the same purpose and effect as the above-described "inward clicks" of the rotatable ring. Optionally, an audible beep or clicking sound can be provided from an internal speaker or other sound transducer, to provide feedback that the user has sufficiently pressed inward on the rotatable ring or virtual/solid state rotatable ring. Although not believed to be as desirable as the previously described embodiments, whose inwardly moving rotatable ring and sheet-metal style rebounding mechanical "click" has been found to be particularly satisfying to users, such embodiments may be advantageous for reasons including reduced fabrication cost. It is likewise within the scope of the present teachings for the described thermostat to provide both the ring rotations and inward clicks in "virtual" or "solid state" form, whereby the overall device could be provided in fully solid state form with no moving parts at all.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read only memory and/or a random access memory. Generally, a computer will include one or more mass storage devices for storing data files; such devices include magnetic disks, such as internal hard disks and removable disks; magneto optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto optical disks; CD ROM disks and other non-transitory storage mediums. Any of the foregoing can be supplemented by, or incorporated in, ASICs.

By way of further example, although described above as having ring rotations and inward clicks as the exclusive user input modalities, which has been found particularly advantageous in terms of device elegance and simplicity, it is nevertheless within the scope of the present teachings to alternatively provide the described thermostat with an additional button, such as a "back" button. In one option, the "back" button could be provided on the side of the device, such as described in the commonly assigned U.S. Ser. No. 13/033,573, supra. In other embodiments, plural additional buttons, such as a "menu" button and so forth, could be provided on the side of the device. For one embodiment, the actuation of the additional buttons would be fully optional on the part of the user, that is, the device could still be fully controlled using only the ring rotations and inward clicks. However, for users that really want to use the "menu" and "back" buttons because of the habits they may have formed with other computing devices such as smartphones and the like, the device would accommodate and respond accordingly to such "menu" and "back" button inputs. For some embodiments, the features and advantages of one or more of the teachings hereinabove are advantageously combined with the features and advantages of one or more of the teachings of the following commonly assigned applications, each of which is incorporated by reference herein: U.S. Ser. No. 13/317,423 filed Oct. 17, 2011; U.S. Ser. No. 13/440,910 filed Apr. 5, 2012; U.S. Ser. No. 13/434,560 filed Mar. 29, 2012; and U.S. Ser. No. 13/624,875 filed Sep. 21, 2012.

By way of even further example, other forms of user input modalities could be provided by the above-described thermostat as additions and/or alternative to the above-described ring rotations and inward clicks without necessarily departing from the scope of the present teachings. Examples include optically sensed gesture-based user inputs similar to those provided with modern video game consoles, and voice inputs implemented using known speech recognition algorithms. It is to be appreciated that there are many alternative ways of implementing both the processes and apparatuses described herein. Accordingly, the present embodiments are to be considered as illustrative and not restrictive, and the inventive body of work is not to be limited to the details given herein, which may be modified within the scope and equivalents of the appended claims.

The invention claimed is:

1. An electronic device for controlling a heating, ventilation, or air conditioning (HVAC) system, the electronic device comprising:
a processor configured to generate a graphical user interface; and
an electronic display of the electronic device configured to display the graphical user interface;
wherein the graphical user interface comprises a menu of discrete display elements, wherein, upon a first stimulus, a first of the discrete display elements is shifted out of full view on the electronic display while a second of the discrete display elements is shifted into full view on the electronic display, and wherein the first of the discrete display elements is shifted out of full view on the electronic display using a coin flip animation effect and the second of the discrete display elements is shifted into full view on the electronic display using the coin flip animation effect.

2. The electronic device of claim 1, wherein only one of the discrete display elements of the menu is completely in view on the electronic display at any single time.

3. The electronic device of claim 2, wherein each discrete display element of the menu fills the electronic display when fully in view.

4. The electronic device of claim 2, wherein each discrete display element of the menu fills only a portion of the electronic display when fully in view.

5. The electronic device of claim 1, wherein each discrete display element substantially takes the shape of the electronic display of the same or a different scale.

6. The electronic device of claim 5, wherein the electronic display and the discrete display elements have a common non-rectangular shape.

7. The electronic device of claim 1, comprising a user input interface configured to:
detect a user navigation operation from the first of the discrete display elements of the menu to the second of the discrete display elements of the menu; and
provide the first stimulus when the user navigation operation is detected.

8. The electronic device of claim 1, comprising a rotating ring user input interface, wherein the rotating ring user input interface is configured to provide the first stimulus when the rotating ring user input interface is rotated a first direction and the first of the discrete display elements is fully visible on the electronic display.

9. The electronic device of claim 8, wherein the rotating ring user input interface is configured to provide a second stimulus when the rotating ring user input interface is rotated a second direction and the first of the discrete display elements is fully in view on the electronic display, wherein, upon the second stimulus, the first of the discrete display elements is shifted out of full view while a third of the discrete display elements is shifted into full view, and wherein the first and third of the discrete display elements appear spatially related to one another when the first of the discrete display elements is shifted out of full view and the third of the discrete display elements is shifted into full view.

10. A method for providing a graphical user interface of an electronic display of an electronic device configured to control a heating, ventilation, or air conditioning (HVAC) system, the method comprising:
displaying a screen of a first logical hierarchical level of the graphical user interface, wherein the screen comprises a user-selectable option to enter a menu of a second logical hierarchical level of the graphical user interface, wherein the second logical hierarchical level is lower than the first logical hierarchical level;
after receiving an indication of a user selection of the option to enter the menu, displaying a first discrete display element of the menu on the electronic display; and
after receiving an indication of a user navigation from the first discrete display element of the menu to a second discrete display element of the menu, shifting the first discrete display element out of full view on the electronic display using a coin flip animation effect while shifting the second discrete display element into full view on the electronic display using the coin flip animation effect.

11. The method of claim 10, comprising, after the user selection of the option to enter the menu but before the first discrete display element is displayed, transitioning via the coin flip animation from the screen of the first logical hierarchical level to the menu of the second logical hierarchical level.

12. The method of claim 10, wherein the screen of the first logical hierarchical level appears to be rotated at least once in space to reveal the first discrete display element of the menu on the other side.

13. The method of claim 10, wherein displaying the first discrete display element of the menu comprises displaying on the electronic display a title of the menu in an area of the electronic display not filled by the first discrete display element, wherein the title remains visible while the first discrete display element and the second discrete display element are shifted.

14. The method of claim 13, wherein the first and second discrete display elements comprise the same shape as the electronic display but a smaller scale.

15. The method of claim 10, wherein the first discrete display element is shifted out of full view at a first location along a boundary of the electronic display and the second discrete display element is shifted into full view at a second location along the boundary of the electronic display.

16. The method of claim 15, wherein the first location along the boundary of the electronic display is opposite the second location along the boundary of the electronic display.

17. The method of claim 16, wherein the first location along the boundary of electronic display is a leftmost edge of the electronic display and the second location along the boundary of the electronic display is a rightmost edge of the electronic display, or wherein the first location along the boundary of electronic display is a rightmost edge of the electronic display and the second location along the boundary of the electronic display is a leftmost edge of the electronic display.

18. The method of claim 10, wherein shifting the first and second discrete display elements comprises translating the first and second discrete display elements in a common direction and at a common rate to maintain the appearance of the spatial relationship to one another.

19. The method of claim 10, wherein shifting at least the second discrete display element comprises translating the second discrete display element at a rate that varies to give an appearance that the second discrete display element has a mass or inertia.

20. The method of claim 10, wherein shifting at least the second discrete display element comprises translating the second discrete display element at a rate that varies at least partly based on variable assist scrolling comprising a speed of rotation of a rotating ring user input interface.

21. One or more tangible, non-transitory machine-readable media comprising instructions configured to be carried out on an electronic device that controls a heating, ventilation, or air conditioning (HVAC) system, the instructions configured to:
generate at least one screen of a navigable, ordered series of screens of a graphical user interface configured to be displayed on an electronic display of the electronic device, wherein the ordered series of screens comprises a first screen and a last screen, wherein each of the ordered series of screens is directly navigable to at least an immediately subsequent one or an immediately prior one of the ordered series of screens, and wherein each of the ordered series of screens comprises a discrete display element;
display the at least one screen on the electronic display; and
in response to user input indicating a desire to navigate from the at least one screen to another screen of the ordered series of screens, display an animated transition on the electronic display configured to provide an appearance of a spatial relationship between the respective discrete display elements of the at least one screen and the other screen, wherein the animated transition comprises a coin flip effect in which the at least one screen appears to be rotated at least once in space to reveal the other screen on the other side.

22. The one or more tangible, machine-readable media of claim 21, wherein the first screen of the ordered series of screens is only directly navigable to an immediately subsequent screen and the last screen of the ordered series of screens is only directly navigable to an immediately prior screen.

23. The one or more tangible, machine-readable media of claim 21, wherein the first screen or the last screen of the ordered series of screens is configured to provide a user-selectable exit from the ordered series of screens to a higher logical hierarchical level of the graphical user interface.

24. The one or more tangible, machine-readable media of claim 21, wherein both the first screen and the last screen of the ordered series of screens are configured to provide a user-selectable exit from the ordered series of screens to a higher logical hierarchical level of the graphical user interface.

25. The one or more tangible, machine-readable media of claim 21, wherein the ordered series of screens comprises a thermostat settings menu and wherein at least two of the ordered series of screens comprise different user-selectable thermostat settings.

26. The one or more tangible, machine-readable media of claim 21, wherein each of the ordered series of screens comprises a portion of the discrete display element of the immediately prior screen of the ordered series of screens or the a portion of the discrete display element of the immediately subsequent screen of the ordered series of screens, or both.

27. A method for providing a graphical user interface of an electronic display of an electronic device configured to control a heating, ventilation, or air conditioning (HVAC) system, the method comprising:
displaying a screen of a first logical hierarchical level of the graphical user interface, wherein the screen comprises a user-selectable option to enter a menu of a second logical hierarchical level of the graphical user interface, wherein the second logical hierarchical level is lower than the first logical hierarchical level;
after receiving an indication of a user selection of the option to enter the menu, displaying a first discrete display element of the menu on the electronic display; and
after receiving an indication of a user navigation from the first discrete display element of the menu to a second discrete display element of the menu, shifting the first discrete display element out of full view on the electronic display while shifting the second discrete display element into full view on the electronic display, wherein the first discrete display element and the second discrete display element appear to have a spatial relationship to one another at least while being shifted, wherein the animation comprises a coin flip effect in which the screen of the first logical hierarchical level appears to be rotated at least once in space to reveal the first discrete display element of the menu on the other side.

* * * * *